United States Patent [19]
Dörner et al.

[11] Patent Number: 5,749,285
[45] Date of Patent: May 12, 1998

[54] FOOD PROCESSOR

[75] Inventors: Stefan Dörner, Solingen; Uwe Kemker, Wuppertal; Hans-Peter Simm, Wuppertal; Oliver Lapp, Wuppertal, all of Germany

[73] Assignee: Vorwerk & Co. Interholding GmbH, Wuppertal, Germany

[21] Appl. No.: 737,307

[22] PCT Filed: Apr. 28, 1995

[86] PCT No.: PCT/EP95/01634

§ 371 Date: Jan. 21, 1997

§ 102(e) Date: Jan. 21, 1997

[87] PCT Pub. No.: WO95/29618

PCT Pub. Date: Nov. 9, 1995

[30] Foreign Application Priority Data

Apr. 28, 1994 [DE] Germany ............ 44 14 822.4

[51] Int. Cl.$^6$ ............ A47J 43/04; A47J 43/07
[52] U.S. Cl. ............ 99/348; 99/409; 99/511; 366/146; 366/314
[58] Field of Search ............ 99/348, 326–331, 99/495, 352–355, 476, 509–513, 409; 210/360.1, 380.1, 369, 379; 219/400, 415, 433, 432, 461, 521; 241/37.5, 92, 282.1; 366/143, 206, 314, 349, 144–146, 601, 246–251; 392/422; 426/243, 519, 523

[56] References Cited

U.S. PATENT DOCUMENTS

| | | |
|---|---|---|
| 3,754,466 | 8/1973 | Taralli et al. ............ 99/348 |
| 3,766,360 | 10/1973 | Eddleman et al. ............ 219/415 |
| 3,868,092 | 2/1975 | Gabriel-Robez ............ 366/246 |
| 4,173,925 | 11/1979 | Leon ............ 219/389 |
| 4,410,553 | 10/1983 | McGinty ............ 99/348 |
| 4,702,162 | 10/1987 | Sontheimer et al. . |
| 4,924,765 | 5/1990 | Pera ............ 99/470 |
| 5,156,084 | 10/1992 | Lin ............ 99/495 |
| 5,329,842 | 7/1994 | Zittel ............ 99/348 |
| 5,341,729 | 8/1994 | Zittel ............ 99/409 |
| 5,372,422 | 12/1994 | Dubroy ............ 366/143 |
| 5,429,041 | 7/1995 | Zittel ............ 99/355 X |
| 5,481,962 | 1/1996 | Tedesco ............ 99/330 X |
| 5,614,239 | 3/1997 | Tedesco ............ 219/400 X |

FOREIGN PATENT DOCUMENTS

| | | |
|---|---|---|
| 364479 | 10/1981 | Austria . |
| 2936804 | 4/1981 | Germany . |
| 3507276 | 9/1986 | Germany . |

*Primary Examiner*—Timothy F. Simone
*Attorney, Agent, or Firm*—Martin A. Farber

[57] ABSTRACT

The invention pertains to a food processor with a mixing vessel (4) and a drive mechanism for an agitator in the mixing vessel (4), where the mixing vessel (4) has in its lower region an opening of substantially circular cross-section. To make this type of food processor more practicable the invention proposes that the cross-section of the upper opening be elliptical and that a geometric mid-point (19') of the upper opening cross-section be offset from a mid-point (19) of the lower opening cross-section.

62 Claims, 42 Drawing Sheets

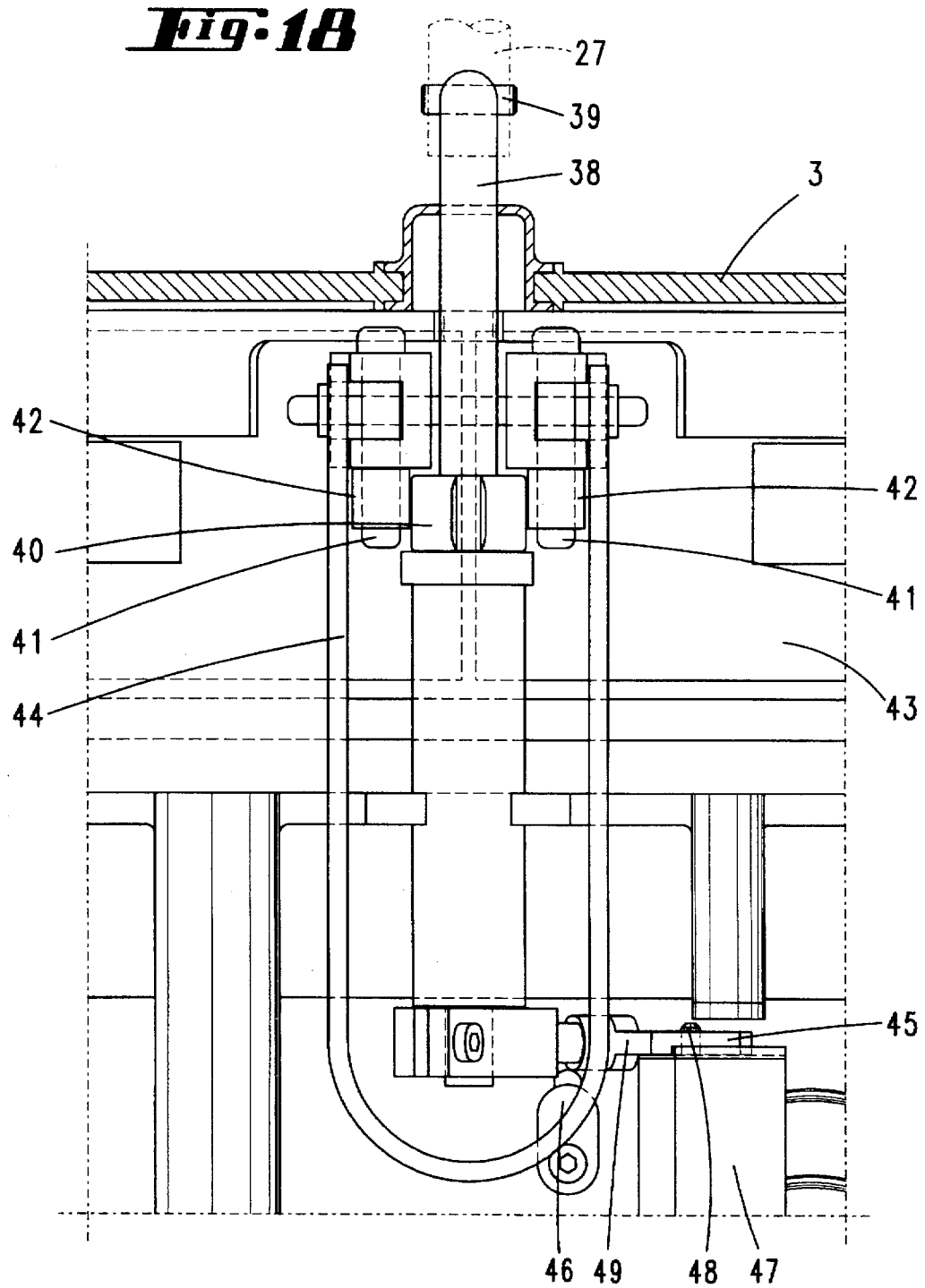

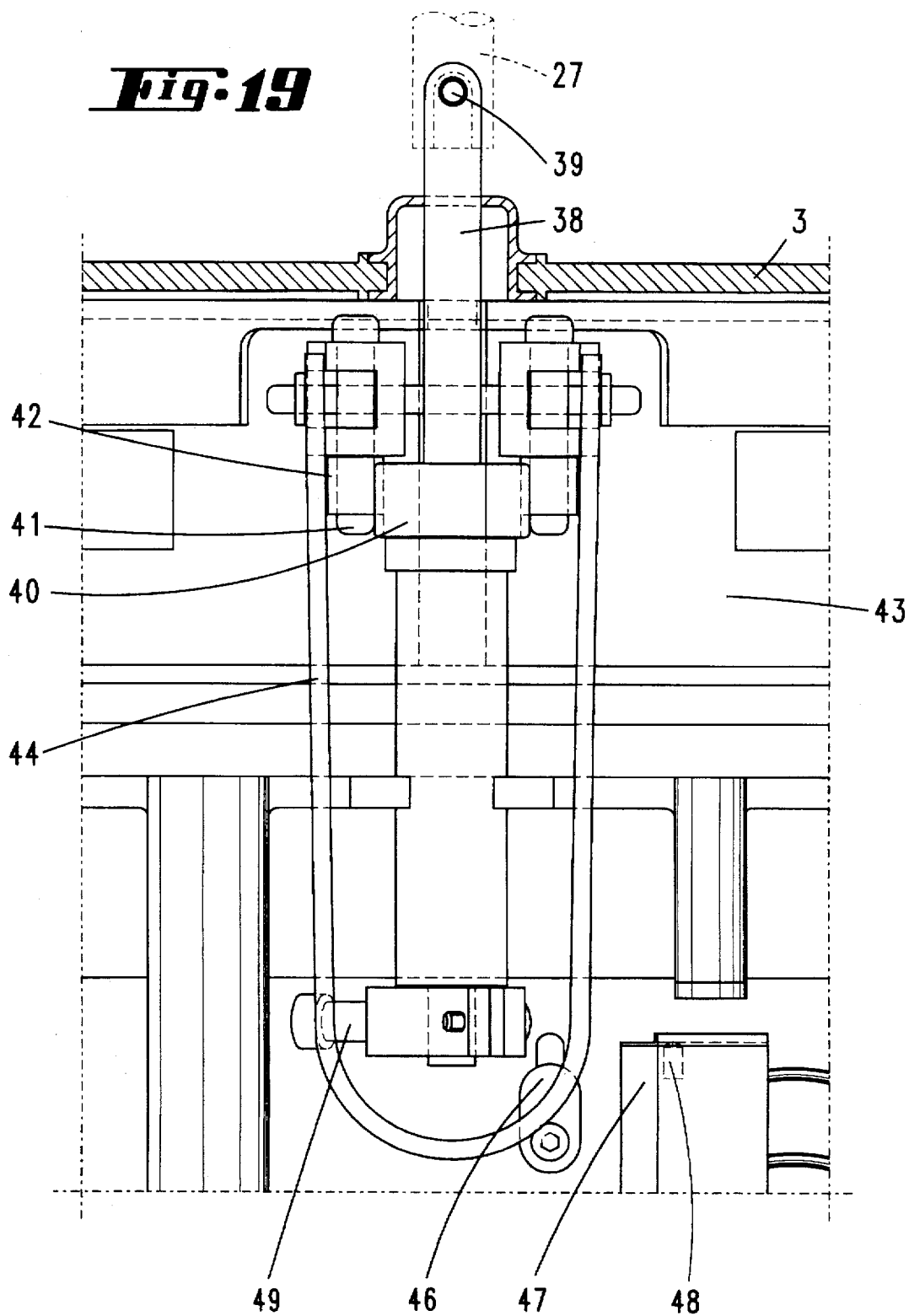

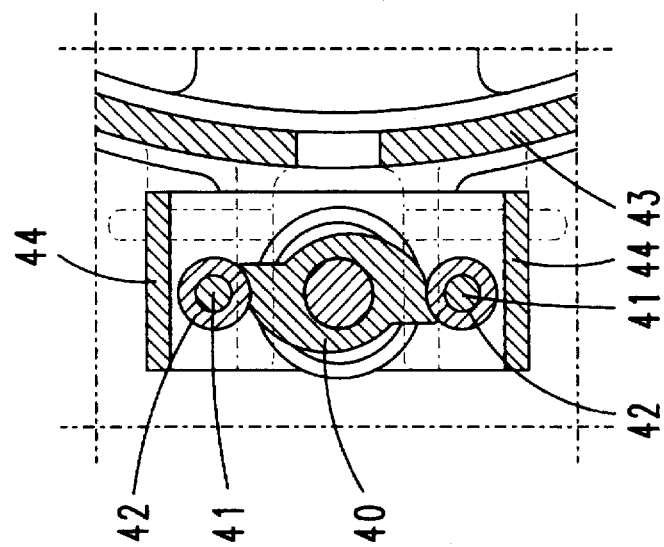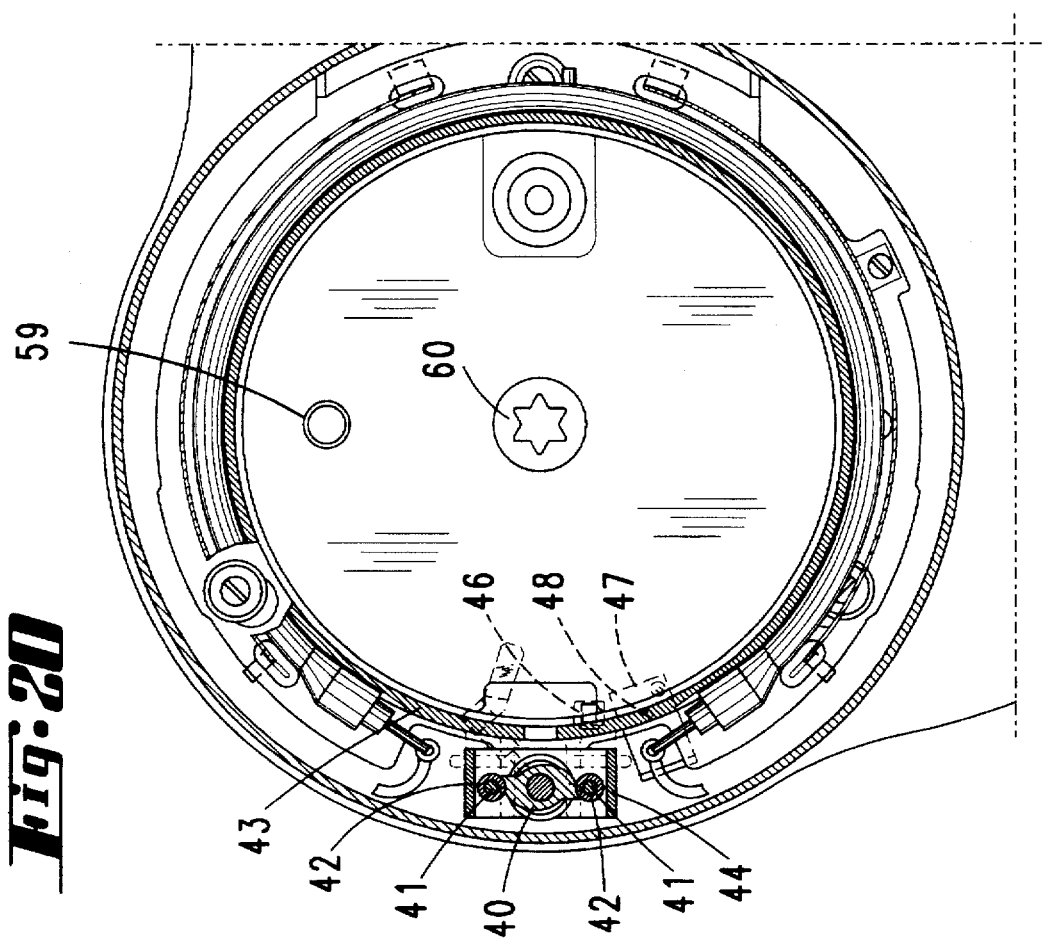

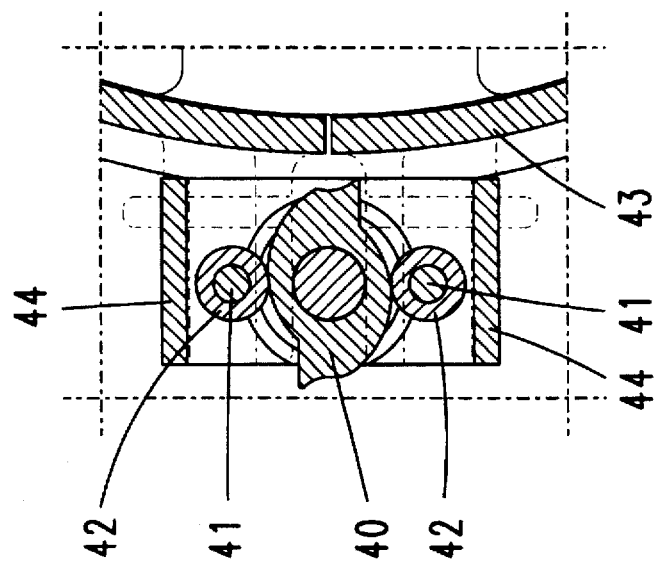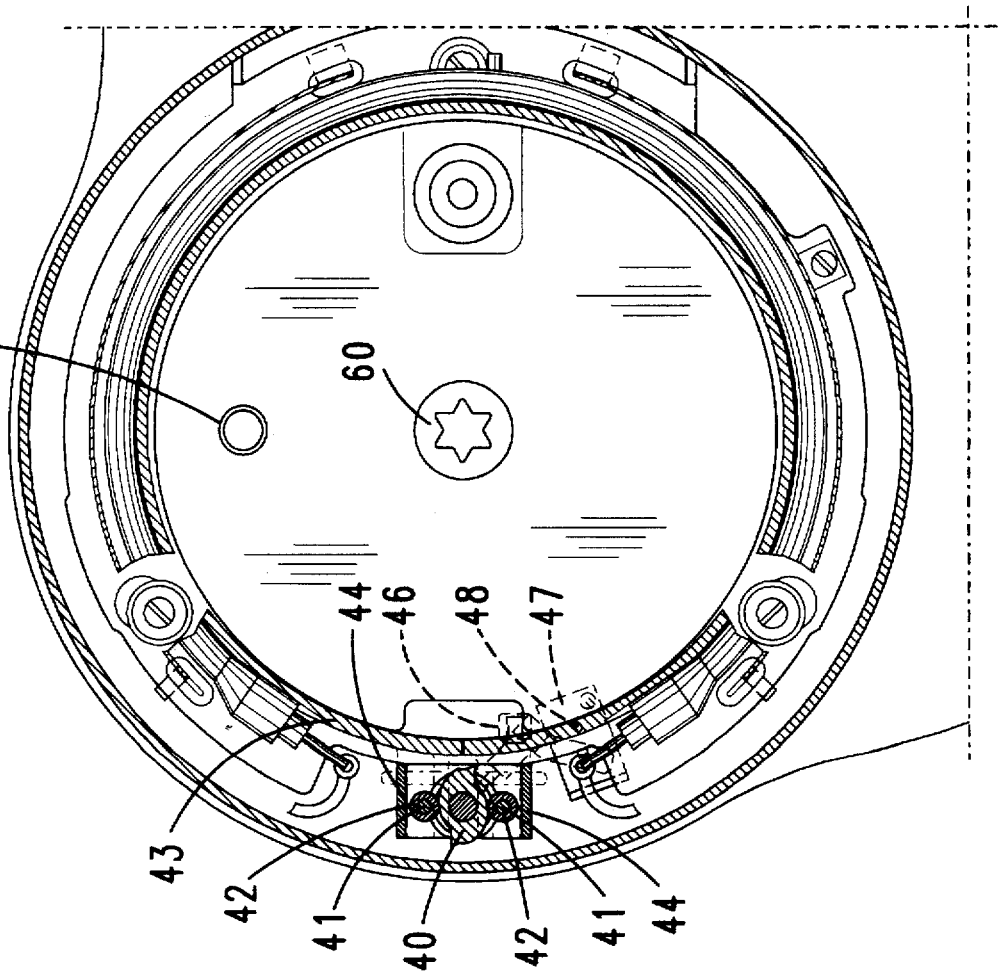

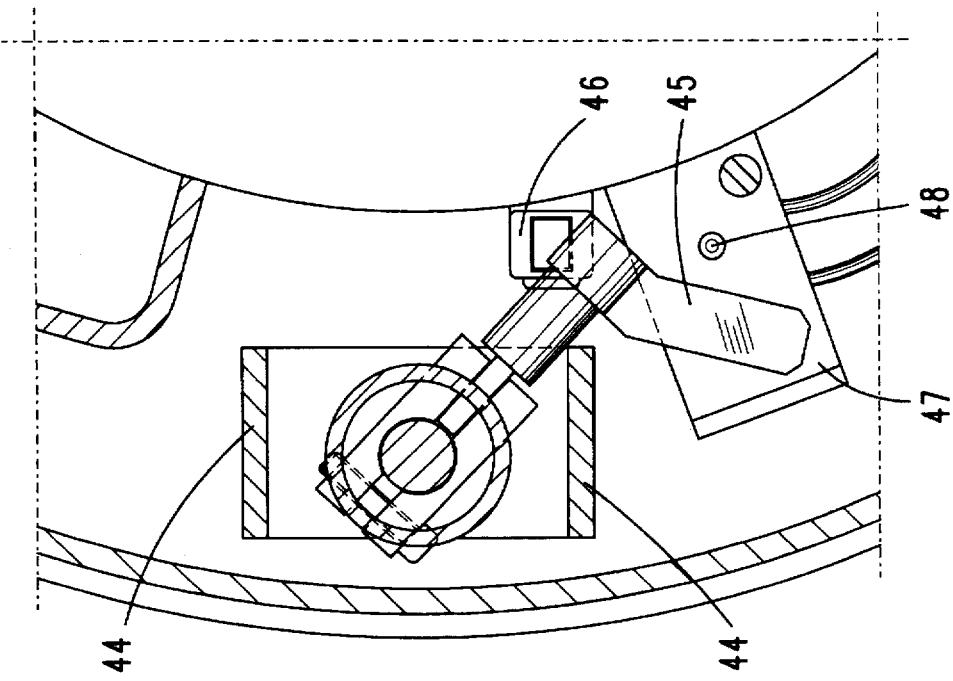
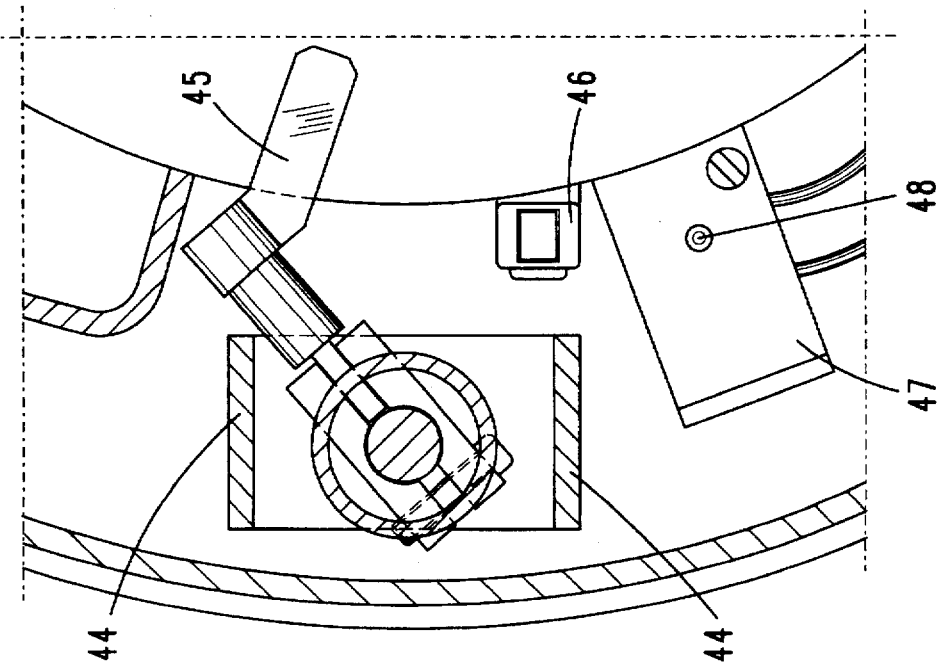

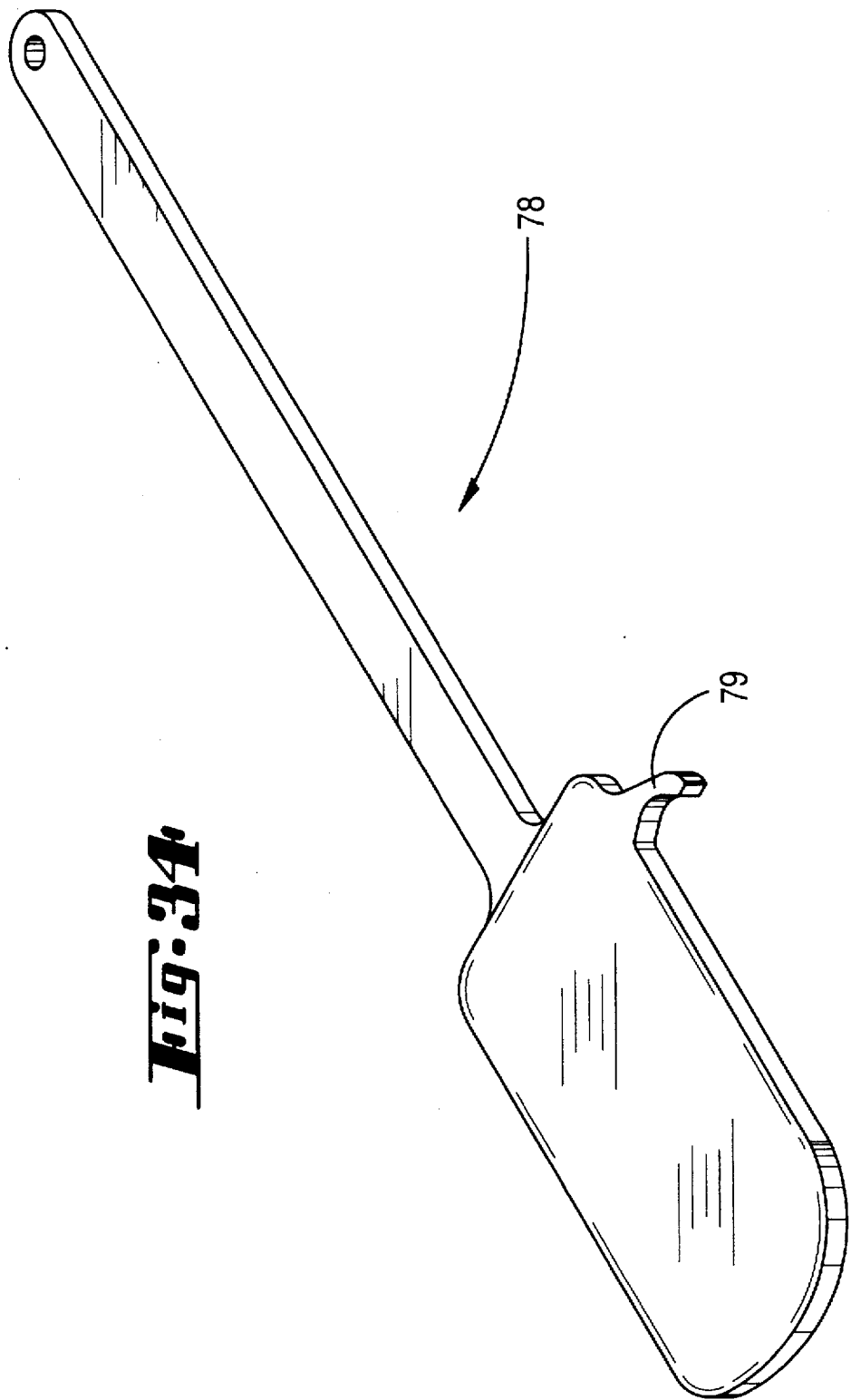

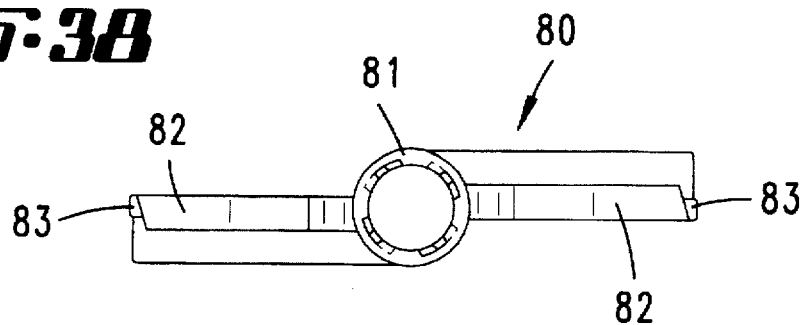
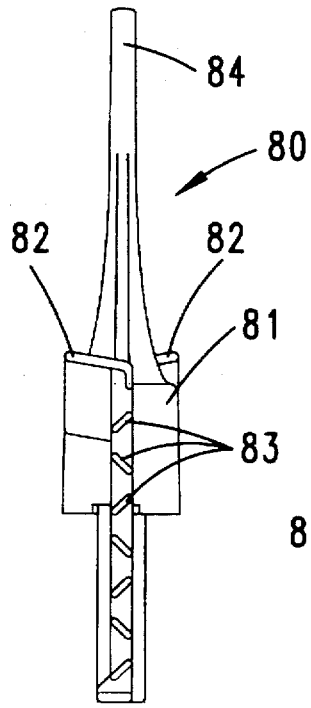
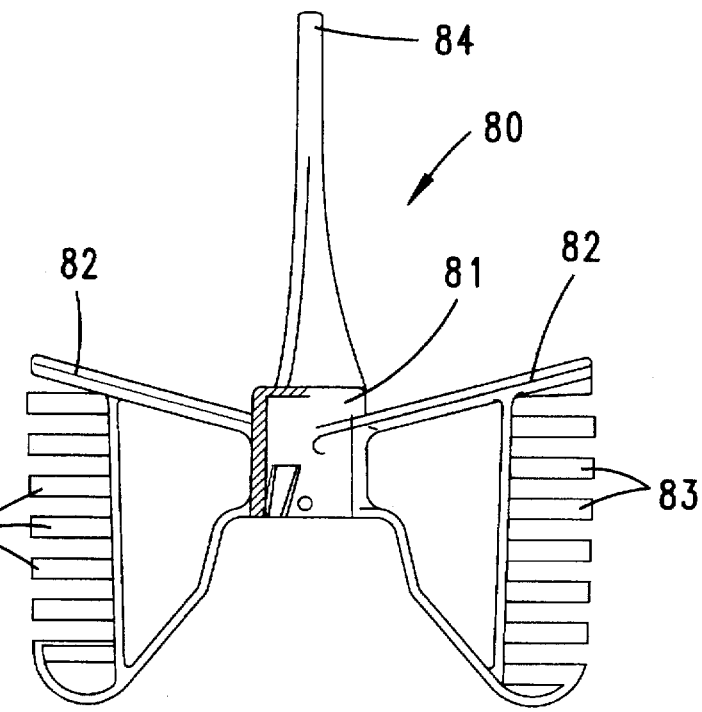
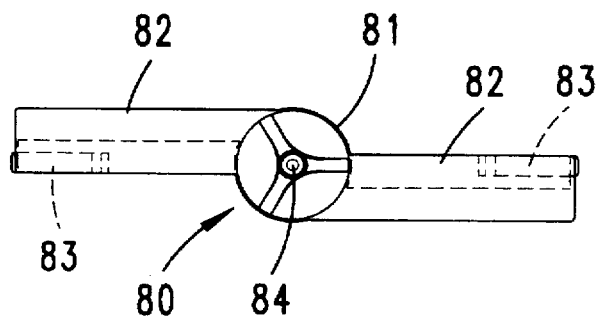

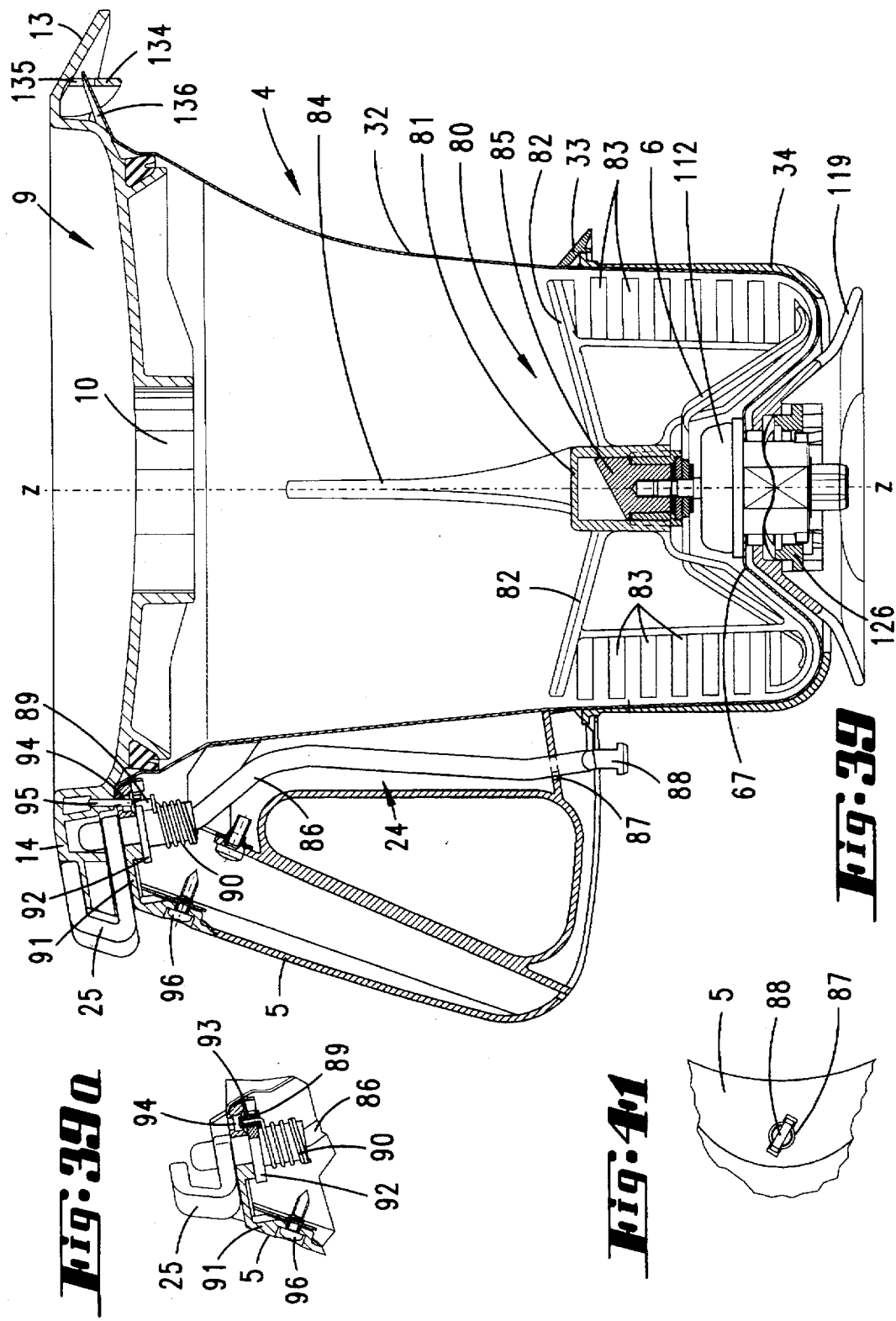

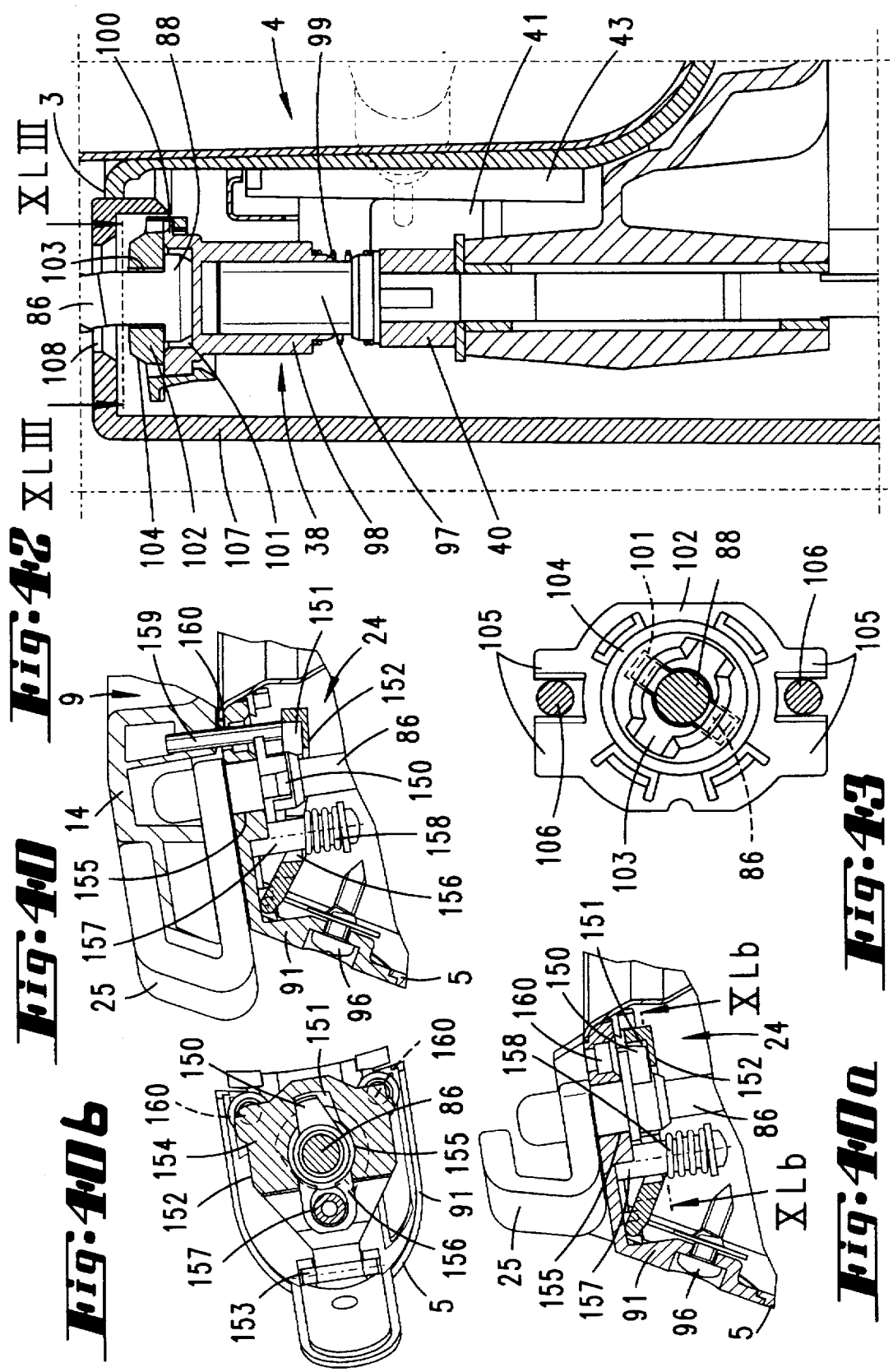

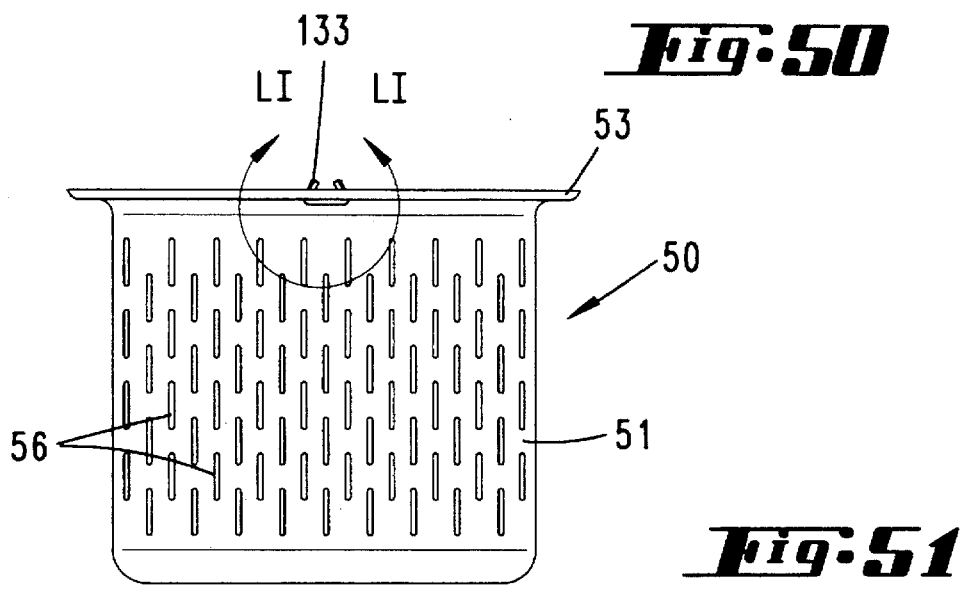
Fig. 50
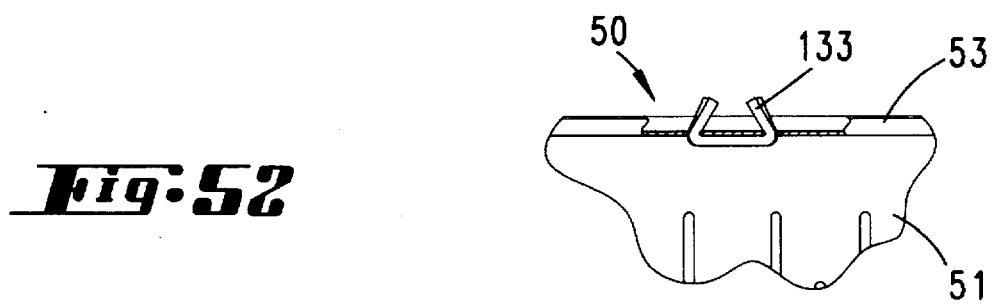
Fig. 51
Fig. 52
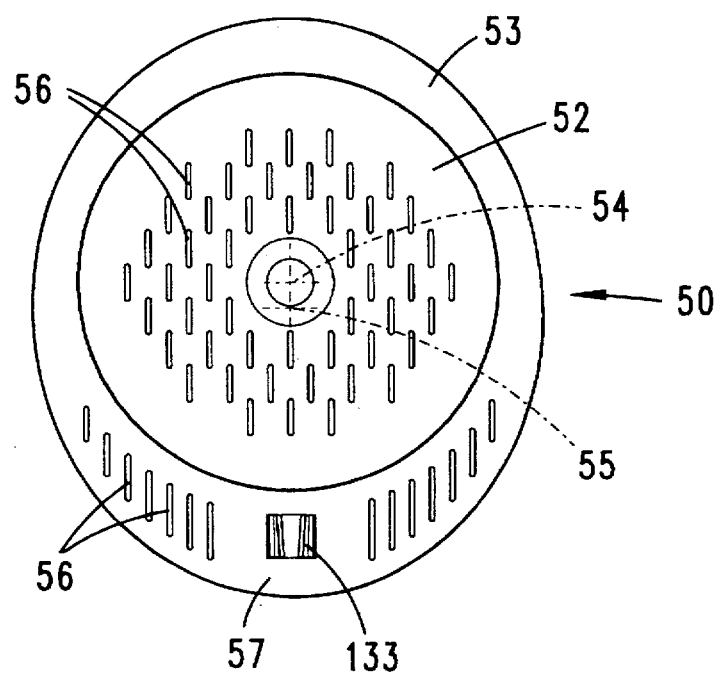

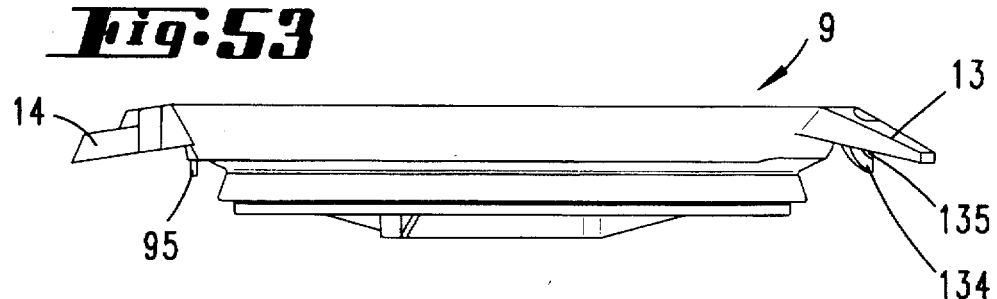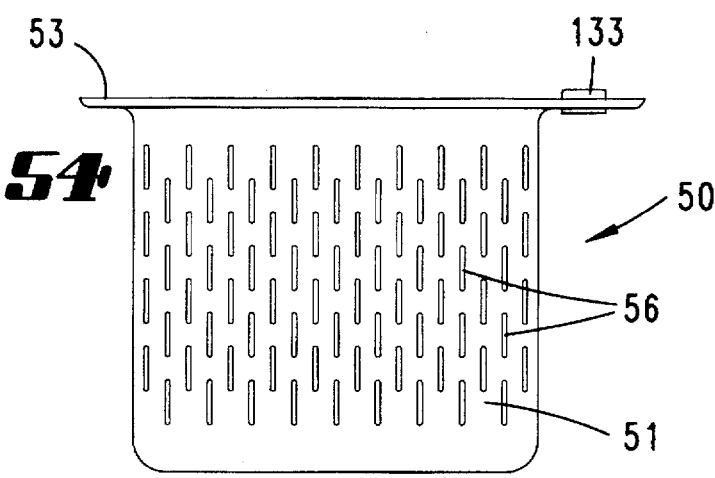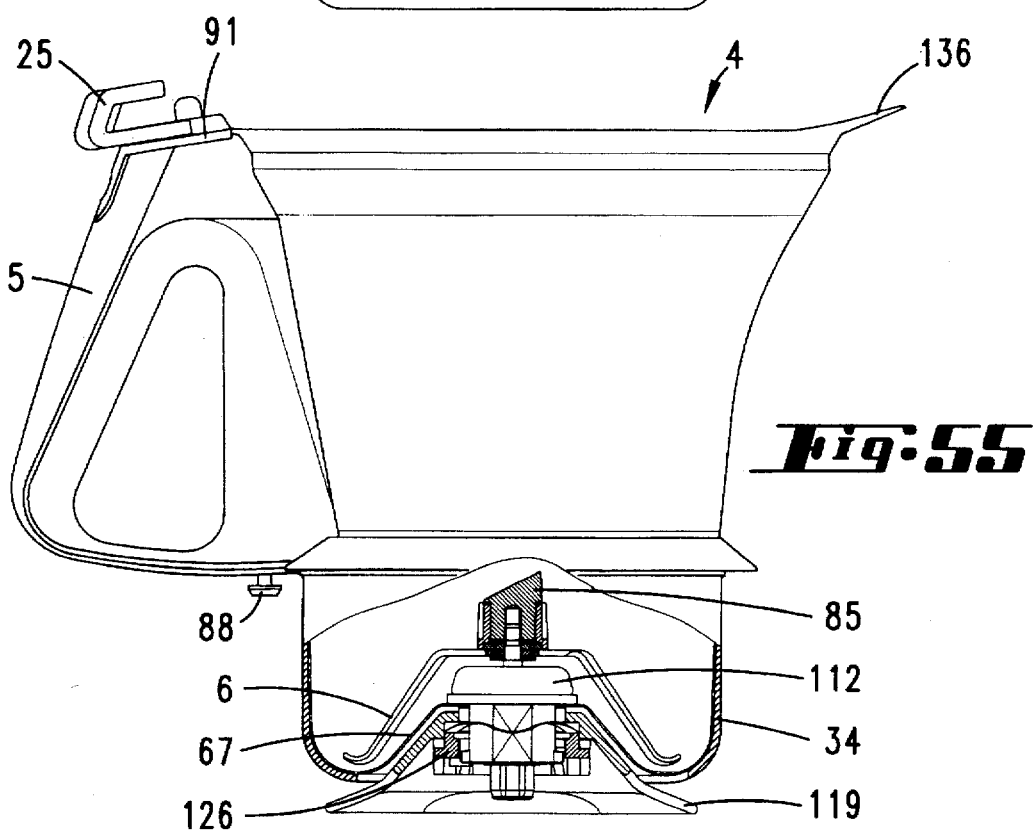

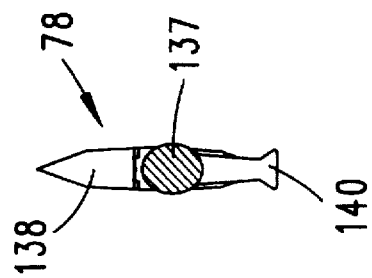
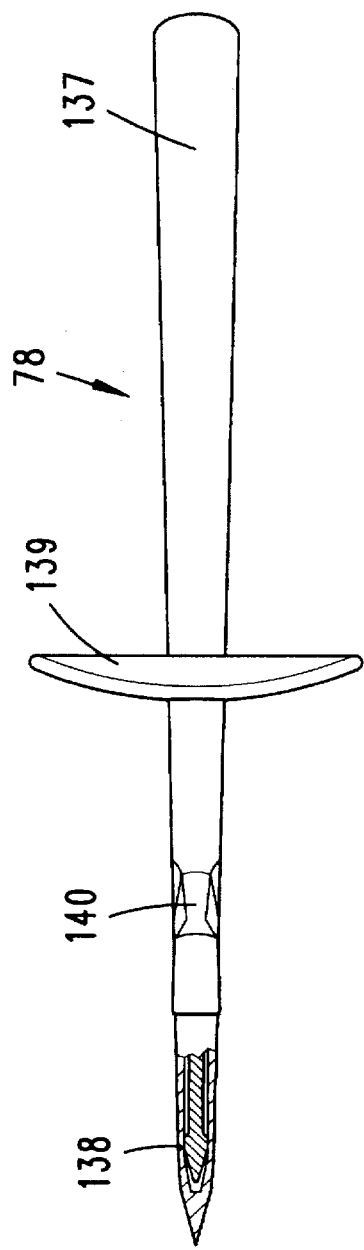
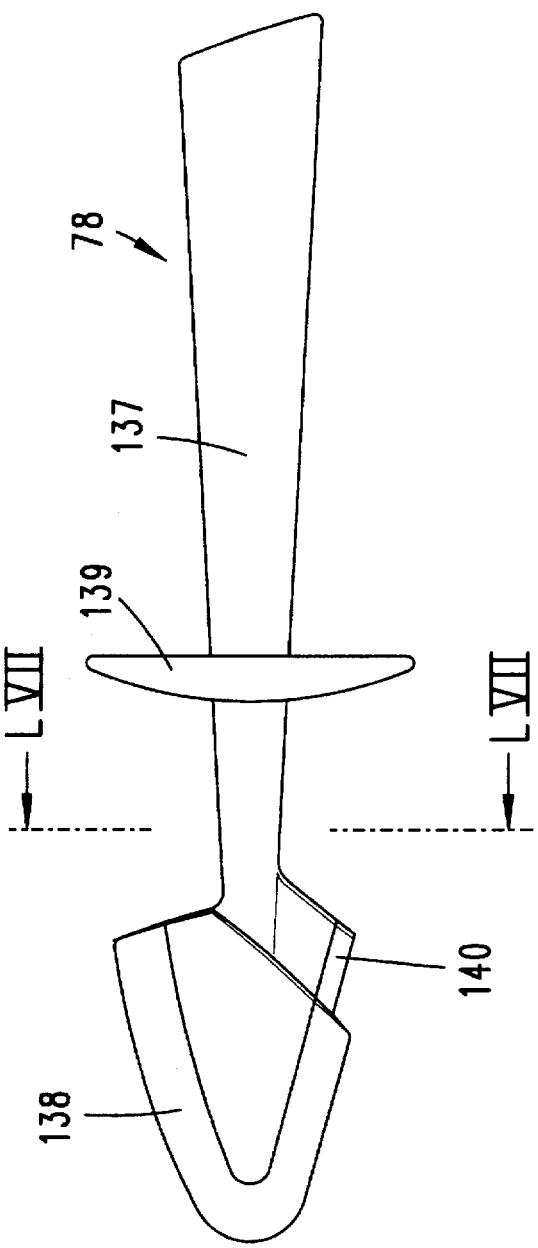

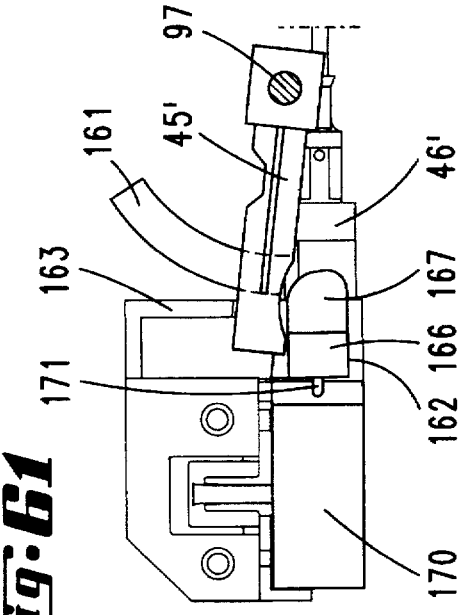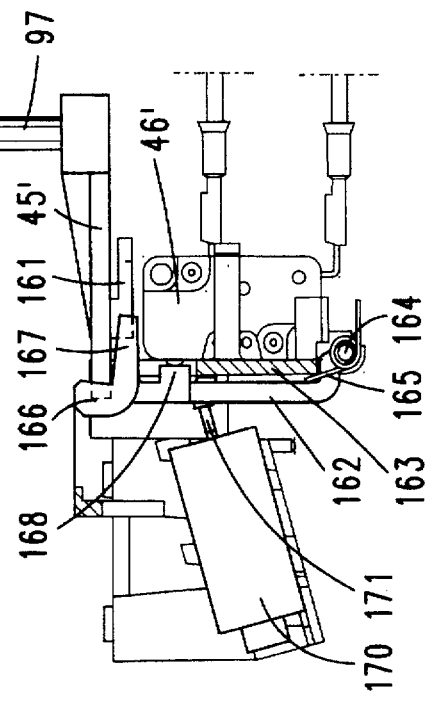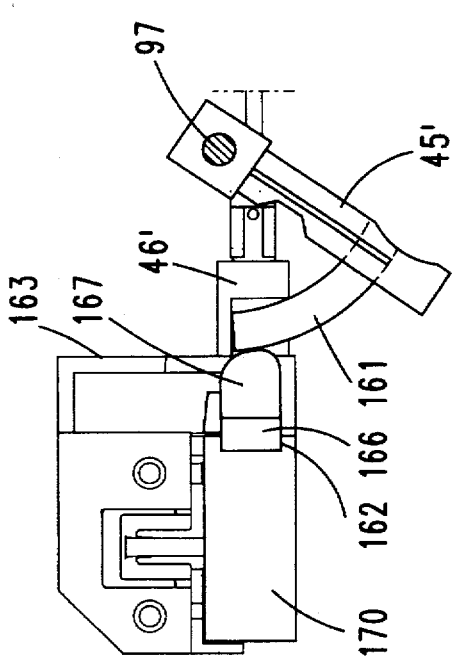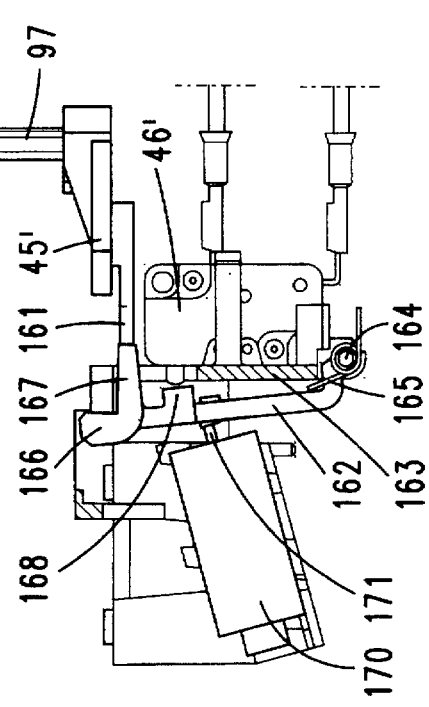

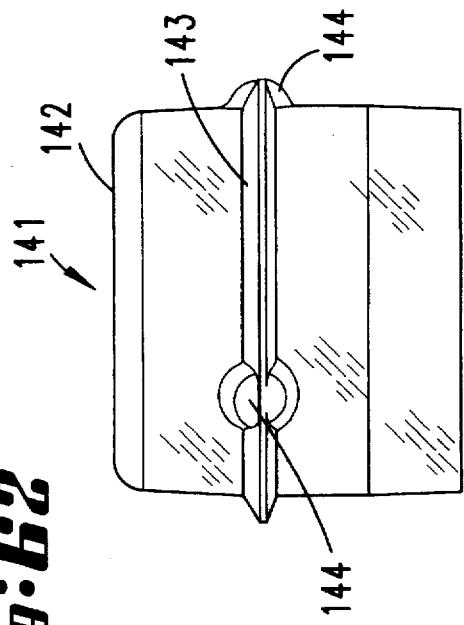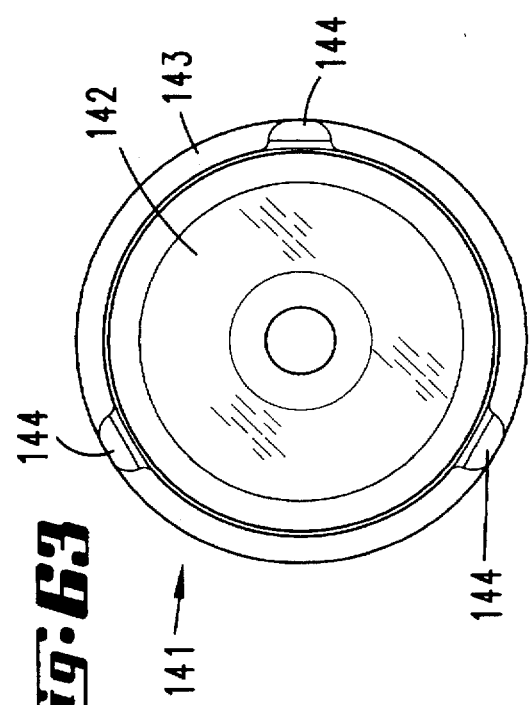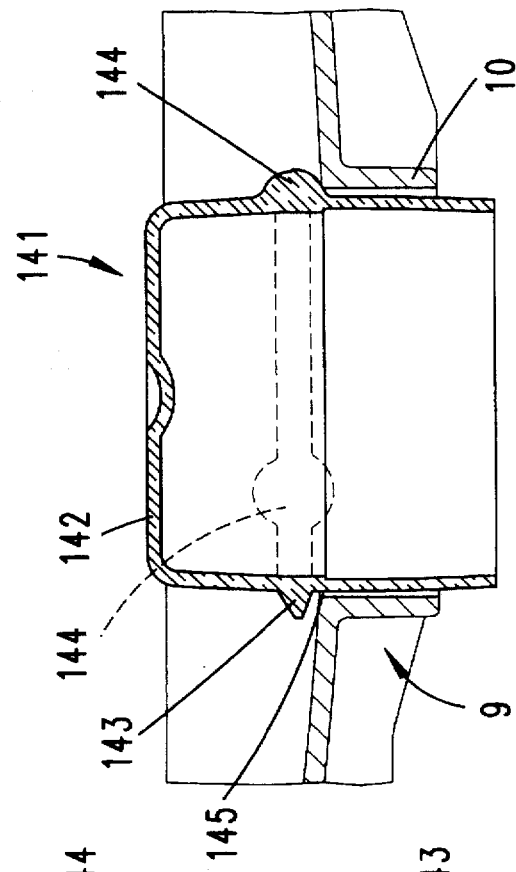

5,749,285

FOOD PROCESSOR

FIELD AND BACKGROUND OF THE INVENTION

The invention relates to a food processor comprising a mixing vessel and a drive for an agitator in the mixing vessel, the lower region of the mixing vessel having a substantially circular opening cross-section.

Such a food processor is known, for example, from German Patent 35 07 276. This food processor is also referred to as a thermomixer. The lower region of the mixing vessel can be heated up by means of a heating device which is incorporated in a mixing-vessel mount provided in the food processor and into which the mixing vessel can be inserted. In addition to the possibility of preparing food by mixing and/or chopping up, it is thus also possible to cook the food.

In the case of a food processor as has been assumed as known in the introduction, in addition to the requirement of the mixing vessel being able to receive a comparatively large volume, it is also the intention to design the mixing vessel as far as possible such that the stirred or mixed and/or chopped-up foodstuffs are mixed thoroughly in the mixing vessel. In this context, it is already known that the mixing vessel widens upwardly. In addition, a number of swirl-action ribs have already been provided on the periphery in such vessels.

SUMMARY OF THE INVENTION

It is an object of which the invention is based is to provide a food processor as has been described in the introduction so that it is easier to use.

This technical problem is solved first by it being provided that, in an upper region, the opening cross-section is elliptical, and that a centre point of the upper opening cross-section is offset with respect to a centre point of the lower opening cross-section. Thorough mixing of the foodstuffs is achieved by this change in shape of the interior of the mixing vessel over the vertical extent of the mixing vessel. Zones of more pronounced movement of the foodstuff and zones of lesser movement of the foodstuff are defined. Such a mixing vessel usually has a handle on one side. It is, then, preferred that the centre point of the upper opening cross-section is at a greater distance from the handle than the centre point of the lower opening cross-section. This means that the opening region of the mixing vessel has a certain extent of projection in a direction which is defined by an axis through the centre point of the opening cross-sections and the handle, this extent of projection extending away from the handle. Furthermore, it is also preferred that it is possible to distinguish, over a vertical extent of the mixing vessel, three different regions on the latter. First of all a lower, substantially cylindrical region, which is adjoined by a central region with substantially conical side surfaces, and an upper region whose opening cross-section is elliptical. The cylindrical region may, however, also be formed in a slightly conical manner, for example at an angle of approximately 1.6°. In this case, the transition from the circular opening cross-section to the elliptical opening cross-section can start actually in the central region. Specifically, the geometry of the mixing vessel here may also be arranged such that a wall of the mixing vessel extends curved in a vertical section in the offset direction of the centre point of the cross-section, but the opposite side—the handle side—is straight, although it does widen upwardly. The described geometry of the inner surface of the mixing vessel is indeed advantageous as regards the intended thorough mixing of the foodstuffs.

However, for the purposes of further improvement, it is provided that an inner wall surface of the mixing vessel in a horizontal cross-section provides an inwardly protruding step. In particular on the other side of this step may merge into the wall of the mixing vessel, running out smoothly into the wall. It is also possible, specifically, for a transition corresponding to a chamfer to be provided on the steep side of the step. This step is preferably provided in the central and upper regions of the mixing vessel. Overall, the step thus has a wedge-like structure which extends over one or two regions of the mixing vessel. In a further preferred manner, this step is also provided on only one side of the mixing vessel. To this extent, the mixing vessel is thus of a non-symmetrical configuration. Such a mixing vessel is usually also provided with a mixing-vessel lid. Furthermore, a mixing-vessel mount for the mixing vessel is provided in the food processor. In the case of the food processor described here, the lower, preferably also substantially cylindrical, region of the mixing vessel, is inserted into the mixing-vessel mount. In this context, the invention then also proposes that there be provided on the handle a securing device which makes it possible simultaneously to secure the mixing vessel in the food-processor mount and the lid on the mixing vessel. The securing device is specifically designed such that it can be actuated only when the mixing-vessel lid has been attached. For this purpose, it may be provided that a coupling rod has a locking protrusion which interacts with a locking link for turning-action blocking/release. When the mixing-vessel lid has not been attached, the locking protrusion interacts with the locking link such that turning-action blocking of the coupling rod prevails.

If, in contrast, the mixing-vessel lid is attached, then this effects release of the locking protrusion and an associated turning-action release of the coupling rod. In this context, it is, furthermore, proposed that the locking link be pivotably mounted. Attaching the mixing-vessel lid causes the locking link to be pivoted away from the locking protrusion, with the result that the latter is released. After this, the coupling rod can be turned. It is proposed according to the invention that the locking link can be displaced into a release position by an actuating protrusion formed on the mixing-vessel lid. This actuating protrusion may be a pin which projects out beyond the underside of the mixing-vessel lid. An arrangement in which two pins or actuating projections are provided is preferred here. These pass through corresponding bores of the handle, when the mixing-vessel lid is attached, and act on the locking link such that the latter pivots into a position in which it releases the locking protrusion. Furthermore, it may be provided that the locking link is spring-supported, the spring acting in a turning-action-blocking direction with respect to the locking protrusion, with the result that, due to the spring, this position is automatically obtained after the mixing-vessel lid has been lifted. In a preferred configuration, it may be provided that the locking link has a blocking pocket into which, in the locking position, the locking protrusion is driven. Furthermore, the securing device may be actuated, for example, in that attaching the mixing-vessel lid causes a securing pin to be pushed down into a turning-action-release position. Furthermore, the securing pin may, specifically, be guided in a bush which is in the form of a coupling rod and has an opening for a securing continuation of the securing pin.

As a result, the securing pin can be moved vertically relative to the bush. It is not necessary for the bush to be able to move vertically. After the securing pin has been pushed down, the configuration may, for example, specifically be such that the securing continuation is pushed into a groove in which it can carry out a turning movement or can accompany a turning movement of the securing pin. Alternatively, the design may also be such that pushing the securing continuation down causes the latter to be moved out of the groove which locks the said securing continuation. After this, the securing continuation, and thus also the securing pin, can be turned. Furthermore, the bush may be connected to the hand grip of the securing device, which may for example be of lever-like construction in regard to its actuating device. It is also essential that the bush or the coupling rod and the securing pin are located outside the mixing vessel, that is to say are preferably incorporated in an outer handle of the mixing vessel. Furthermore, as is described in more detail hereinbelow, the bush also interacts with a coupling part in the mixing-vessel mount, said coupling part being formed in extension of the bush, and, despite running obliquely, also in the region of the mixing-vessel mount outside the mixing vessel. For the purpose of securing the mixing vessel in the food processor and of securing the lid on the mixing vessel, it is not necessary for the mixing vessel to have a through-passage in its wall. In a further configuration, the coupling rod has, at its lower end, a positive-lock recess for the positively locking connection to the coupling part of the mixing-vessel mount.

When the mixing vessel has been inserted into the mixing-vessel mount, turning of the securing device thus simultaneously achieves actuation of the coupling part. In a further configuration of the subject matter of the invention, it may be provided that the securing pin is connected, as a lever continuation, in a rotationally fixed manner, to the coupling rod. In a turning-action-blocking position, the securing pin, in the form of a lever continuation, engages in a correspondingly formed opening of the handle. This blocking position can be released by attaching the mixing-vessel lid, in which case the securing pin of the previously described configuration is moved out of said blocking opening. For this purpose, it may be provided that the securing pin is spring-supported on the coupling rod. It is thus proposed, for example, that the blocking opening which receives the securing pin be formed to be open towards the outside, that is to say in the direction of the mixing-vessel lid, and that the mixing-vessel lid has an unlocking pin which engages in this opening. The latter causes the securing pin, in the form of a lever continuation, to be displaced out of the blocking opening, against a spring force. After this, a rotary movement of the the securing device can be effected. Furthermore, it may be provided that the coupling rod extends curved in the handle, the curvature running substantially towards a centre axis of the mixing vessel. Since the coupling rod runs in the handle, the configuration of the handle is directly dependent on the configuration of the coupling rod. Due to the curved arrangement of the coupling rod, it is thus possible to configure the handle such that the actual grip region is formed relatively close to the mixing vessel. Accordingly, relatively low lever forces occur, in particular in the case of a filled mixing vessel.

A preferred configuration here is one in which the coupling rod has two sections of curvature, one in the upper region and one in the lower region of the handle. In the upper region of the handle, a pronounced section of curvature is preferably provided in the direction of the centre axis of the mixing vessel. The second section of curvature, provided in the lower region of the handle, brings the coupling rod into a vertical position again for the purpose of coupling to the coupling part of the mixing-vessel mount. As regards this coupling, it is proposed that the coupling rod has a coupling end which projects from the bottom of the handle. This coupling end is formed in a manner corresponding to the upper end of the coupling-part associated with it. This end may, for example, have a positive-lock recess. However, a preferred configuration here is one in which the coupling end is configured in the manner of a hammer head. As has already been mentioned, it is provided, in a configuration according to the invention, that a coupling part is provided in the mixing-vessel mount for the purpose of connection to the coupling end of the coupling rod. The coupling part has a construction corresponding to the configuration of the coupling end. Upon a turning actuation of the securing device of the mixing vessel, the coupling part causes the mixing vessel to be clamped in the mixing-vessel mount. This results in the mixing vessel being retained in the mixing-vessel mount in a frictionally locking manner. The configuration preferred here is one in which the coupling part connects the coupling rod to a camshaft which causes the mixing vessel to be secured in the mixing-vessel mount. Upon turning of the coupling rod and of the coupling part, said camshaft causes, for example, a retaining sleeve to be expanded and the mixing vessel to be clamped by means of said sleeve.

A pivot movement, which is made possible after the mixing-vessel lid has been attached, of a locking lever on the handle thus causes turning of the coupling rod and associated turning of the coupling part and of the camshaft connected thereto. It is specifically proposed for this purpose that the coupling part comprise a coupling bush which is pushed onto the top of the camshaft. In order to transmit the turning movement of the coupling part to the camshaft, a positively locking connection is provided here between the coupling bush and the camshaft, for which purpose, for example, the coupling bush engages in a corresponding recess of the camshaft by means of a cross-member. Furthermore, it is proposed that the coupling bush can be displaced vertically counter to a spring on the camshaft. The positive lock is always present between coupling bush and camshaft in the region of this displaceability. The spring preferably acts in the direction of the disposition of coupling with the coupling end of the coupling rod. Accordingly, the coupling bush is always biassed in the direction of the coupling disposition. When the mixing vessel is attached in the mixing-vessel mount and, associated with this, the coupling end is forced onto the coupling bush, the latter can be displaced vertically counter to the spring on the camshaft, without losing the positively locking engagement with the camshaft. Consequently, it is possible, for example, to allow for any manufacturing tolerances as regards the coupling-rod length. Furthermore, it is proposed that the coupling bush has a blocking sleeve which is coupled vertically to the coupling bush, but can be rotated relative to the coupling bush. By means of said blocking sleeve, the coupling end of the coupling rod is engaged after pivoting, with the result that, in this position, the coupling rod is prevented from being pulled out.

As has already been mentioned, upon turning of the coupling rod, the coupling bush, and thus also the camshaft, are rotated. In contrast, the blocking sleeve remains in its original alignment, but, due to the vertical coupling to the coupling bush, can accompany the vertical movement. It is specifically proposed for this purpose that the blocking sleeve has a shaped opening adapted to the hammer-head configuration of the coupling end of the coupling rod. When the mixing vessel is inserted into the mixing-vessel mount, the hammer-head-formed coupling end of the coupling rod passes through the shaped opening of the blocking sleeve and acts on the coupling bush of the coupling part. In this arrangement, the coupling bush and the blocking sleeve coupled thereto are displaced vertically against the spring on the camshaft. After passing through the blocking sleeve, the coupling end engages in a correspondingly shaped recess of the coupling sleeve in order to define a rotationally fixed positive lock. Upon rotation of the coupling rod, this positive lock causes the coupling bush, and thus also the camshaft, to rotate as well. The blocking sleeve, in contrast, cannot be rotated, for example, due to anti-turning securing pins provided on the housing. After turning has been completed, a blocking position is assumed, in which the hammer-head-formed coupling end has been turned with respect to the shaped opening of the blocking sleeve so as to prevent the coupling end from being pulled out of the coupling part, and thus the coupling from being released, without prior turning of the coupling rod into a release position. Use is made here of the keyhole principle.

Furthermore, it is advantageous here for there to be no mechanical connection between the food-processor housing and all the other components when the mixing vessel has been attached. Manufacturing tolerances in the vertical direction are compensated for since the coupling formed penetrates into the housing by the application of force by means of the coupling end. The housing opening for the passage of the coupling end of the coupling rod may be of such a size that tolerances in the horizontal direction do not result in any contact between coupling rod and housing. The special shaping of the blocking sleeve means that the user is forced to turn the coupling rod or the coupling end fully into the basic position in order to remove the mixing vessel from the mount. Without this special configuration in the form of a keyhole, it would be possible for a sleeve for retaining the mixing vessel to be expanded by partial rotation of the camshaft and for the mixing vessel to be removed. The coupling end would become disengaged from the coupling bush, whereupon, as a result of any spring biassing, the sleeve would spring shut again. The mixing vessel would be clamped in this position, in which case it would not be possible for the sleeve to be expanded again by the user. As a result of the previously described configuration, such malfunctioning is not possible since the blocking sleeve is fitted directly onto the coupling bush and it is only possible for the coupling end to be disengaged from the coupling bush when a locking lever which actuates the coupling rod is displaced fully into the basic position; otherwise, the blocking sleeve and coupling bush unit is pulled upwards by the hammer-head-formed coupling end until said unit is supported on the appliance housing. It is furthermore advantageous here, when a weighing means is used, that the weighing result is not influenced when a mixing vessel has been inserted.

As a result of the configuration mentioned, the entire securing device including the coupling bush and blocking sleeve is fully isolated from the housing. In a preferred configuration, it is provided that the blocking sleeve provides sealing bead at the top for the purpose of interacting with the housing in a sealing manner. The preferred configuration here is one in which the seal is activated when the mixing vessel has been removed and is deactivated when the mixing vessel has been attached. If the mixing vessel has been attached, then the blocking sleeve together with the coupling bush, as has already been mentioned, is displaced away from the housing opening, in the vertical direction against the spring on the camshaft. If the mixing vessel is removed, then, as a result of the vertically acting spring, the coupling bush and blocking sleeve unit is displaced in the direction of the housing opening, with the result that the sealing bead of the blocking sleeve surrounds the housing opening. It may be provided here, for example, that the housing opening is of conical form on the inside, that is to say facing the blocking sleeve, and that the blocking sleeve has a correspondingly formed sealing bead. When the mixing vessel has been removed, the cones of the housing opening and of the blocking sleeve grip one inside the other and seal the joint. The driver pocket provided in the coupling bush is closed towards the bottom, that is to say towards the interior of the appliance. It is thus possible for any water or condensate accumulating on the appliance housing to pass only into the driver pocket of the coupling bush, but not into the interior of the housing. The coupling part is, specifically, connected to an expansion toggle which, upon actuation, releases biassing forces of a spreading member which clamps the mixing vessel in the mixing-vessel mount.

When the securing device is thus located in a position in which the mixing vessel can be removed from the mixing-vessel mount, the expansion toggle is in a spreading disposition and the clamping element has a maximum inner clamping. Specifically, the clamping member may be incorporated into a sleeve-like heating element. Furthermore, it is preferably provided that connected to the securing device is a securing lever whose movement is utilized in order to actuate a safety switch. For this purpose, it may be provided, for example, that the movement of the securing lever can be detected by the safety switch. Detection of a movement of the securing lever into its securing position can be utilized for switching off the agitator and also, if appropriate, the heating device. In this manner, it may be ensured that the agitator and the heating device can be actuated only when the mixing vessel has been secured in the mixing-vessel mount. Furthermore, the above-described measure where actuation of the securing device is only possible when the mixing vessel is provided with a mixing-vessel lid also ensures, at the same time, that the mixing-vessel lid cannot be removed from the mixing vessel during operation of the agitator. In one configuration of the subject matter of the invention, it may be provided that the safety switch can be actuated by a separate momentary-contact switch which interacts with the securing lever. The safety switch, which is preferably a contact switch, is actuated by means of the momentary-contact switch, which interacts with the securing lever, after the mixing vessel has been inserted into the mixing-vessel mount and after the securing device has been actuated. It is only after the securing device has been actuated that the securing lever permits the momentary-contact switch to actuate the safety switch.

This is achieved in that the safety lever has a blocking link which, in dependence on a turning angle of the securing lever, permits the contact actuation of the safety switch by the momentary-contact switch. If the securing lever is located in a basic position, i.e. when the mixing vessel has not been inserted and/or the mixing-vessel lid has not been attached, then the blocking link prevents actuation of the safety switch by the momentary-contact switch. The latter is blocked by the blocking link of the securing lever. If, in this position, an attempt is made to activate the agitator, then this attempt is not successful, since the safety switch does not allow release. For example, the power supply to the agitator can be interrupted by means of the safety switch. Furthermore, said safety switch can also interrupt the power supply to a heating device. It is only after the mixing vessel has been inserted correctly into the mixing-vessel mount and the mixing-vessel lid has been attached that the securing device, as described, can be actuated. A turning movement of the securing lever also takes place here, in which case, after an end position has been reached, the momentary-contact switch leaves the region of the blocking link and actuates the safety switch. The agitator and, if appropriate, also the heating device are activated thereafter. If an attempt is made to remove the mixing-vessel lid during operation, the securing device is actuated back into the basic position again. This also causes the securing lever to be pivoted back, in which case the blocking link lifts the momentary-contact switch from the safety switch, which results in the power supply of the agitator and/or of the heating device being interrupted. In a development of the subject matter of the invention, it is provided that, in dependence on a rotational movement of the drive or of a cutter assembly, the momentary-contact switch is forced into its actuating position.

After the mixing vessel and the mixing-vessel lid have been attached and the securing device has been actuated thereafter, the securing lever, with its blocking link, leaves the region blocking the momentary-contact switch, as has already been mentioned. If the agitator drive is switched on, this now causes the momentary-contact switch to be displaced in the direction of the safety switch, in order to actuate the latter. It is only after this that the agitator starts up. For this purpose, it is proposed that the forcing action be effected by an electromagnet. The latter is activated when the agitator is switched on. The electromagnet is preferably provided with a push rod which, upon activation of the electromagnet, moves out and pushes against the momentary-contact switch. As a result, the momentary-contact switch is moved in the direction of the safety switch. If the securing device has not yet been pivoted into a release position, then the momentary-contact switch comes against the blocking link of the securing lever. As soon as said blocking link has left the region blocking the momentary-contact switch, the latter acts on the safety switch. It is provided that the electromagnet is not demagnetized directly after the agitator has been switched off. Rather, it is proposed that the electromagnet is demagnetized only after the cutters have come to a standstill. For this purpose, it is possible to provide a speed sensor which senses the rotary movements of the agitator. Furthermore, it is also provided that the securing lever can be locked in its securing position. This is provided as an additional safeguard in order also to ensure in mechanical terms that unlocking and removal of the mixing vessel out of the mixing-vessel mount are only possible when the agitator and, if appropriate, the heating device, have been turned off.

The mixing-vessel lid may, for example, be located on the mixing vessel such that the lid is held in the locked position by the locking lever on the handle side and is hooked to the mixing vessel on the side located opposite the handle. For this reason, it may be provided that the mixing-vessel lid has a cross-member provided with a slot and that the mixing vessel has a tongue, the tongue engaging in the slot when the mixing-vessel lid has been attached. In order to attach the mixing-vessel lid, the latter is levered onto the mixing vessel such that the tongue, which may also be formed as a pouring spout, engages in the slot of the cross-member on the mixing-vessel lid. After this, the mixing-vessel lid is pivoted in the direction of the mixing-vessel handle, in which region the lid can be locked by means of the coupling locking lever. Furthermore, the invention also relates to a cooking insert which can be disposed in the mixing vessel with the mixing-vessel lid gripping over it. Specifically, the cooking insert is preferably formed such that it has a substantially conical or cylindrical wall and a collar which extends substantially at right angles to the wall. Both the wall and the collar have through-passages, with the result that vapours produced in the mixing vessel, in particular by activation of the heating device, can permeate any foodstuffs located in the cooking insert. Preferably, these through-passages also make it possible for food (e.g. rice) to be rinsed with boiling water or the like. In particular, the through-passages in the wall are also advantageous in that, when a cooking insert has been inserted, liquid located in the mixing appliance can be readily poured out through the cooking vessel, since it is even possible for the liquid to flow through the abovementioned collar due to the openings.

When liquid is poured out, solid constituents contained therein are efficiently retained by the cooking insert. Furthermore, it is also possible for the cooking insert to be inserted into the mixing vessel before fruit, for example, is chopped up. This results in an increased amount of juice being produced, since the fruit cannot pass into the upper part of the mixing vessel and is thus subjected to more intensive processing by the cutters. Furthermore, a hook or a bar behind which it is possible to engage is also preferably provided on the cooking insert. It is thus possible to hold the cooking insert, which is not locked in the mixing vessel to any greater extent, by a holding-down device or the like, while liquid is poured out of the mixing vessel with the cooking insert inserted therein. The abovementioned collar has a surface area bounded in an elliptically-shaped manner, while the wall of the cooking insert preferably has a substantially circular opening cross-section. In a comparable manner to that which has in fact been described above in relation to the geometry of the mixing vessel, a centre point of the ellipse of the collar surface area is offset with respect to a centre point of the wall of the cooking insert or of a—preferably also substantially circular—base of the cooking insert. Specifically, the offset is preferably provided in the same direction as has been described above in respect of the mixing vessel. Furthermore, within the context of the invention, a whipping attachment, in particular a cream-whipping device, is also preferably provided. This is distinguished in that it has a plug-in mount for the purpose of plug-in connection to a cutter assembly of the agitator. Unlike the known agitators, it is not necessary, for the purpose of installing the whipping attachment, to remove the cutters from the mixing vessel first of all.

It is not necessary to demount the cutter assembly in order to use the whipping attachment. Rather, the whipping attachment may simply be plugged on to the cutters from above. The capacity for vertical movement which remains for the whipping attachment is not detrimental. However, the latter is secured rotationally by the positively locking mount. Moreover, a latching means may be provided for the vertical movement. Furthermore, the whipping attachment is preferably distinguished, specifically, in that it is formed to have increasing flexibility in the radial direction. The whipping attachment is also preferably of a blade-like construction, it being perforated, or it may be of an overall grille-like construction. The whipping attachment may be produced as a plastics injection moulding. In one configuration of the subject matter of the invention, it is provided that the cutter assembly is operatively connected in non-releasable manner to a cutter bearing, and that the cutter bearing passes through the mixing-vessel base and can be fastened on the mixing vessel. This configuration ensures that, when the cutter assembly is exchanged, it is always the unit comprising the cutter assembly and cutter bearing which is exchanged. The user cannot release the connection between the cutter assembly and the cutter bearing. It is provided here, specifically, that a sealing ring is provided between a shoulder of the cutter bearing and the mixing-vessel base, which ring has a sealing action in the axial direction between the cutter bearing and the mixing-vessel base. It is thus not possible for any liquid to pass out of the mixing vessel. The cutter bearing is secured on the mixing-vessel base by means of a stand which provides counter-support on the outside. Defined loading for the abovementioned seal is provided by the stand, which, for example, at two laterally projecting spigots on the cutter bearing, pushes the latter downwards against the vessel base. In this case, the stand is supported against the underside of the vessel base.

In order to render the contact-pressure force virtually independent of tolerances, a spring-biassed latching ring is secured in the stand. This latching ring is in positively locking contact with the spigots of the cutter bearing. A preferred configuration here is one in which the stand can be locked with respect to the cutter bearing in the manner of a bayonet closure. For this purpose, it may be provided that, after it has been inserted into the mixing-vessel base, the cutter bearing is retained in a rotationally fixed manner on the base. After this, the stand is attached on the underside and the stand is turned thereafter into the locking position. Furthermore, it is proposed that the stand be a plastics part. The stand may thus also serve as a set-down surface of the mixing vessel. In all cases, the temperature of the stand is considerably lower than that of the mixing vessel, thus also making it possible for the hot mixing vessel to be positioned on surfaces which are not heat-resistant, for example wood. Furthermore, within the context of the invention, a mixing-vessel spatula is also preferred, the latter having a removal protrusion for interacting with an insert vessel. The mixing-vessel spatula may be the holding-down device which has already been mentioned. In order to remove an insert vessel, for example a cooking insert, from the mixing vessel, the mixing-vessel spatula may be inserted such that its removal protrusion engages behind a cross-member or the like on the insert vessel. By means of this arrangement, the insert vessel can be removed from the mixing vessel without the user coming into direct contact with the insert vessel, which may be hot. Furthermore, the mixing-vessel spatula in conventional form can be used for preparing a dough, mix or batter, in that the spatula is passed through the mixing-vessel lid opening into the mixing vessel and, accordingly, is held in the dough, mix or batter which is to be mixed. In a preferred configuration, it is provided that the removal protrusion is configured in the form of a dovetail.

Furthermore, it is proposed that the removal protrusion be provided above a spatula region, such that it substantially adjoins the said region. More specifically, it is proposed that the mixing-vessel spatula has a spatula handle, and that a plate-like handle-region boundary be provided on the spatula handle. According to the invention, the spatula region, and accordingly also the removal protrusion, are located on the far side of the plate-like handle-region boundary. If the mixing-vessel spatula is used, for example, as a holding-down device while liquid is poured out of the mixing vessel with the cooking insert inserted therein, then the plate-like handle region boundary prevents any liquid or condensate from running off along the spatula handle, which could result in scalding. This liquid or condensate is stopped by the handle-region boundary and trickles off from this. It is advantageously provided that the mixing-vessel spatula is formed in two parts, the spatula region being formed separately. For this purpose, it is proposed that the spatula region consist of a more pliable plastics than the spatula handle and the removal protrusion. Finally, it is provided that the insert vessel has a receiving eyelet, and that the receiving eyelet is in the form of a dovetail. This configuration provides a positively locking engagement of the removal protrusion in the receiving eyelet for the purpose of removing the insert vessel from the mixing vessel.

BRIEF DESCRIPTION OF THE DRAWINGS

FIG. 18 shows, partially in section, a detail view of the mixing-vessel mount, likewise relating to a first embodiment;

FIG. 19 shows a view according to FIG. 18, the expansion toggle being in its expanded disposition;

FIG. 20 shows an illustration according to FIG. 18, in a section plane located perpendicularly thereto, for the expansion toggle placed in its expanded disposition;

FIG. 21 shows a detail enlargement from the illustration according to FIG. 20;

FIG. 22 shows an illustration according to FIG. 20, the expansion toggle being in a release disposition;

FIG. 23 shows a detail representation from the illustration according to FIG. 22;

FIG. 24 shows a detail representation of the securing lever from the illustration according to FIGS. 18 and 19;

FIG. 25 shows an illustration according to FIG. 24, the securing lever being in the securing position;

FIG. 34 shows a detail illustration in perspective of a mixing-vessel spatula in a first embodiment;

FIG. 35 shows a side view of a cream-whipping device in detail representation, relating to a second embodiment;

FIG. 36 shows an end view of the cream-whipping device;

FIG. 37 shows a plan view of the cream-whipping device;

FIG. 38 shows a bottom view of the cream-whipping device;

FIG. 39 shows a sectional illustration, corresponding to FIG. 17, of the mixing vessel with the mixing-vessel lid attached and the cream-whipping device inserted, illustrating a locked position of a securing device in a second embodiment;

FIG. 39a shows a detail representation from FIG. 39, but relating to the unlocked position;

FIG. 40 shows a further embodiment of the securing device in the locked position;

FIG. 40a shows an illustration corresponding to FIG. 39a, but relating to the embodiment according to FIG. 40;

FIG. 40b shows the section according to the line XLb—XLb in FIG. 40a;

FIG. 41 shows an enlarged detail representation relating to a bottom view of the mixing-vessel handle in the region where a coupling rod passes through it;

FIG. 42 shows a sectional detail representation of the mixing-vessel mount in the region of a coupling part, in the coupled position, relating to a second embodiment;

FIG. 43 shows the section according to the line XLIII—XLIII in FIG. 42;

FIG. 50 shows an end view, corresponding to FIG. 27, of a cooking insert relating to a second embodiment;

FIG. 51 shows, partially in section, a detail representation from FIG. 50, relating to the region LI—LI;

FIG. 52 shows a plan view of the cooking insert according to FIG. 50;

FIG. 53 shows a side view, corresponding to FIG. 5, of a mixing-vessel lid in a second embodiment;

FIG. 54 shows a side view of the cooking insert according to FIGS. 50 to 52;

FIG. 55 shows, partially in section, a side view, corresponding to FIG. 12, of the mixing vessel according to FIG. 39;

FIG. 56 shows a mixing-vessel spatula in a side view of a second embodiment;

FIG. 57 shows a bottom view of the mixing-vessel spatula;

FIG. 58 shows the section according to the line LVIII—LVIII from FIG. 56;

FIG. 60 shows a detail illustration of a securing device in a blocking position relating to a second embodiment;

FIG. 60a shows, partially in section, a side view of FIG. 60;

FIG. 61 shows an illustration, corresponding to FIG. 60, of the securing device, but showing a release position;

FIG. 61a shows an illustration corresponding to FIG. 60a, but relating to the position according to FIG. 61;

FIG. 62 shows a side view of a lid cap;

FIG. 63 shows the lid cap in plan view; and

FIG. 64 shows a sectional illustration through the region of a mixing-vessel-lid opening when the lid cap has been attached.

DETAILED DESCRIPTION OF THE PREFERRED EMBODIMENTS

Figure 1:
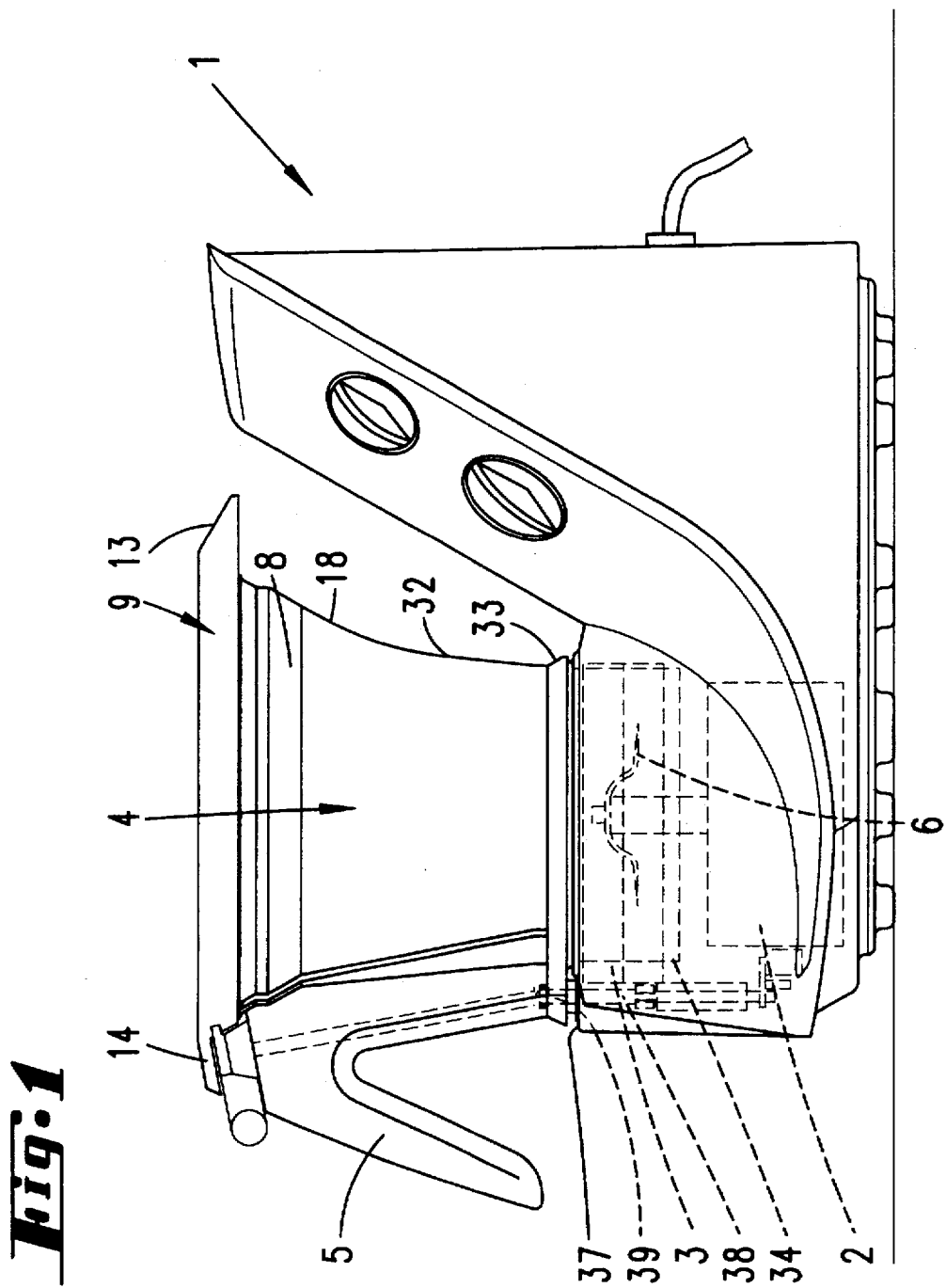
FIG. 1 shows a side view of the food processor with the mixing vessel inserted therein.

A food processor 1 is illustrated and described—first of all with reference to FIG. 1—which has an agitator drive 2, not illustrated in any more detail, in the form of an electric motor. A mixing vessel 4, which has a handle 5, is received in a mixing-vessel mount 3.

Figure 2:
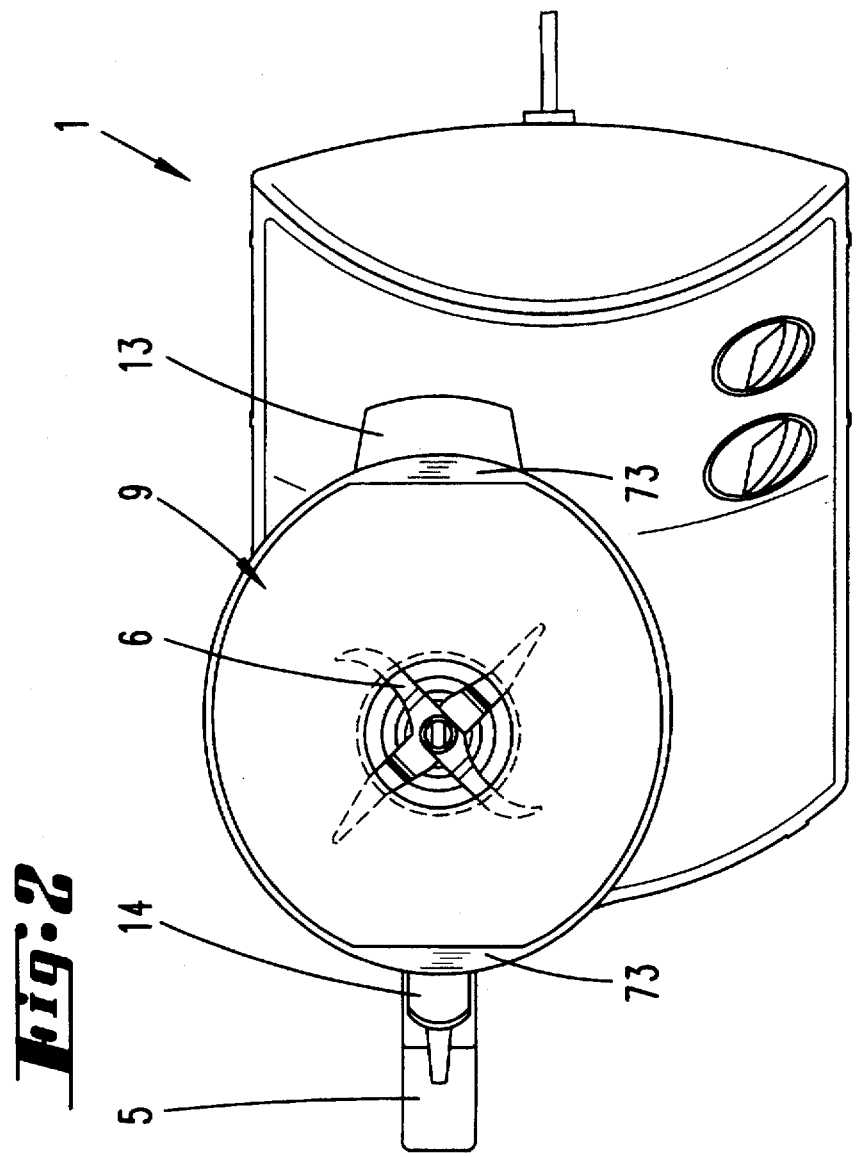
FIG. 2 shows a plan view of the food processor according to FIG. 1.

As can be seen from the plan view according to FIG. 2, a cutter mechanism 6 is located in the mixing vessel 4. The cutter mechanism 6 may also be exchanged and replaced by another cutter mechanism.

Figure 3:
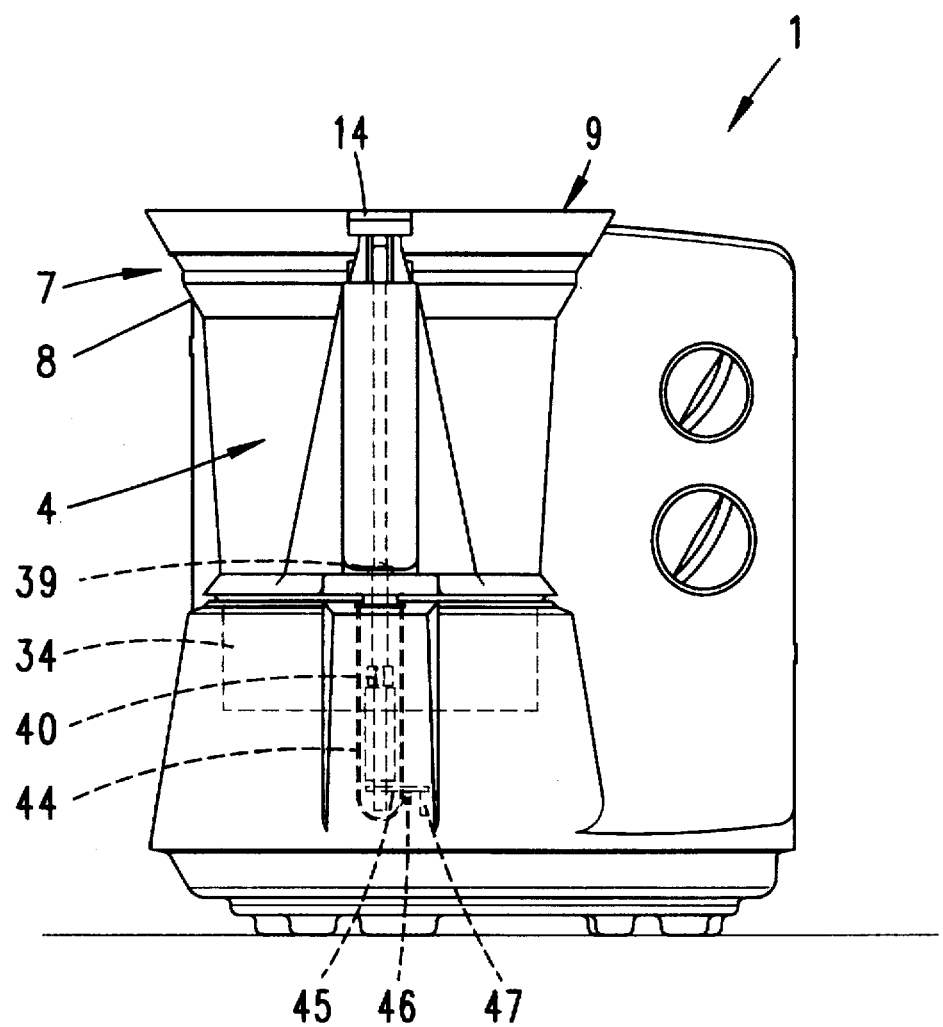
FIG. 3 shows an end view of the food processor according to FIGS. 1 and 2.

It can be seen from the illustration according to FIG. 1, but also from the end view according to FIG. 3, that, at its upper rim 7, the mixing vessel 4 is formed such that it widens by way of a conical shoulder 8.

Figure 4:
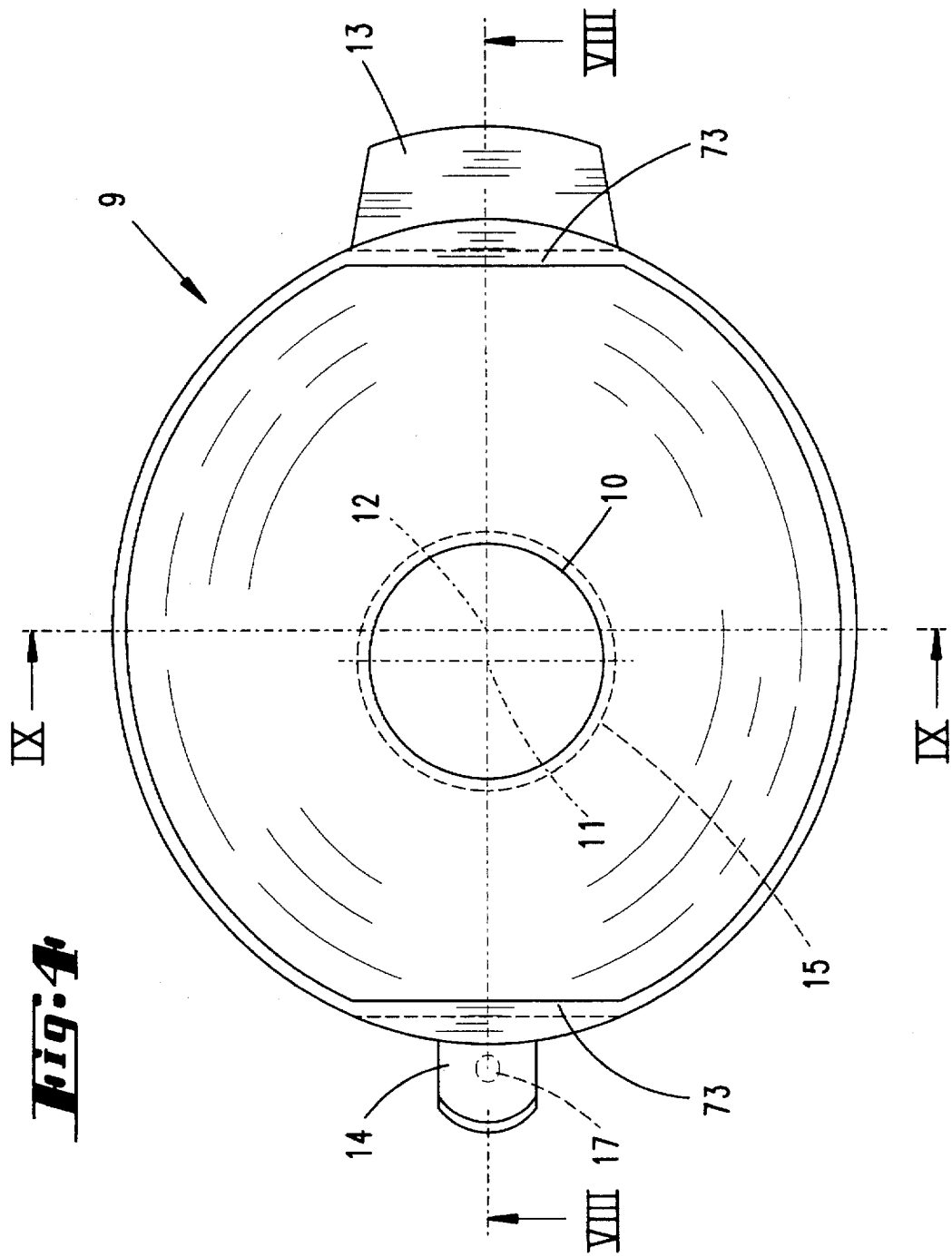
FIG. 4 shows a plan view of the mixing-vessel lid.
Figure 5:
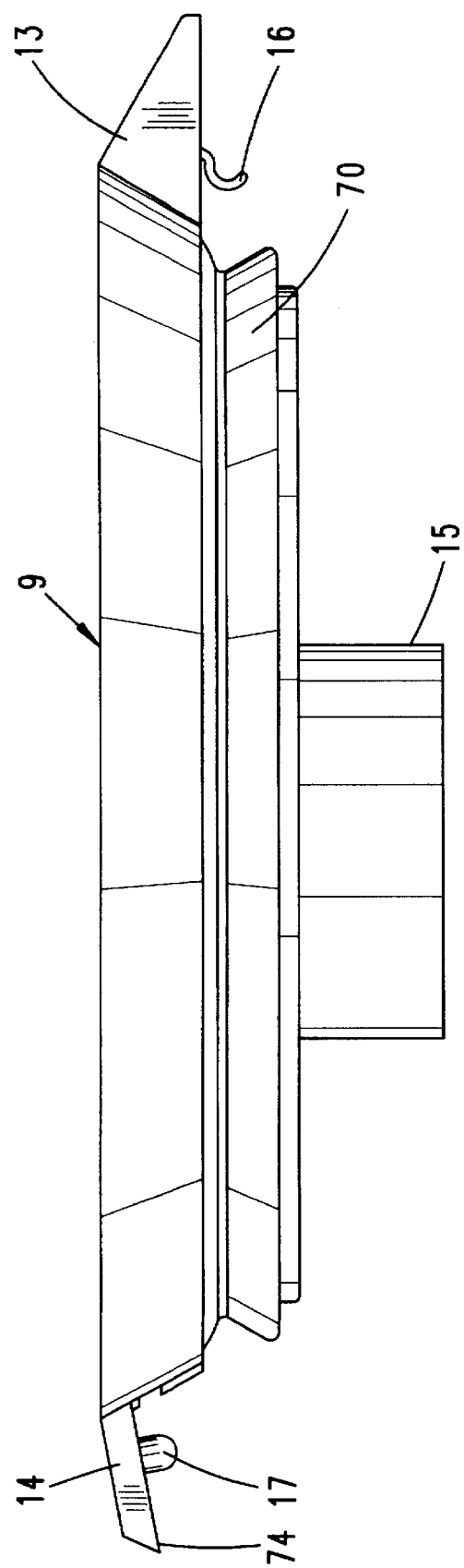
FIG. 5 shows a side view of the mixing-vessel lid relating to a first embodiment.

A mixing-vessel lid 9 is illustrated in plan view in FIG. 4. It has a substantially circular opening 10. The circular opening 10 has a centre point 11 which is offset with respect to a geometrical centre point 12 of the mixing-vessel lid 9. The mixing-vessel lid 9 has an elliptical surface area. Formed at the ends of the mixing-vessel lid 9 which are associated with the greater axis of the surface area, is, on one side, a hand grip 13 and, opposite this, a protrusion grip 14, which is explained in detail hereinbelow. As can also be seen from the side view according to FIG. 5, a locking hook 16 is formed on the underside of the hand grip 13 and, when the mixing vessel lid has been attached onto the mixing vessel, engages in a corresponding locking opening in the mixing vessel 4. Furthermore, it can also be seen that the opening 10 is adjoined by a downwardly projecting cylindrical continuation 15 which, when the lid has been attached, projects into the interior of the mixing vessel 4. The protrusion grip 14 has a downwardly projecting spigot 17. The latter interacts with the securing device, as is explained in more detail hereinbelow.

Figure 6:
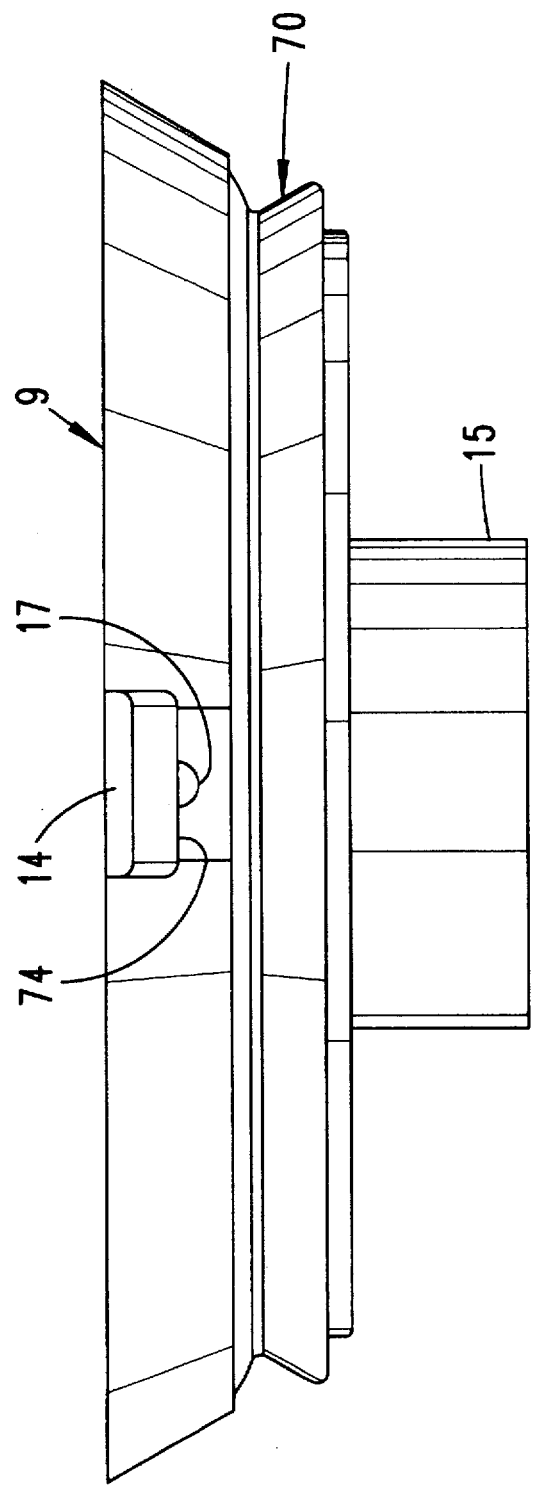
FIG. 6 shows an end view of the mixing-vessel lid.

FIG. 6 shows the end view of the mixing-vessel lid 9, on the side of the protrusion grip 14. Taking FIGS. 5 and 6 together, it is possible to see, specifically, a peripheral centring edge 70 which, in the inserted condition, is located in the interior of the mixing vessel 4. Furthermore, it is possible to see, specifically, from FIG. 8, that the centring edge 70 consists of a relatively pliable plastics which is either moulded on in the two-component process or, as a ring, is fitted onto the structure of the mixing-vessel lid 9 or is inserted into the recess illustrated. Specifically, the centring edge 70 has a protruding lip 71 which protrudes in the form of a V with respect to a solid region 72 of the centring edge 70. If a liquid is in contact with the seal, then this pushes against the inside of the sealing lip 71, thus increasing the contact-pressure force against the mixing vessel 4.

Figure 7:
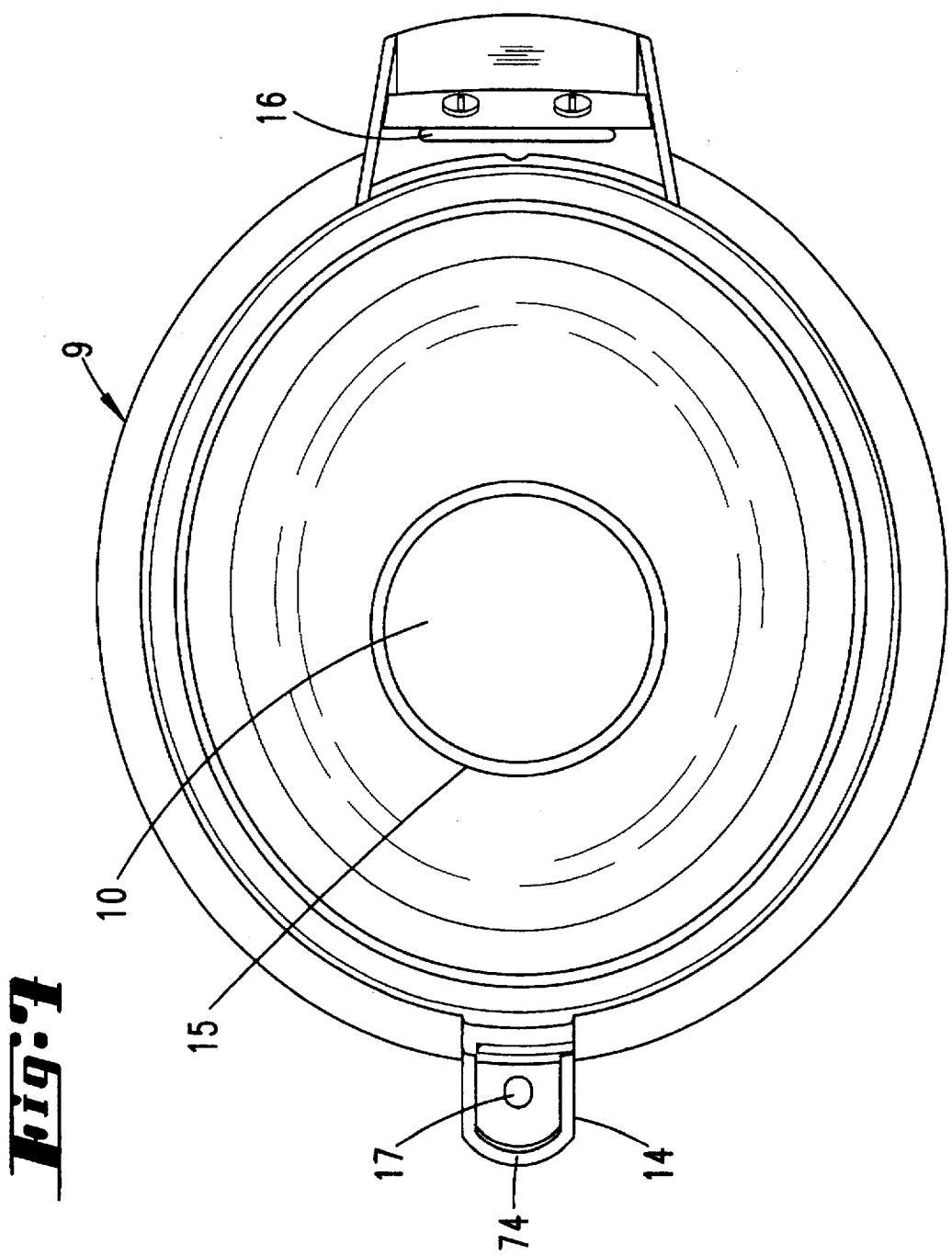
FIG. 7 shows a bottom view of the mixing-vessel lid.

It can be seen from the bottom view of the mixing-vessel lid 9 illustrated in FIG. 7 that the centring edge 70 has a geometrically identical progression, although on a smaller scale, to the surface area of the mixing-vessel lid 9. It is thus also adapted to an opening cross-section of the mixing vessel 4 in the upper region, as is illustrated in detail hereinbelow.

Figure 8:
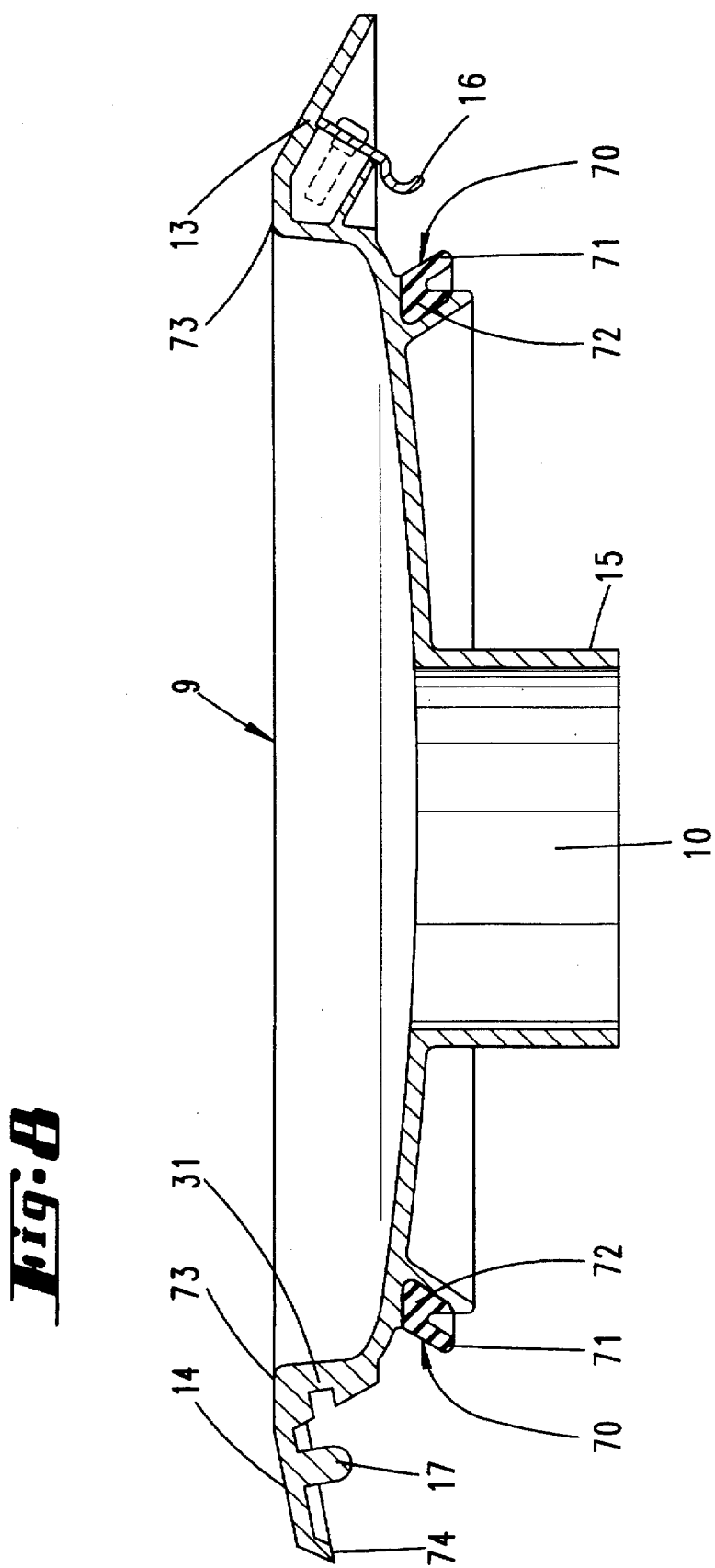
FIG. 8 shows a cross-section through the mixing-vessel lid.

FIG. 8 shows a section through the mixing-vessel lid in the direction of the greater axis of the elliptically-shaped surface area.

Figure 9:
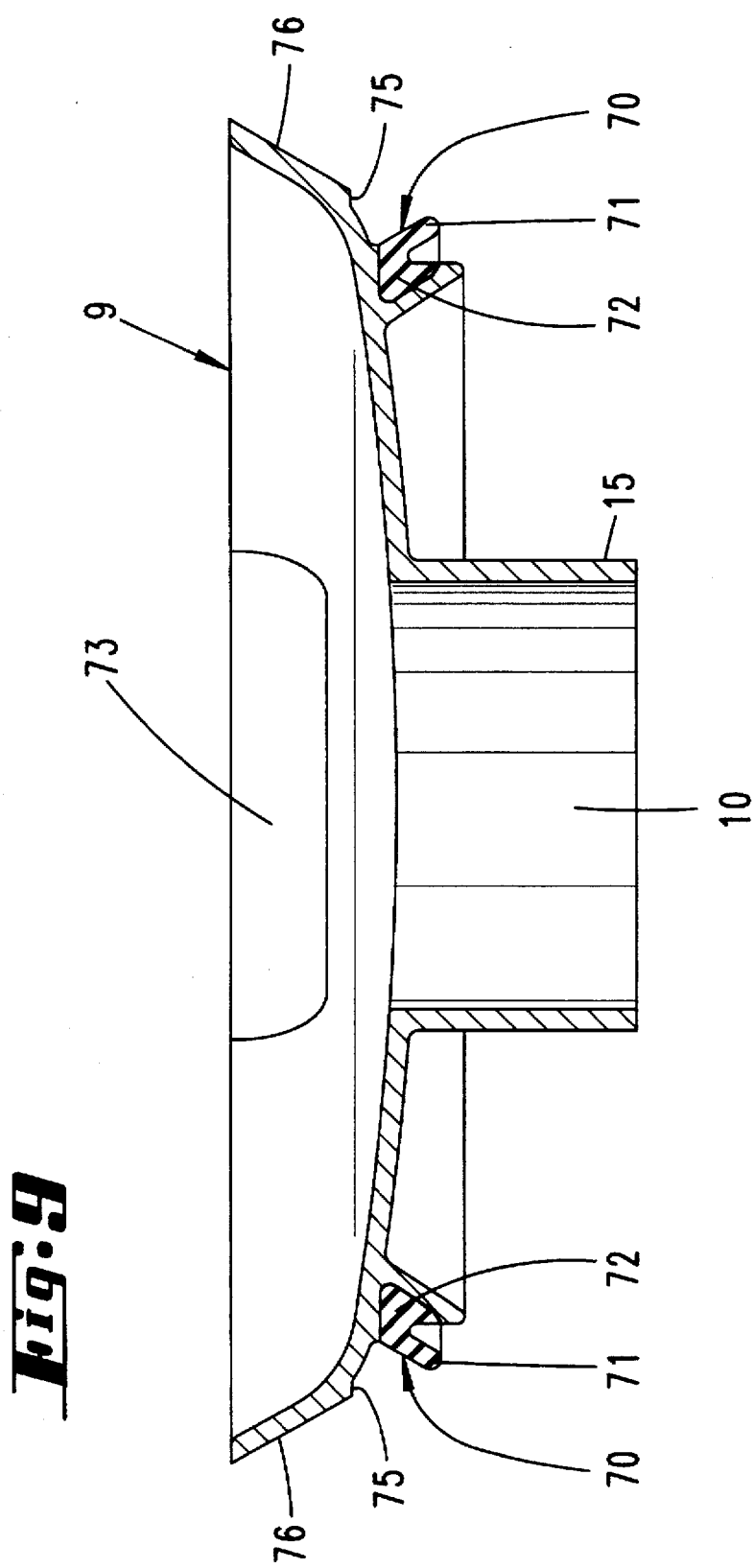
FIG. 9 shows a cross-section through the mixing-vessel lid in a plane which is offset by 90° with respect to the illustration according to FIG. 8.

FIG. 9 shows a cross-section according to the illustration of FIG. 8, although the section plane is offset by 90° with respect to the section plane of FIG. 8. As in FIG. 4, it can also be seen here that an—inner—termination surface 73 provided on the narrow sides runs in a rectilinear manner, unlike the rest of the inner surface of the mixing-vessel lid 9, which is curved to a relatively pronounced extent (in the edge region) or shallow extent.

From the detail of FIG. 10, the spigot 17 can be seen, which interacts with the securing device, as is now explained in detail hereinbelow. It is disposed centrally with respect to the protrusion grip 14, the latter also forming a protrusion edge 74 which projects downwards in the direction of the spigot 17.

Figure 11:
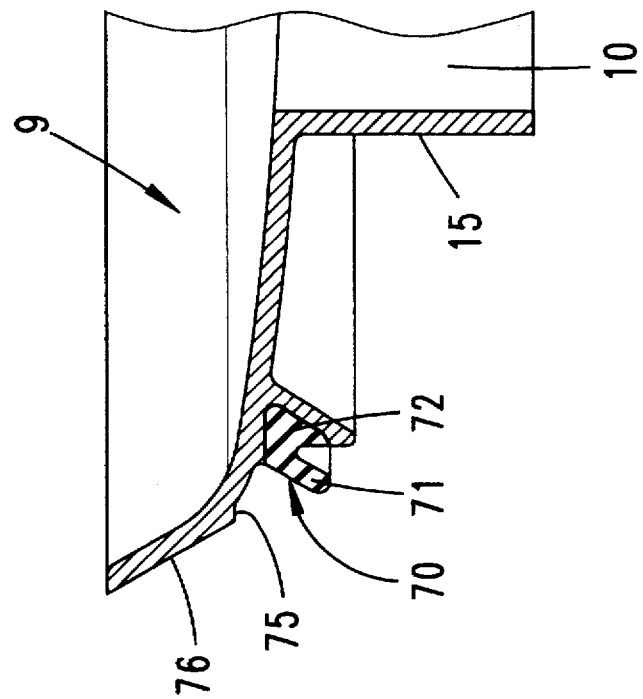
FIG. 11 shows a further detail of the mixing-vessel lid.

From the cross-sectional detail of FIG. 11, it is also possible to see, in particular, an attachment edge 75 which is formed at the bottom of the upper cover periphery 76, the outer surface of which connects with the mixing vessel 4 as a continuation thereof.

Figure 12:
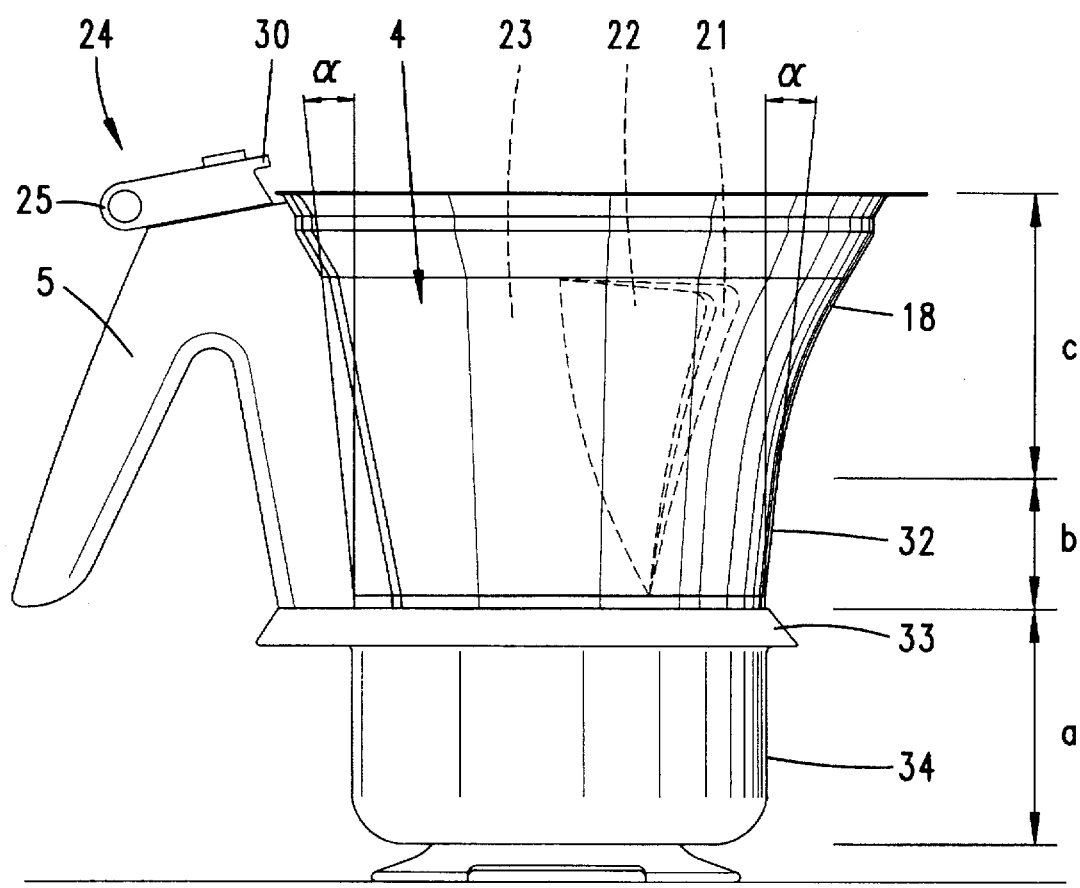
FIG. 12 shows a first embodiment of the mixing vessel in side view.

It can be seen from the side illustration of the mixing vessel 4 according to FIG. 12 that the mixing vessel 4 can be divided up essentially into three regions a, b and c. The lower region a is of substantially cylindrical construction. The region b adjoining it is of substantially conical construction. Further, a region c connects with this in the upward direction, which defines a protruding portion extending away from the handle 5, region c leading to a curved front contour line 18—on the side opposite the handle 5. This contour line 18 also corresponds to an inner contour line.

Figure 13:
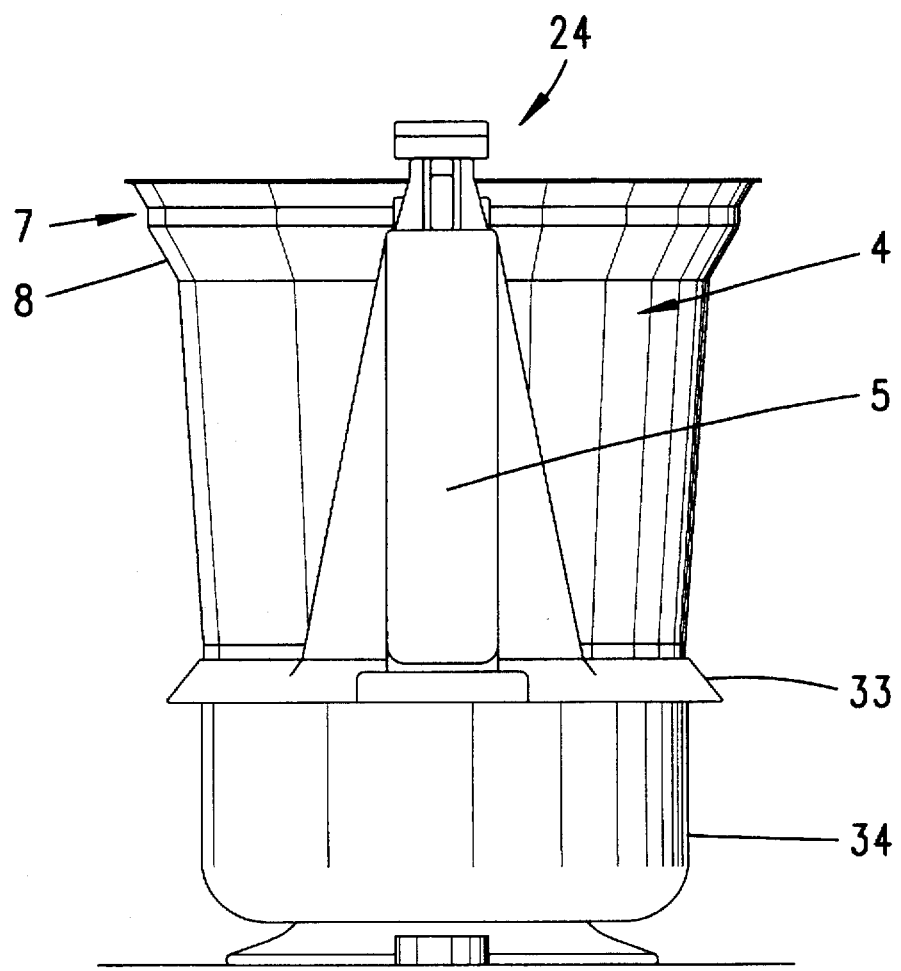
FIG. 13 shows an end view of the mixing vessel.

The end view of the mixing vessel 4 according to FIG. 13 shows that the curved contour line 18 is not formed in the side regions of the mixing vessel 4.

Figure 14:
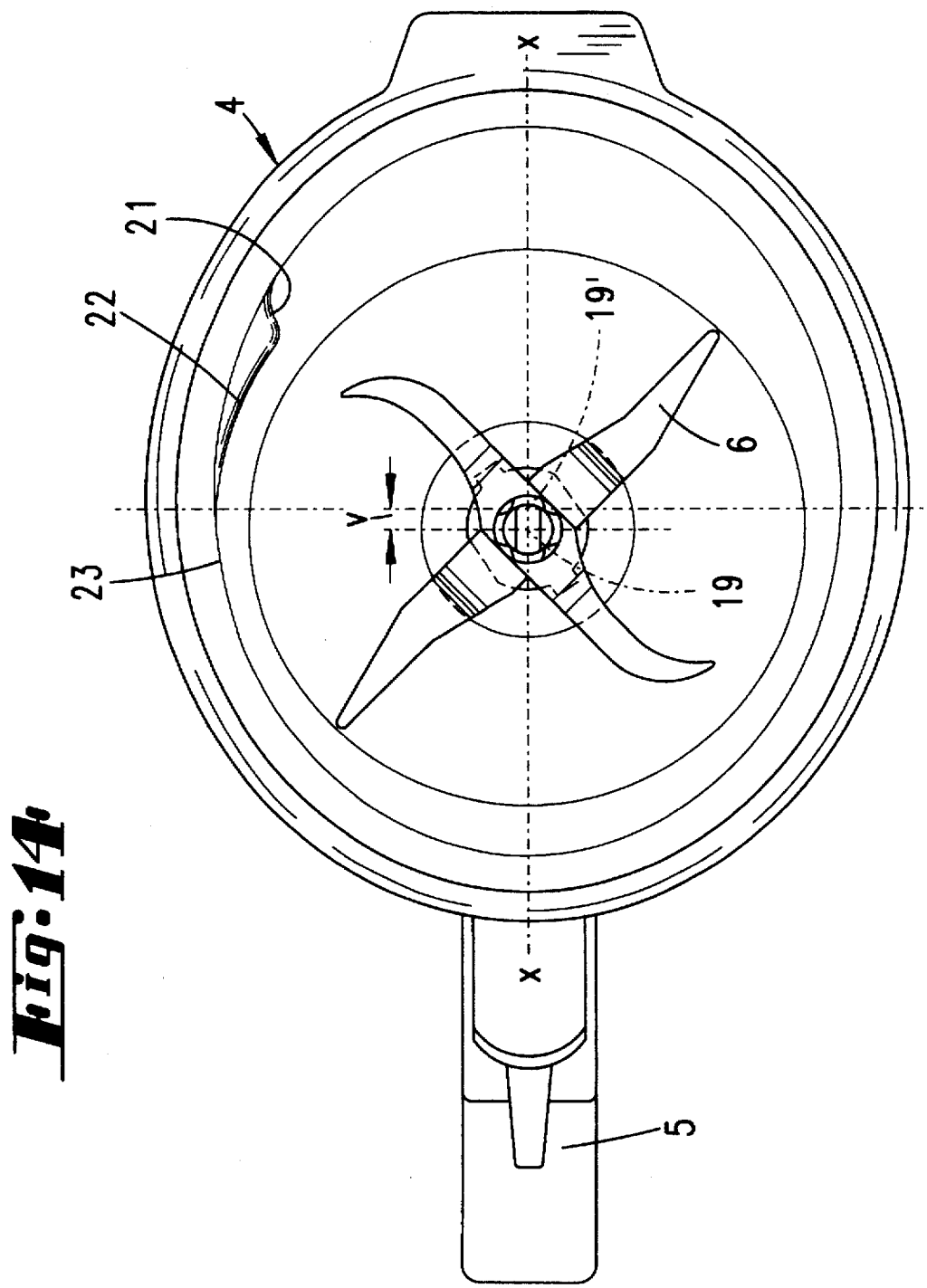
FIG. 14 shows a plan view of the mixing vessel.

It can be seen from the plan view according to FIG. 14 that a centre point 19 of a circular opening cross-section of the lower region a, which centre point 19 coincides with an axis of rotation of the cutter mechanism, is located offset with respect to a centre point 19' of the elliptically-shaped upper opening cross-section of the region c. The offset section v is formed in the direction of a greater longitudinal axis x of the upper elliptically-shaped opening cross-section, pointing away from the handle 5.

Figure 15:
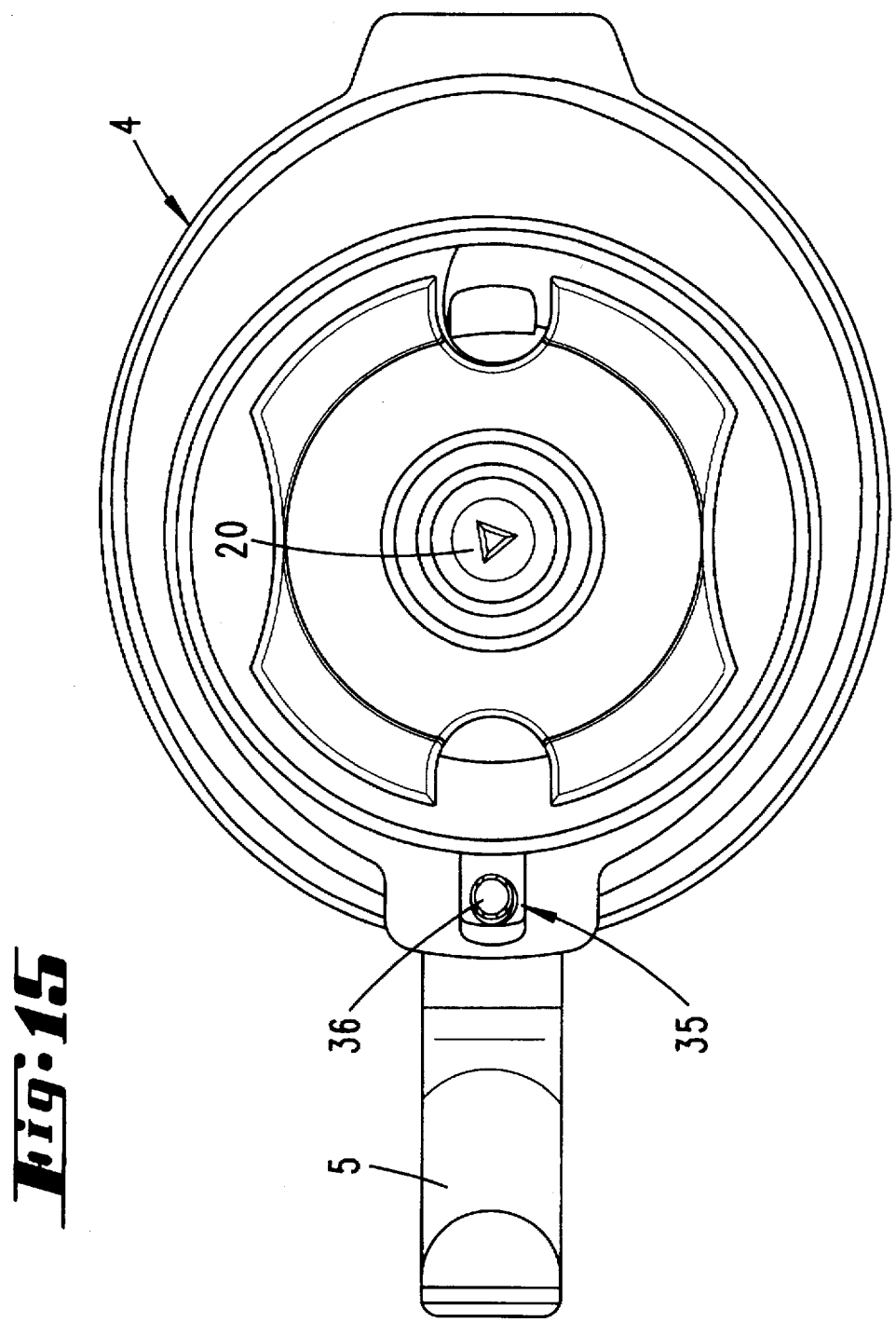
FIG. 15 shows a bottom view of the mixing vessel.

In addition, the bottom view of the mixing vessel 4 according to FIG. 15 shows, in particular, a star-shaped coupling insert 20 for driving, for example, the cutter assembly 6, which is described in more detail hereinbelow.

Figure 16:
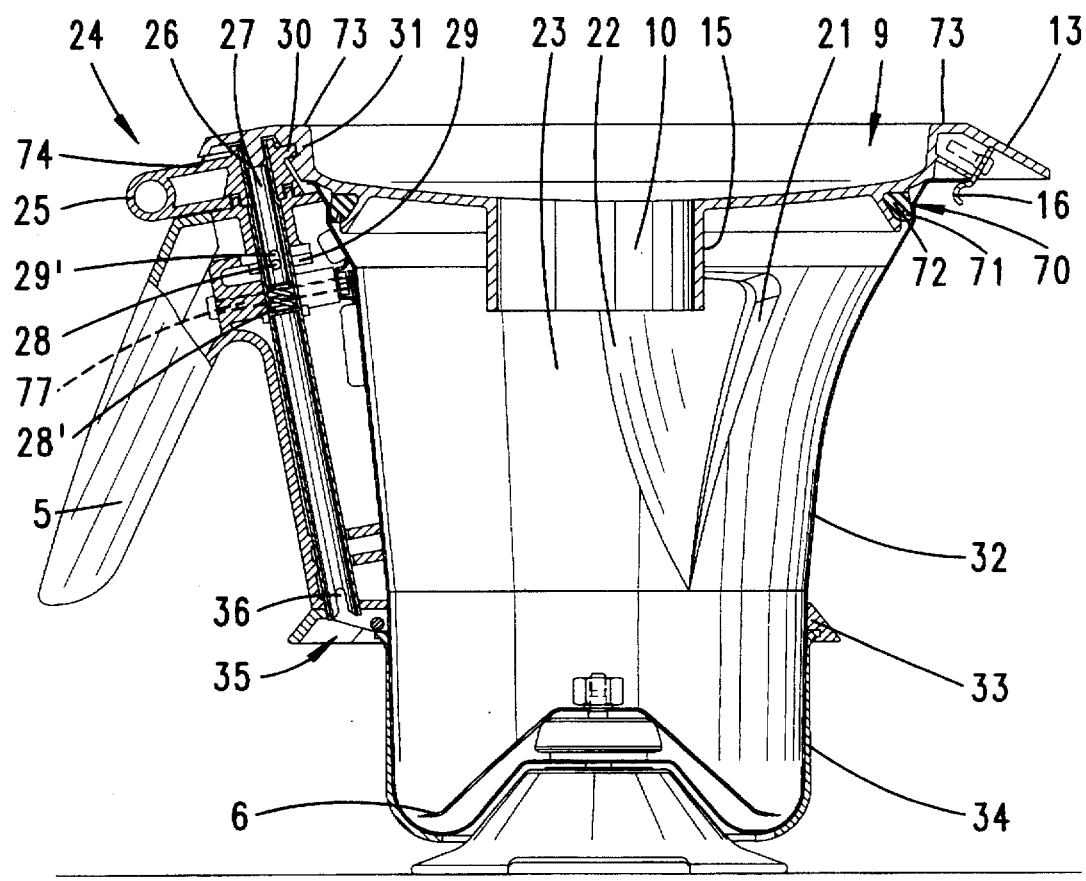
FIG. 16 shows a sectional illustration of the mixing vessel according to FIG. 12 with the mixing-vessel lid attached.

It can further be seen from the cross-sectional illustration according to FIG. 16 that an inwardly protruding step 21 is provided in the interior of the mixing vessel 4. The step 21 is part of an overall wedge-shaped structure which extends in the region of the central section b and of the upper section c of the mixing vessel. The step 21 is provided on one side in the mixing vessel, as can also be gathered, in particular, from the illustration of FIG. 14. The step 21 proceeds further at a small angle to merge, via a surface 22, into the inner wall 23 of the mixing vessel. The centre point of curvature for the surface 22 is in this connection the centre point 19. The step 21 is arranged such that the material being stirred or mixed passes over it as it is subjected to a pronounced rotary movement, the cutter mechanism or a stirring insert thus not engaging against the step 21.

Moreover, as can also be seen from the illustration shown, the step 21 is of an angled configuration, an upper step surface running approximately at and along the lower edge of the shoulder 8. The other step surface runs approximately perpendicular thereto, with the curved transition in the right angle. The largest step shoulder can also be seen in the curved, substantially right-angled transition. Towards the bottom, in the vertical region, the step surface is fully curved to a slight extent such that in detail, no right angle is formed, but rather an acute angle which is defined by the upper and vertical step surfaces. Towards the bottom, the step shoulder is also reduced to an increasing extent until it terminates substantially in the region of an upper boundary of the region a of the mixing vessel 4. Overall, the upper surface 22, which is parallel to the wall or is integrated into the circular shape of the wall, extends approximately over a quarter-circle of the surface area of the mixing vessel 4.

A securing device 24 is provided in the handle 5 of the mixing vessel 4. The securing device 24 specifically comprises a hand lever 25 which is connected fixedly to a bush 26 formed as a coupling rod. A securing pin 27 is received in an upper region in the bush 26. The securing pin 27 can only be moved vertically in the bush 26, i.e. against the force of a spring 28.

Figure 10:
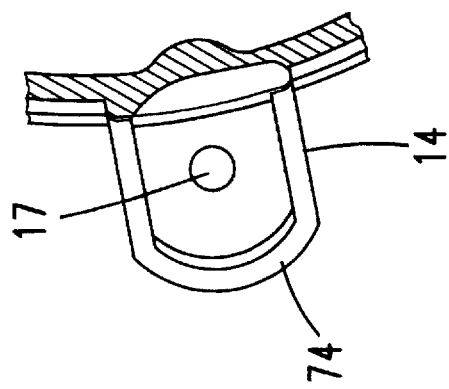
FIG. 10 shows a detail of the mixing-vessel lid.

By attaching the mixing-vessel lid 9, the securing pin 27 is pushed downwards, i.e. by the spigot 17 (see FIGS. 8 and 10). By this, specifically, a securing continuation 28 which is connected to the securing pin 27 is moved vertically downwards out of a slot 29' of the bush 26. The securing continuation 28 thus passes into a groove-like, at least partially circular, recess 29, so that a rotation of the bush 26 by means of the hand lever 25 together with the securing pin 27 is enabled. A securing lug 30 is also formed on the hand lever 25 (see also FIG. 12) which engages in a securing groove 31 of the mixing-vessel lid 9. By rotation of the hand lever 25, the attached mixing-vessel lid 9 is thus simultaneously locked on the mixing vessel. However, due to the necessary vertical movement of the securing pin 27, it is not possible to rotate the hand lever 25 unless the mixing-vessel lid 9 has been attached correctly.

It is essential that the hand lever 25, the securing pin 27 and the bush 26 are located outside the actual mixing vessel 4, i.e. outside a mixing-vessel wall 32. A through-passage in the wall 32 of the mixing vessel 4 is neither provided nor necessary for actuating the securing means and for providing the securing arrangement.

A circumferential attachment edge 33 is provided on the outside of the mixing vessel 4 at the transition between the region a and the region b of the said mixing vessel 4. A second wall 34 which terminates in the attachment edge 33 is also provided in the lower region of the mixing-vessel wall. The diameter of this attachment edge 33 increases towards the side at which the handle 5 is provided. The attachment edge 33 also secures at the same time the handle to the mixing vessel 4 in its lower region. In the upper region (see FIG. 16), the handle 5 is screwed to the mixing-vessel wall 32 by means of a screw-connection 77.

The securing of the handle 5 on the mixing vessel 4 is, in detail, arranged such that, as has been mentioned above, the handle 5 is screwed to the mixing-vessel wall 32 in the upper region and, in the lower region, is connected at the attachment edge 33, for example, by hooking in.

If, when the mixing vessel 4 has been inserted, any food or liquid should run down the outer wall of this mixing vessel, then the attachment edge 33 deflects this food or liquid around the mixing-vessel mount 3, with the result that a heating device or the like provided there is not soiled. This could result in the mixing vessel 4 "sticking fast" in the mount 3, whereupon removal of the vessel 4 from the mount is at least rendered more difficult. Rather, the food or liquid trickling off runs off the housing.

A free end 35 of the bush 26 has a positive-lock opening 36 level with the attachment edge 33. The positive-lock opening 36 interacts with a coupling part 38 in the mixing-vessel mount 3. This coupling part 38 is indicated schematically in the upper region of FIG. 18, one end of the bush 26 being illustrated here only by dashed lines. The coupling part 38 has a transverse pin 39 which engages in the positive-lock recess of the bush 26. Correspondingly, the mixing vessel can only be inserted into the mixing-vessel mount 3 when the hand lever 25 is located in a position corresponding to the open position.

Connected to the coupling part 38, in axial extension of it, is an expansion toggle 40, FIG. 19 illustrating the non-actuated disposition and the actuated disposition of the expansion toggle. Furthermore, these actuated and non-actuated positions can also be seen in the cross-sectional illustrations of FIGS. 20 to 23. Specifically, the expansion toggle 40 acts, via the spreading jaws 41 and 42, on a retaining sleeve 43 which, in the non-stressed state (see FIGS. 22 and 23), retains the inserted mixing vessel 4 in the lower region a in a positively locking manner. In the expanded state of the expansion toggle 40 (see FIGS. 19, 20 and 21), the sleeve 43 is biased against the action of the U-shaped spring 44 which acts on the spreading jaws 41 and 42.

It can also be seen from FIG. 18 that a securing lever 45 is provided at a lower end of the coupling part 38, the securing lever being illustrated in more detail in FIGS. 24 and 25. The securing lever 45 turns with a rotational movement of the coupling part 38. In this, it runs over a contact switch 46 and moves into the region of a plate 47. The action of running over the contact switch 46 and moving in the region of the plate 47 further causes a securing pin 48 to move out upwards (see also FIG. 18), which mechanically secures the disposition of the securing lever 45 on the far side of the securing pin 48 and thus in the region of the plate 47. Without moving the securing pin 48 back, it is not possible to release and thus remove the mixing vessel 4 from the mixing-vessel mount 3 in the food processor 1. Also associated with this is the fact that it is only when the securing pin 48 is moved out that the agitator or the heating device can be freed for activation. Correspondingly, the mixing vessel 4 cannot be removed without the agitator and the heating device being deactivated. If the food processor is put into operation by means of the speed regulator, then the securing pin 48 moves out and locks the securing lever 45. This can take place purely mechanically or else electro-mechanically. The securing pin 48 only moves back when the drive motor and thus the cutter mechanism 6 have come to a standstill. It is only after this that it is possible to unlock the mixing-vessel lid and remove the mixing vessel 4 from the mount 3. It is thus ensured that the cutter mechanism 6 is at a stand-still before the mixing vessel 4 is opened. Any risk to the user is thus ruled out.

FIGS. 26 to 31 illustrate a cooking insert 50 which is advantageous, in particular, for use in the interior of the mixing vessel 4 beneath the mixing-vessel lid 9.

The cooking insert 50 has a perforated, substantially conical or, optionally, also cylindrical side wall 51 and a perforated base 52. Furthermore, it has an upper peripheral collar 53 which has an elliptical surface area. Here, in a manner comparable with the mixing vessel 4, the elliptical surface of the collar 53 is offset with respect to a centre point of the base 52. The point 54 can be regarded as the centre point of the base 52, while the point 55 can be regarded as the geometrical centre point of the elliptical configuration of the collar 53.

This results in the collar 53 having a larger extent of projection y on one side—the front side—than to the rear—z. The lateral extent of projection—t—is, in turn, smaller than the rear extent of projection z.

In the front region of the collar 53, there are likewise provided slot-like through-passages 56, these also being provided in the conical wall and in the base. Furthermore, in its front region, the cooking insert has a pouring spout 57 cut into it, which has a crossbar 58 gripping over it. The crossbar 58 may thus act in the manner of an eyelet for receiving a hook in a seating manner.

Figure 31:
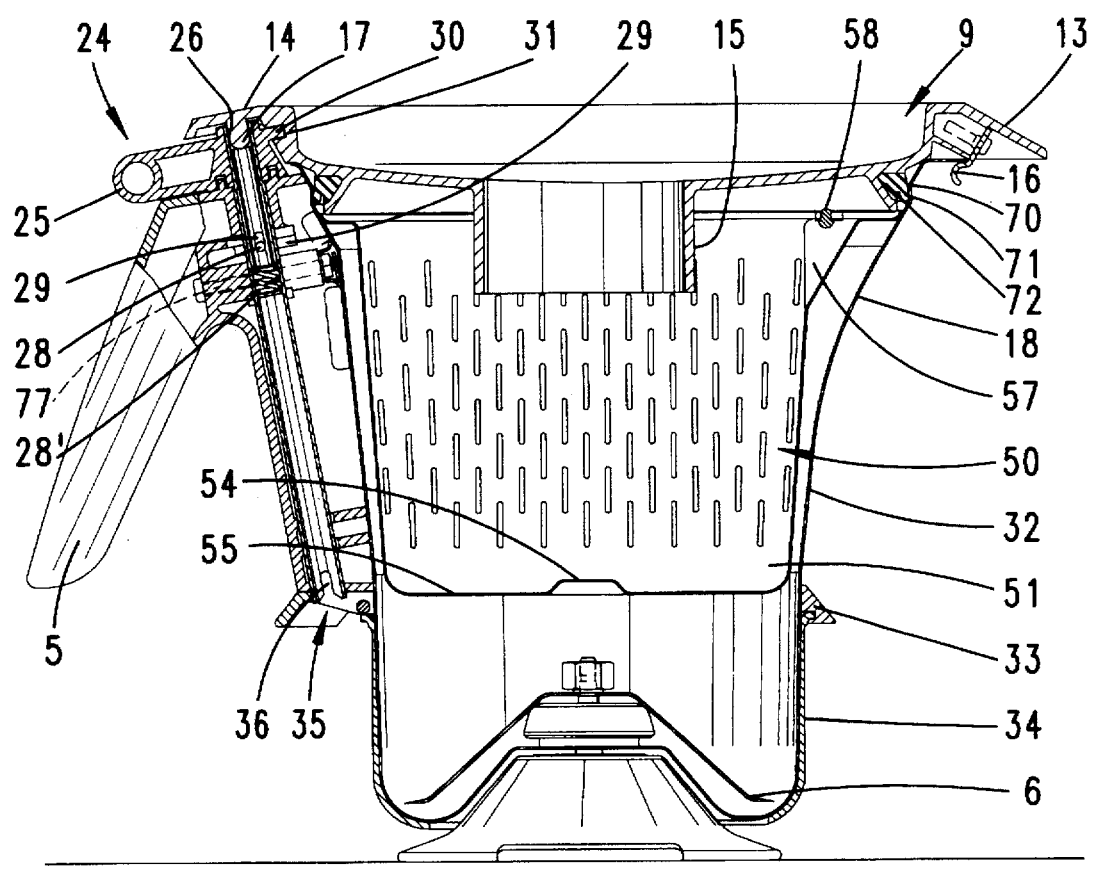
FIG. 31 shows a cross-sectional illustration of the mixing vessel according to FIG. 16 and of the cooking insert inserted therein, with the mixing-vessel lid also attached.

The incorporated of the cooking insert into the mixing vessel is illustrated in FIG. 31.

Figure 32:
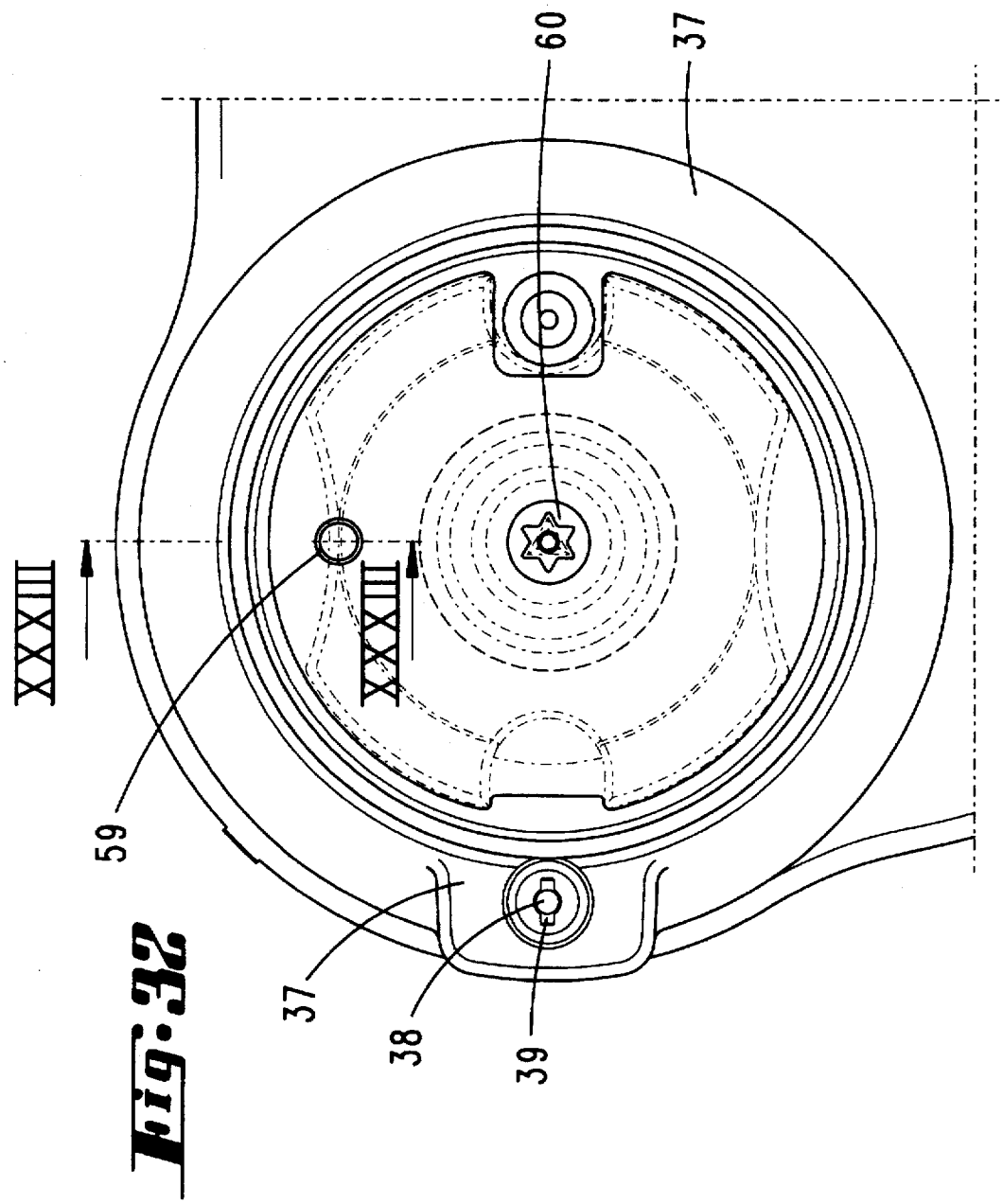
FIG. 32 shows a plan view of the mixing-vessel mount.

FIG. 32 shows a plan view of the mixing-vessel mount 3. This is formed in the manner of a bowl. Provided in the base of the mixing-vessel mount 3 is a discharge opening 59, in regard to which reference is also directed to FIG. 33. Furthermore, it is possible to see a star-shaped coupling recess 60 which transmits the motor power to the agitator and/or the cutter assembly 6.

The star-shaped coupling insert 20 (see FIG. 15) engages in the coupling recess 60. The three-pointed star configuration of the one side of the coupling and the six-pointed star construction of the other side of the coupling means that, on the one hand, the coupling position can be easily obtained when the mixing vessel 4 is inserted and, on the other hand, a secure, positively locking coupling connection is also achieved.

Figure 33:
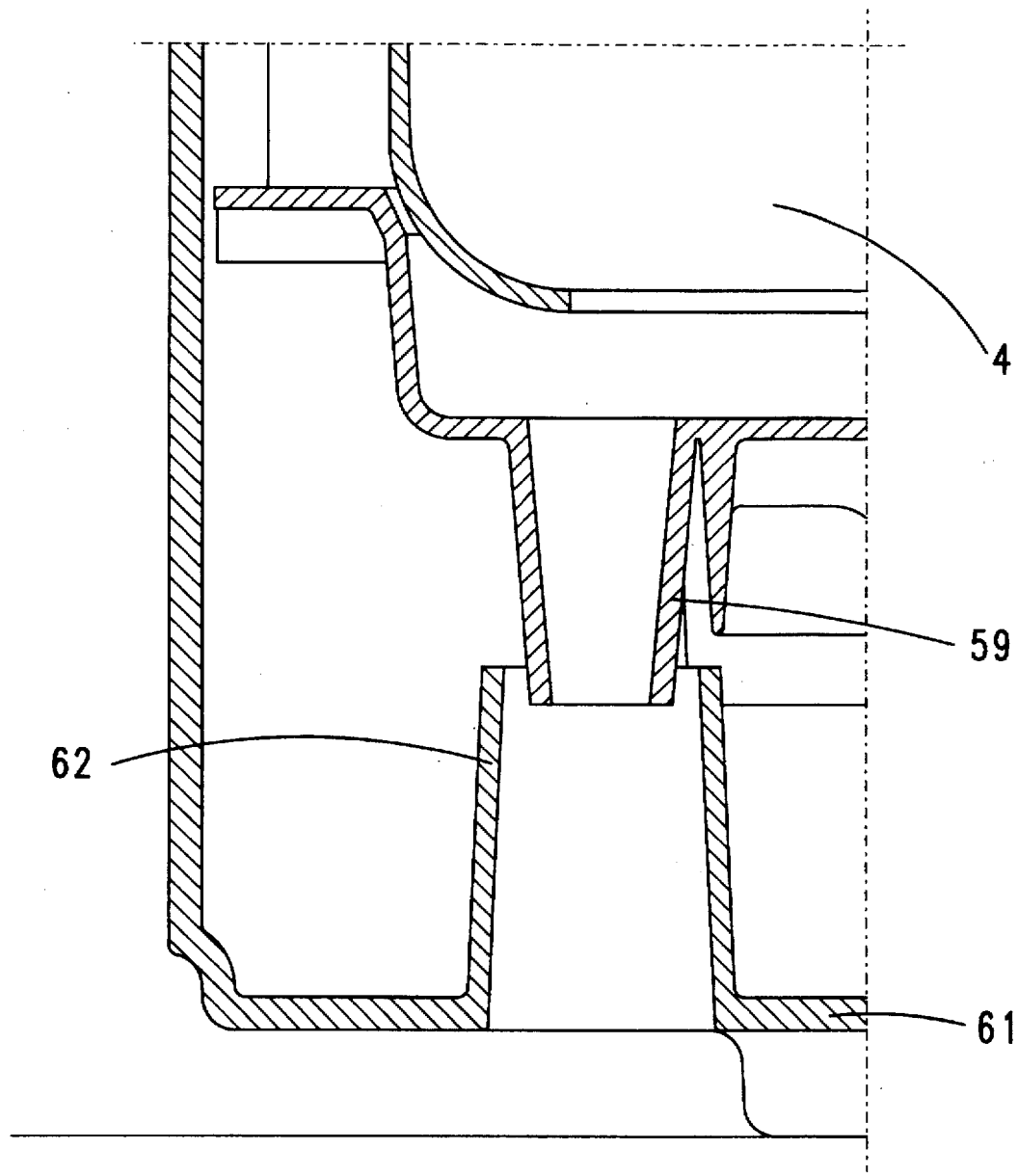
FIG. 33 shows a sectional illustration of the mixing-vessel mount with the mixing vessel inserted therein, in the region of a discharge of the mount.
Figure 44:
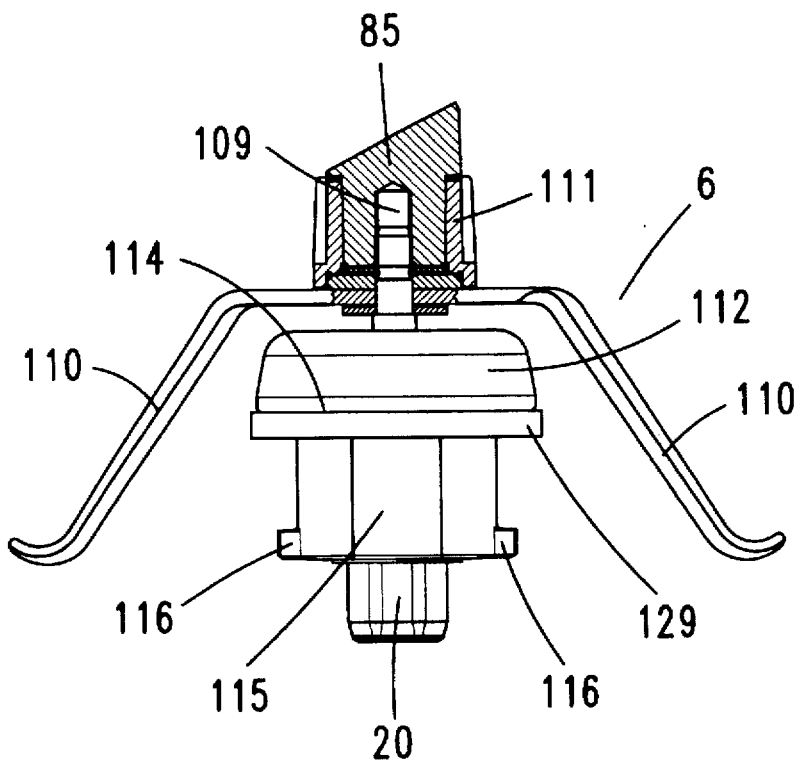
FIG. 44 shows, partially in section, a detail view of a cutter bearing provided with a cutter assembly, likewise relating to a second embodiment.

It can be seen from the sectional illustration according to FIG. 33 that the discharge opening 59 engages in a connection piece 62 which projects upwards from a base 61 of the food processor 1, with the result that any liquid or the like which has run over into the mount 3 can run out in its entirety, from the food processor 1, through the discharge opening 59.

A mixing-vessel spatula 78 is illustrated in FIG. 34. The essential feature of the mixing-vessel spatula 78 is a hook-like formation 79. This is suitable, in particular, for interacting with the eyelet (crossbar 58) on the cooking insert 50. As a result, the cooking insert 50 can be held down in the mixing vessel 4, for example, when liquid is being poured out.

The vessel may be configured in the form of a bowl.

Figure 17:
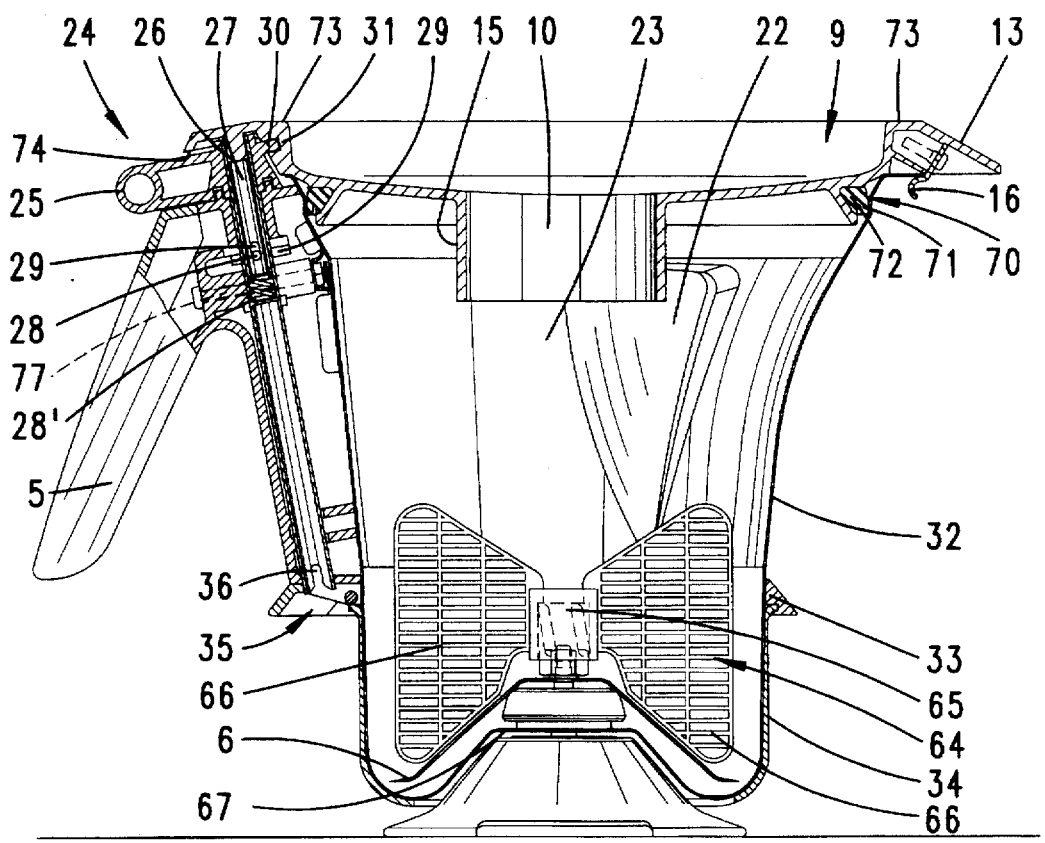
FIG. 17 shows a sectional illustration according to FIG. 16 of a first embodiment with a cream-whipping device inserted.
Figure 26:
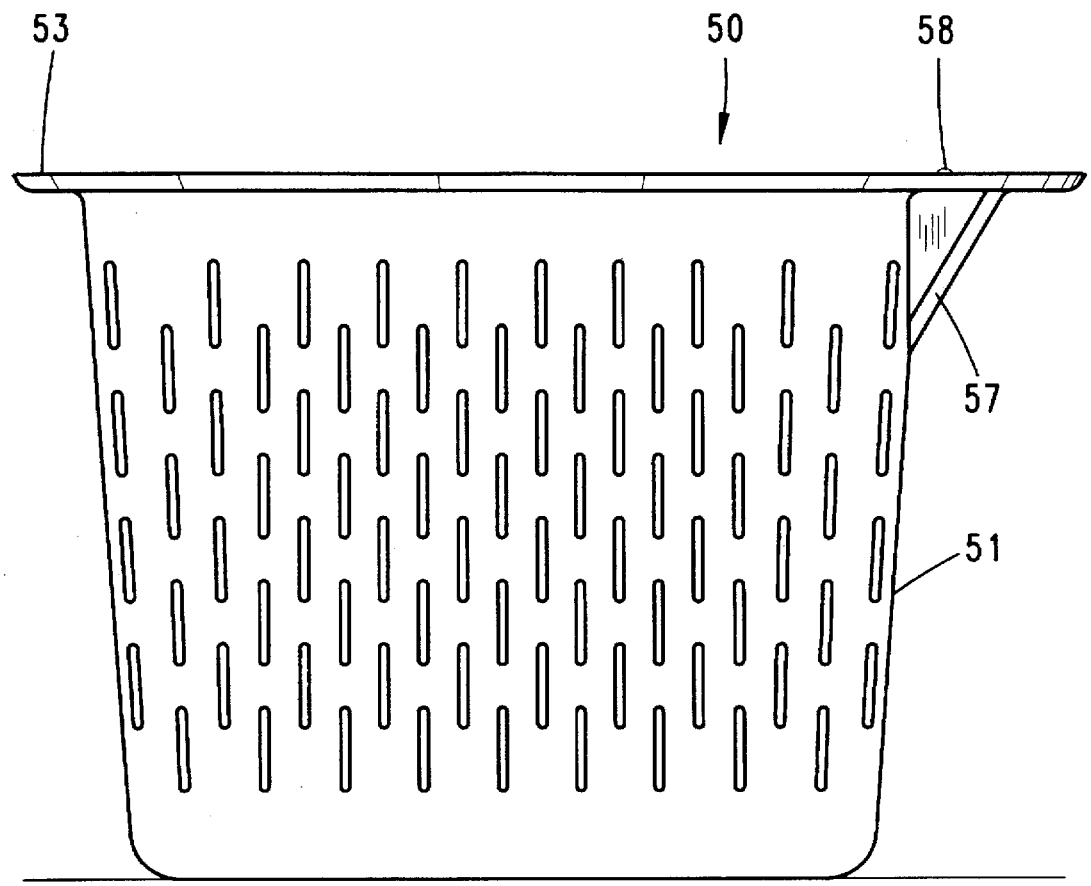
FIG. 26 shows a side view of a first embodiment of the cooking insert.
Figure 27:
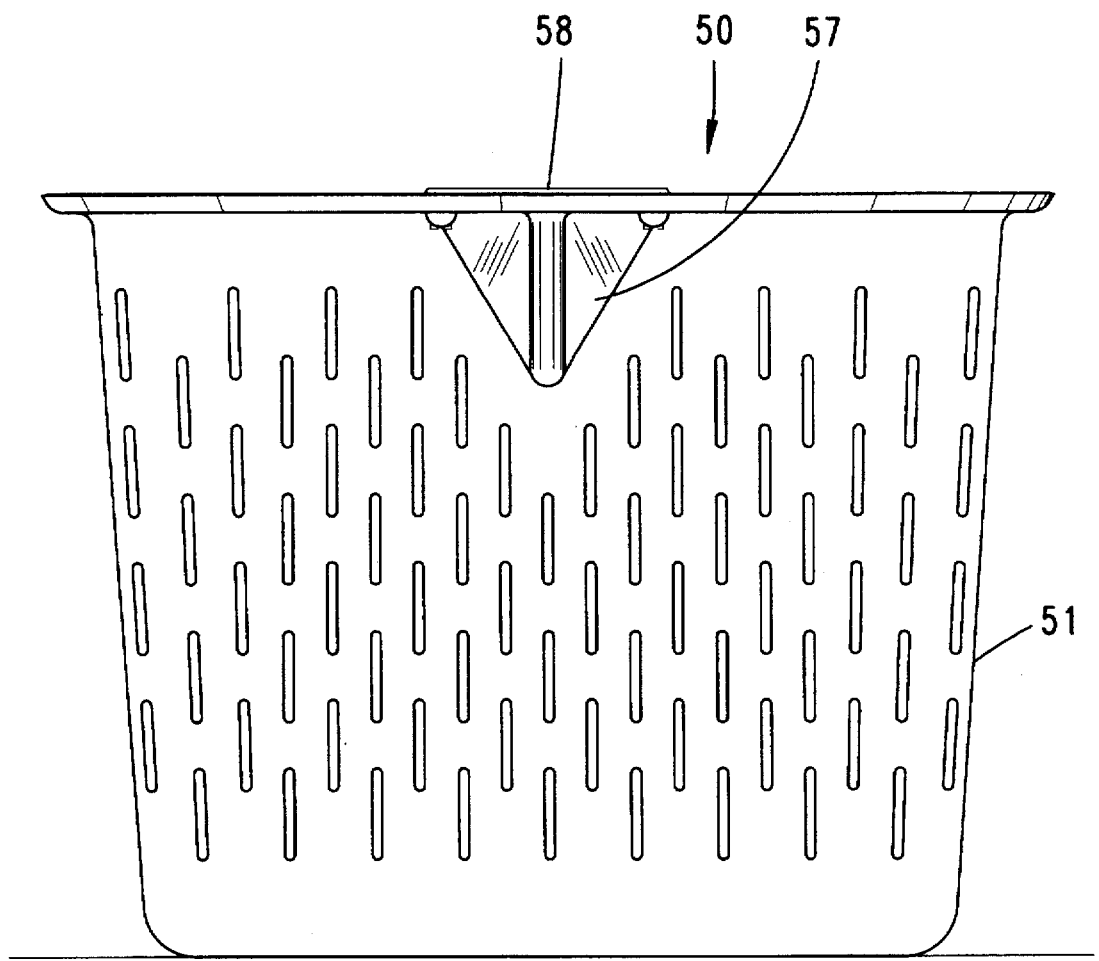
FIG. 27 shows an end view of the cooking insert.
Figure 28:
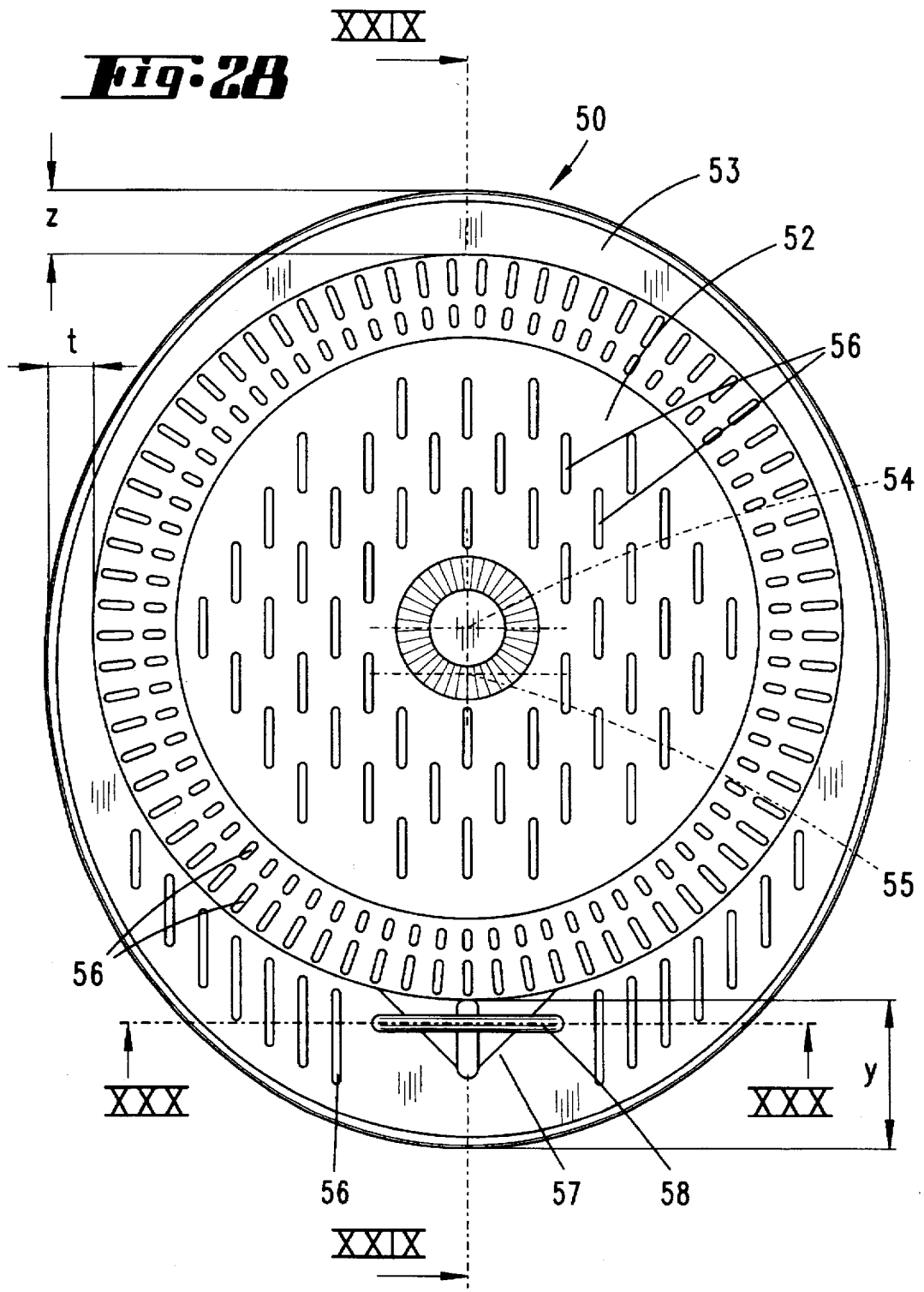
FIG. 28 shows a plan view of the cooking insert.
Figure 29:
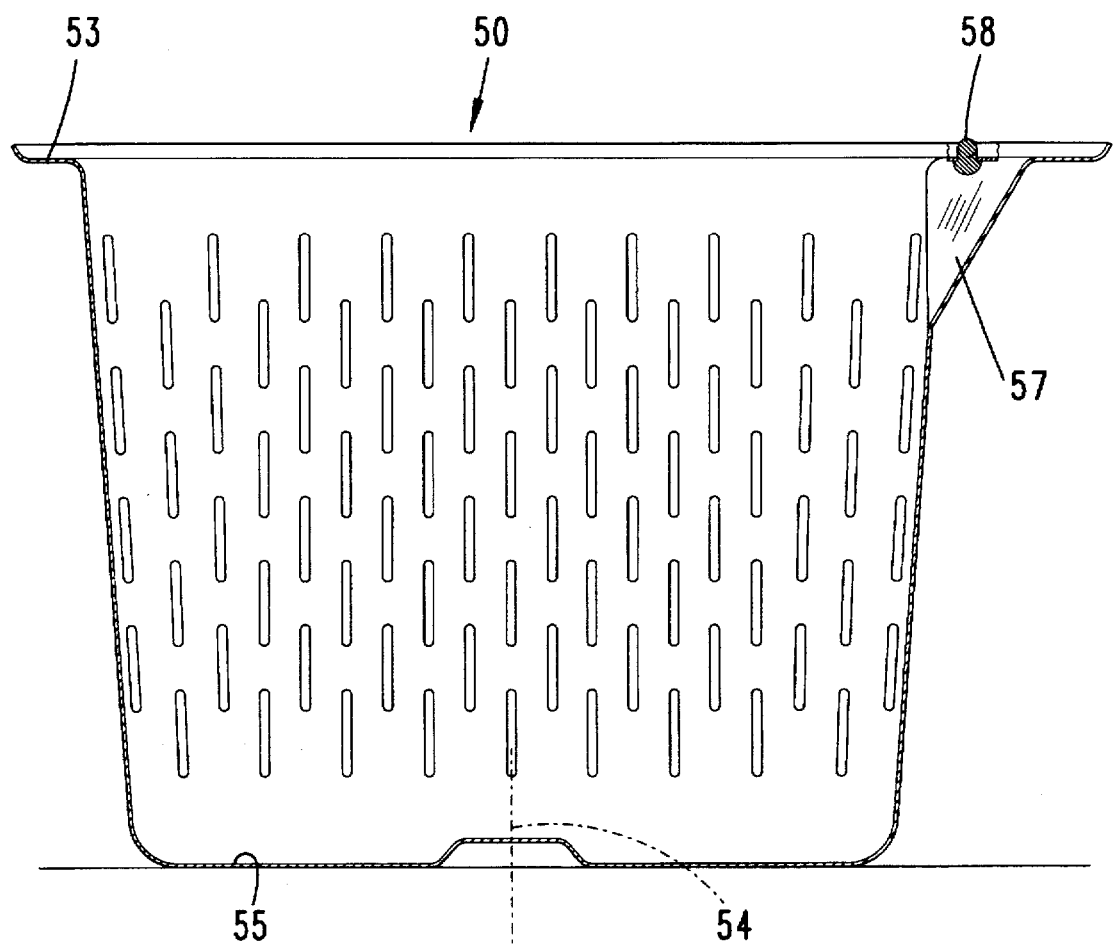
FIG. 29 shows a sectional illustration of the cooking insert according to FIG. 28, the section being taken along the line XXIX—XXIX.
Figure 30:
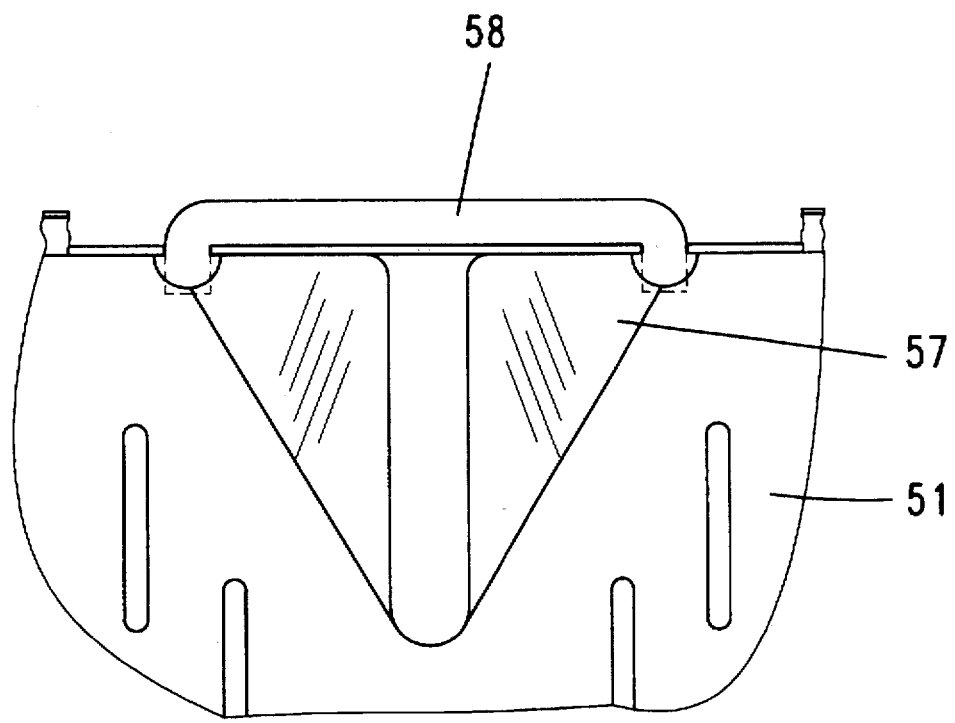
FIG. 30 shows a sectional illustration of the cooking insert according to FIG. 28, the section being taken along the line XXX—XXX.

In FIG. 17, a cream-whipping device 64 inserted in the mixing vessel 4 is illustrated. Said cream-whipping device 64 has two blades 66 which are moulded radially onto a cylindrical coupling mount 65. The blades 66 have regular through-passages and, at least in their lower regions, have an outer contour which corresponds to the mixing-vessel base 67. The cream-whipping device 64 is positioned on the cutter mechanism 6, for example on a nut which secures the cutter mechanism 6, by means of its coupling mount 65.

A second embodiment of the cream-whipping device 80 is illustrated in FIGS. 35 to 38. Corresponding to the first exemplary embodiment in FIG. 17, this cream-whipping device 80 has a cylindrically shaped coupling mount 81 from which there extend two mutually opposite, radially outwardly directed whipping blades 82. These whipping blades 82 are essentially formed in the manner of a skeleton and, in their regions remote from the mount 81, have cross-pieces 83 which are aligned perpendicularly with respect to the axis of rotation of the cream-whipping device 80. As can be seen from FIG. 36, said cross-pieces are offset at an angle with respect to a horizontal, the cross-pieces 83 being alternately offset in the positive and negative directions with respect to the horizontal.

A handle-like grip 84 is moulded on at the top of the coupling mount 81, by means of which the cream-whipping device 80 can be positioned in the mixing vessel 4 or on the cutter mechanism 6, or removed from the actor mechanism, in an extremely simple manner.

In FIG. 39, there is illustrated the inserted condition of cream-whipping device 80 in the mixing vessel 4. It can be seen that the cream-whipping device 80 is plugged onto a driver 85 of the cutter mechanism 6 by means of its coupling mount 81. The arrangement here is such that the whipping blades 82 are located in a wedge of the cross-form cutter assembly 6.

A second embodiment of the securing device 24 is also illustrated in FIG. 39.

The rotatable hand lever 25 attached on the handle 5 has a U-shaped configuration in cross-section. A coupling rod 86 is actuated by means of this hand lever 25, as is also the case in the first exemplary embodiment. Said coupling rod is connected in a rotationally fixed manner to the hand lever 25 and has a curved extent within the handle 5. A first section of curvature of the coupling rod 86 is located in an upper region of the handle 5, the curvature running substantially towards a centre axis z of the mixing vessel 4. A further, second section of curvature of the coupling rod is effected in the lower region of the handle 5 before the coupling rod 86 passes out of the handle 5 to bring the coupling rod 86 into a vertical position again. This configuration makes it possible to displace the handle 5 or the handle region in the direction of the centre axis z of the mixing vessel 4 such that the lever forces are kept low when the mixing vessel 4 is full.

The coupling rod 86 passes through the handle 5 in the region of an opening 87. The coupling end 88 which projects from the bottom of the handle 5 is in the form of a hammer head. The opening 87 has a contour which corresponds to the hammer head (see FIG. 41).

In the region of the coupling rod 86 which is associated with the hand lever 25, the coupling rod is associated, in a rotationally fixed manner, with a securing pin 89 which is aligned parallel, but in a radially offset manner, to the coupling rod 86 in this region. The securing pin 89 is fastened on the coupling rod 86 by means of a spring 90. This spring 90 always forces the securing pin in the direction of the hand lever 25 and towards the handle cover 91 provided there. Furthermore, the securing pin 89 is retained on a disc 92 located in a rotationally fixed manner on the coupling rod 86, which disc has a bore 93 for the passage of the securing pin 89.

In the partial representation in FIG. 39a, the blocking position of the securing device 24 is illustrated. It can be seen that the securing pin 89 passes, by means of the spring 90, through the bore 93 of the disc 92 into a blocking opening 94 of the handle cover 91. This blocking opening 94 is open upwardly, that is to say in the direction of the hand lever 25. The mixing-vessel lid 9 which is to be attached has a downwardly directed spigot 95 which, when the lid 9 has been attached, enters into the blocking opening 94 from above. This results in a displacement of the securing pin 89 into an unblocked disposition according to FIG. 39. After this, a pivoting of the hand lever 25 can be effected. A rotation or pivoting of the hand lever 25 results in corresponding pivoting of the hammer-head-formed coupling end 88. Pivoting through approximately 67° is preferred here.

This construction has proved to be particularly advantageous, since there are no relative movements between the actuating elements and no wear thus occurs. The entire securing device 24 can be removed from the handle 5 and inserted into it again in an extremely simple manner. The entire device is fastened on said handle cover 91 which, in turn, can be fastened on the handle 5, for example by means of a rear-engagement fastening and a fixing screw 96.

A third embodiment of the securing device 24 is illustrated in FIGS. 40, 40a and 40b. In the region of the coupling rod 86 which is associated with the hand lever 25, a locking protrusion 150 is moulded on this coupling rod 86, beneath the handle cover 91, which protrusion, in a blocking position according to FIGS. 40a and 40b, is oriented in the direction of the centre axis z of the mixing vessel 4. In the blocking position, this locking protrusion 150 is located in a blocking pocket 151 of a locking link 152. The latter is essentially made up of a plate, which is aligned perpendicularly with respect to the coupling rod 86 and has the blocking pocket 151, and of an angled leg which extends from this plate. By way of this leg, the locking link 152 is mounted on the underside of the handle cover 91 such that it can be pivoted via a pin 153. The plate 154 has a central bore 155 for the passage of the coupling rod 86. The radially aligned blocking pocket 151 extends from this bore 155 on the side facing the handle cover 91.

Provided on that side of the bore 155 which is directed away from the blocking pocket 151 is a further through-passage 156, through which a bolt 157 on the handle cover passes. In the region of its free end, this bolt is provided with an annular collar on which there is mounted a compression spring 158 which engages around the bolt 157. Said compression spring acts on the underside of the locking link 152 by means of its end directed away from the annular collar, with the result that said locking link is spring-loaded in the direction of the underside of the handle cover 91. This means that the locking link 152 is always biassed in the direction of a position in which the locking protrusion 150 is blocked.

As can be seen from FIGS. 40a and 40b, it is not possible, in this position, for the coupling rod 86 to be rotated by means of the hand lever 25 since the locking protrusion 150 is located in the blocking pocket 151, which is the very thing which prevents this rotation.

In order to permit rotation of the coupling rod 86, the mixing-vessel lid 9 has to be attached. The latter is provided on its underside, in the region of its protrusion grip 14, with two actuating protrusions 159 which, when the mixing-vessel lid 9 is attached, pass through corresponding bores 160 in the region of the handle cover 91 and act on the locking link 152. As a result, the locking link 152 is pivoted around the pin 153 against the spring force of the compression spring 158, with the result that the blocking pocket 151 releases the locking protrusion 150 for turning (see FIG. 40). Unlike the exemplary embodiments described above, in this case it is not the securing pin or the locking protrusion which is displaced into a position for turning-action release, but rather the locking link which blocks the locking protrusion.

As was also the case in the first exemplary embodiment, the coupling rod 86 or its coupling end 88 acts on a coupling part 38 when the mixing vessel 4 has been inserted into the mixing-vessel mount 3. In FIGS. 42 and 43, this coupling part 38 is illustrated in more detail in a second embodiment.

It can be seen that the coupling part 38 comprises a coupling bush 98 which is pushed onto the top of a camshaft 97, it being possible for the coupling bush 98 to be displaced vertically against a spring 99 on the camshaft 97. Coupling bush 98 and camshaft 97 are always connected to one another in a positively locking manner irrespective of the vertical displacement position of the coupling bush 98, with the result that rotational movements of the coupling bush 98 are transmitted to the camshaft 97. As in the first exemplary embodiment, the camshaft 97 carries an expansion toggle 40 for spreading apart two spreading jaws 41 and 42 of a retaining sleeve 43.

In its upper region, the coupling bush 98 has a peripheral edge 100. For positively locking coupling to the coupling end 88 of the coupling rod 86, the coupling bush 98 has a slot-like receiving means 101 located at the top. Latched on to the peripheral edge 100 is a blocking sleeve 102 which has a keyhole-like through-opening 103 corresponding to the cross-section of the hammer-head-formed coupling end 88. The blocking sleeve 102 is preferably moulded as a plastics injection moulding and provides a frustoconical sealing bead 104 at the top.

The blocking sleeve 102 has two radially aligned pairs of jaws 105, between which pairs of jaws 105 there engage pins 106 which are secured to the housing (see FIG. 43). This arrangement prevents the blocking sleeve 102 from rotating, but permits a vertical movement of the blocking sleeve 102.

The hammer-head-formed coupling end 88 passes through the housing 107 of the food processor 1 in the region of a circular through-opening 108 which has at the bottom, that is to say facing the blocking sleeve 102, a frustoconical contour corresponding to the sealing bead 104.

When the mixing vessel 4 is inserted into the mixing-vessel mount 3, the coupling end 88 passes through the through-opening 108 of the housing 107 and, after this, through the keyhole-like opening 103 of the blocking sleeve 102 until the coupling end 88 is located in the receiving slot 101 of the coupling bush 98. After this, there is effected a vertical displacement of the coupling bush 98 together with the blocking sleeve 102 against the pressure of the spring 99, the coupling bush 98 and blocking sleeve 102 being moved away from the housing through-opening 108. After insertion of the mixing vessel 4 into the mount 3 has been completed, the above-described pivoting of the hand lever 25 takes place, which results in the coupling rod 86, and thus the coupling end 88, being rotated. Likewise due to the positive lock, this rotation causes a rotation of the coupling bush 98, and, as a result, a rotation of the camshaft 97 into the position in which the mixing vessel 4 is clamped in. The blocking sleeve 102 accompanies the vertical movement, but does not rotate. The blocking-sleeve opening 103 and the hammer-head-formed coupling end 88 are oriented offset with respect to one another in this position (see FIG. 43). Accordingly, the coupling end 88 is arrested in the vertical direction in this position.

Should the user wish to remove the mixing vessel 4, then a reverse displacement into the basic position by means of the hand lever 25 is first of all imperative in order that the receiving slot 101 and the keyhole opening 103 or the coupling end 88 and the keyhole opening 103 are made to coincide. It is only after this, that the hammer-head-shaped coupling end 88 can be pulled vertically out of the coupling part 38. This precludes the risk of the user spreading apart the retaining sleeve 43 to such an extent that the mixing vessel 4 can indeed be removed, but the retaining sleeve 43 does not latch into its end position. In this case, during removal of the mixing vessel 4, the coupling end 88 would be pulled out of the coupling part 38, so that the U-spring 44 allows the retaining sleeve 43 to grip again and clamps the mixing vessel 4 in. Since, in this position, the coupling would already have been disengaged, it would no longer be possible for the user to remove the mixing vessel 4. This malfunctioning is avoided by the invention specified since it is only in a stop position in which the slots and openings of the blocking sleeve 102 and coupling bush 98 are located one above the other that the coupling rod 86 can be pulled out.

In the locking position shown in FIG. 42, the seal in the region of the housing through-opening 108 is deactivated. The seal only takes effect when the mixing vessel 4 has been removed. In this case, the sealing bead 104 of the blocking sleeve 102 seals the region of the housing through-opening 108 in this region. The cones of the sealing bead 104 and of the opening 108 grip one inside the other and thus provide an effective seal. The receiving slot 101, formed as a driver pocket, of the coupling bush 98 is closed towards the bottom, with the result that it is not possible for any water or the like to penetrate in there either.

Furthermore, it has proved to be advantageous here that, when the mixing vessel 4 has been inserted, the coupling part 38 and also the coupling end 88 passing through the housing 107 do not come into contact with the housing 107. Manufacturing tolerances in the vertical direction are compensated for by the coupling part 38 penetrating into the housing 107. Tolerances in the horizontal direction do not result in any contact between the coupling rod 86 and housing 107, since the through-opening 108 is arranged to be considerably larger than the diameter of the coupling rod 86. Furthermore, the weighing result is not influenced by the coupling part 38 being decoupled from the housing 107.

FIGS. 44 to 49 illustrate a second embodiment of the cutter-mechanism fastening, in detail and assembly views.

The cutter assembly 6 is made up essentially of four cutters 110 which are arranged radially around a drive shaft 109 and in each case enclose an angle of 90° with one another, two mutually opposite cutters 110, starting from the drive shaft 109, first of all extending perpendicularly with respect to the drive shaft 109 and being then curved downwards, in the direction of the mixing-vessel base 67 in the installed position. The other two cutters 110 run essentially in a horizontal direction. The cutters 110 or the cutter assembly 6 is/are fastened on the drive shaft 109 by means of a screw-member 111. Furthermore, the screw-member 111 carries the abovementioned driver 85 at the top.

The drive shaft 109 is mounted rotatably in a cutter bearing 112 and the bottom of the cutter bearing 112 continues in the abovementioned coupling insert 20.

The cutter assembly 6 is operationally connected in non-releasable manner to the cutter bearing 112. This structural unit is inserted into the mixing vessel 4 from above, the cutter bearing 112 passing through the mixing-vessel base 67 in the region of a correspondingly shaped retaining opening 113. For engaging against the edge region of the retaining opening 113, the cutter bearing 112 has a supporting shoulder 114. In the region which is located beneath the supporting shoulder 114, which tapers in cross-section, the cutter bearing 112, which has a substantially circular shape, has two diametrically opposite flattened portions 115. Outwardly directed spigots 116 are provided so as to be offset by 90° with respect to these flattened portions 115.

The retaining opening 113 of the mixing-vessel base 67 has a corresponding contour. Flattened opening regions 117 and passage regions 118 for the spigots 116 are thus also provided here.

Figure 45:
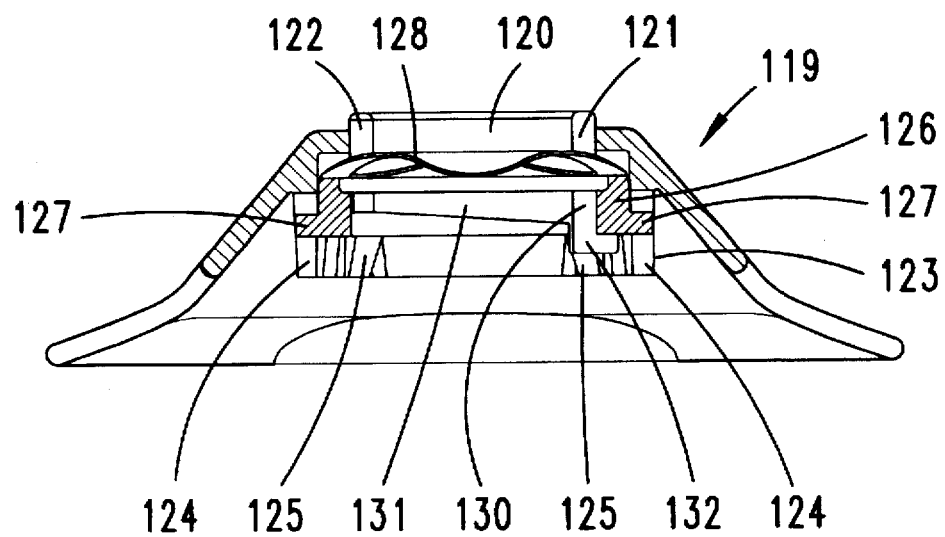
FIG. 45 shows, in a sectional illustration, a stand which may be associated with the cutter bearing.
Figure 46:
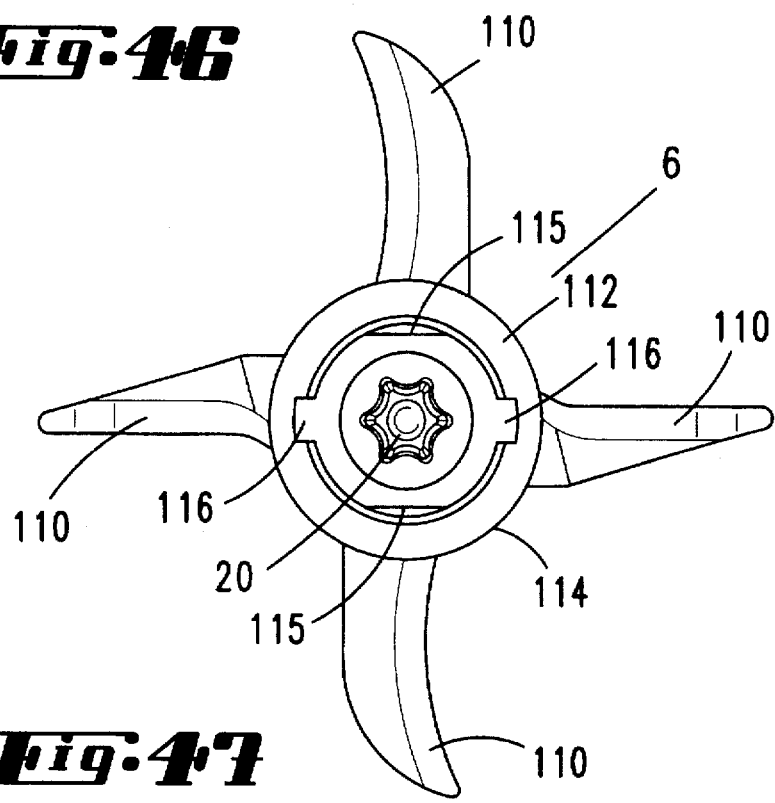
FIG. 46 shows the bottom view of the cutter bearing according to FIG. 44.
Figure 47:
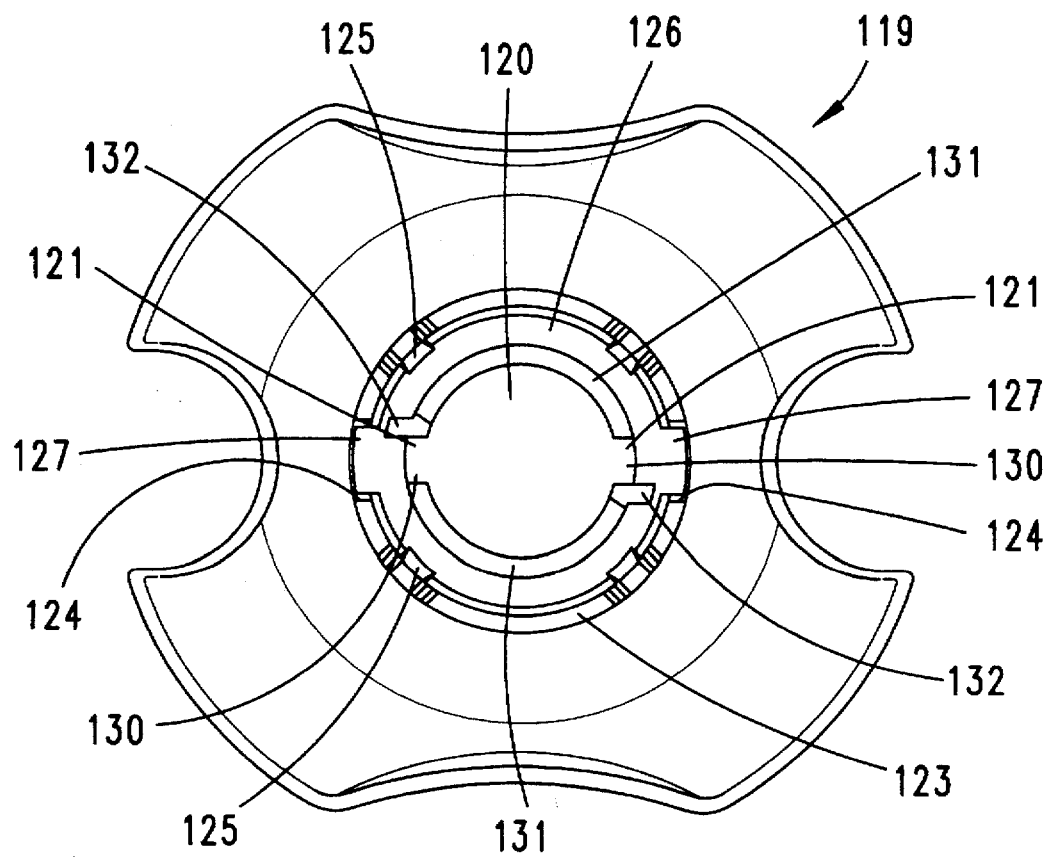
FIG. 47 shows the bottom view of the stand according to FIG. 45.
Figure 48:
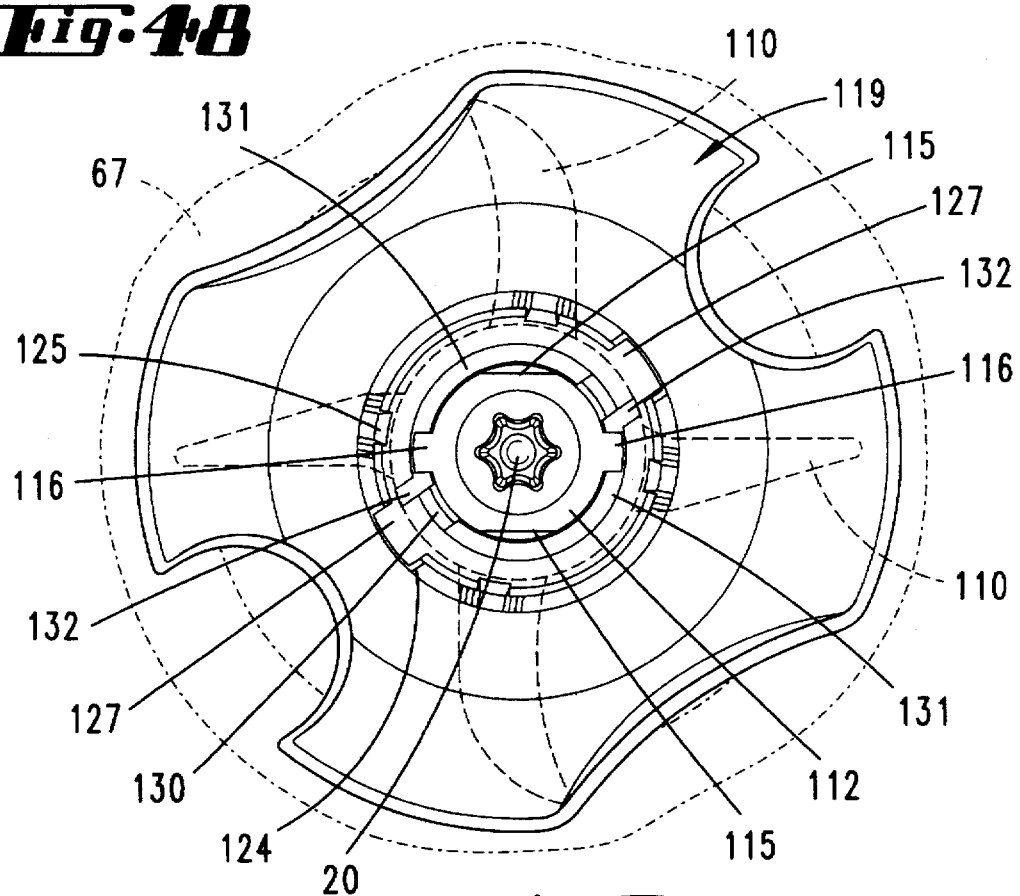
FIG. 48 shows the bottom view after the cutter bearing has been secured to the mixing-vessel base by means of the stand.
Figure 49:
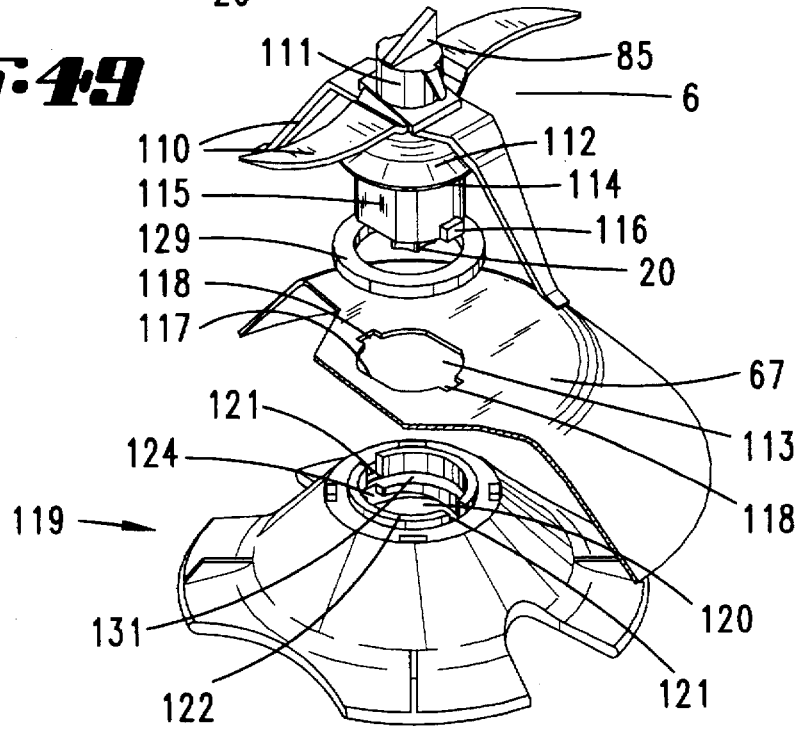
FIG. 49 shows an exploded illustration, in perspective, of the components shown in FIGS. 44 and 45.

FIG. 45 illustrates a stand 119 in section. This stand 119 is preferably a plastics part. The outer contour of the stand 119 corresponds substantially to the shaping in the region of the mixing-vessel base 67.

The stand 119 has a central, circularly shaped, through-opening 120 which, in two mutually opposite regions, has radially outwardly extending through-passages 121. At the top, the through-opening 120 is surrounded by a collar 123. At the bottom, the through-opening 120 is provided with a downwardly directed wall 122 which has a larger diameter than the through-opening 120. Said wall 122 has two mutually opposite recesses 124 with open edges. The residual wall regions remaining between these recesses 124 have inwardly projecting latching lugs 125.

These latching lugs 125 hold a retaining ring 126 which, as seen in the vertical direction, is mounted between the latching lugs 125 and the underside of the through-opening 120. The retaining ring 126 is retained in a rotationally fixed manner since the retaining ring 126 has, on its outer wall, two mutually opposite protrusions 127 which engage in the abovementioned recesses 124 of the wall 123. A wavy spring 128 located in the region between the retaining ring 126 and the underside of the through-opening 120 forces the retaining ring 126 in the direction of the latching lugs 125.

As already mentioned, the cutter bearing 112 along with the cutter mechanism 6 is plugged through the retaining opening 113 of the mixing-vessel base 67, after which, due to the flattened formations, it is no longer possible for the cutter bearing 112 to be rotated. Provided between the supporting shoulder 114 and the mixing-vessel base 67 is a sealing ring 129 which seals axially between the cutter bearing 112 and the mixing vessel 4 so that it is not possible for any liquid to pass out of the mixing vessel 4. In order to fasten the cutter bearing 112 on the mixing-vessel base 67, the stand 19 is then positioned against the cutter bearing 112 from beneath such that the spigots 116 pass through the through-passages 121 in the region of the through-opening 120. The retaining ring 126 has correspondingly formed recesses 130. When the stand 119 is turned through approximately 180°, the spigots 116 engage behind correspondingly formed annular shoulders 131, which define run-on slopes. A stop projection 132 is provided at the end of each run-on slope.

The seal 129 is given a defined bias by the stand 119, which, at two laterally projecting spigots 116 of the cutter bearing 112, pushes the latter downwards against the mixing-vessel base 67. In this case, the stand 119 is supported against the underside of the mixing-vessel base 67. In order to render the contact-pressure force virtually independent of tolerances, the spring-biassed latching ring, which is made up of the retaining ring 126 and the wavy spring 128, is fastened in the stand 119. This latching ring is in positively locking contact with the spigots 116 on the cutter bearing 112.

In order to provide improved support of the cutter bearing 112 on the mixing-vessel base 67, it may also be provided that the cutter bearing 112 has a radial collar by means of which the cutter bearing 112 engages fixedly against the mixing-vessel base 67. In this case, the biassing of the seal 129 depends on the vertical extent of the collar.

As already mentioned, the stand 119 is produced from plastics and serves simultaneously as a set-down surface of the mixing vessel 4. In all cases, the temperature of the stand 119 is considerably lower than that of the mixing vessel 4, thus also making it possible for the hot mixing vessel 4 to be positioned on surfaces which are not heat-resistant, such as, for example, wood.

A cooking insert 50 in a second embodiment is illustrated in FIGS. 50 to 52. This differs from the first exemplary embodiment shown in FIGS. 26 to 31 essentially in the eyelet-like configuration for mounting reception of a hook.

As can be seen, in particular, from the partial section of FIG. 51, a dovetail-like receiving eyelet 133 is provided here, which is located, as a sheet-metal part, in the region of the pouring spout 57. The receiving eyelet 33 is upwardly open.

The through-passages 56 of the cooking insert 50 serve, inter alia, for rinsing foods, such as, for example, rice, with boiling water.

Furthermore, when liquid is poured out, solid constituents contained therein are retained by the cooking insert 50.

If the cooking insert 50 is inserted into the mixing vessel 4 before fruit, for example, is chopped up, then this results in an increased amount of juice being produced, since the fruit cannot pass into the upper part of the mixing vessel 4 and is thus subjected to more intensive processing by the cutters 110.

In FIGS. 53 to 55 the mixing vessel 4, the cooking insert 50 and the mixing-vessel lid 9 in a second embodiment are illustrated, in each case in a side view. It can be seen here that, instead of the locking hook 16 provided in the first exemplary embodiment, the mixing-vessel lid 9 now has a cross-member 134. This cross-member 134 is provided with a slot 135 in which a tongue 136 of the mixing vessel 4 engages when the mixing-vessel lid 9 has been attached. After the mixing-vessel lid 9 has been removed, the tongue 136 also serves as a pouring spout.

Dual securing is thus provided for the attached mixing-vessel lid, on the one hand by the engagement of the tongue 136 in the slot 135 and on the other hand by a U-leg of the hand lever 25 gripping over the protrusion grip 14 (see FIG. 39 in this context).

A mixing-vessel spatula 78 in a second embodiment is illustrated in FIGS. 56 to 58. Said spatula is made up essentially of a spatula handle 137 and a spatula portion 138. Spatula handle 137 and spatula portion 138 are formed separately, the spatula portion 138 preferably consisting of a more pliable plastics than the spatula handle 137. The spatula portion 138 is pushed onto the spatula handle 137 by way of a groove-tongue connection.

The spatula handle 137 has a plate-like handle-region boundary 139. Furthermore, in the region of the spatula portion 138, the mixing-vessel spatula 78 has a removal protrusion 140 which is configured in the form of a dovetail, for interacting with an insert vessel, for example, with the cooking insert 50.

Figure 59:
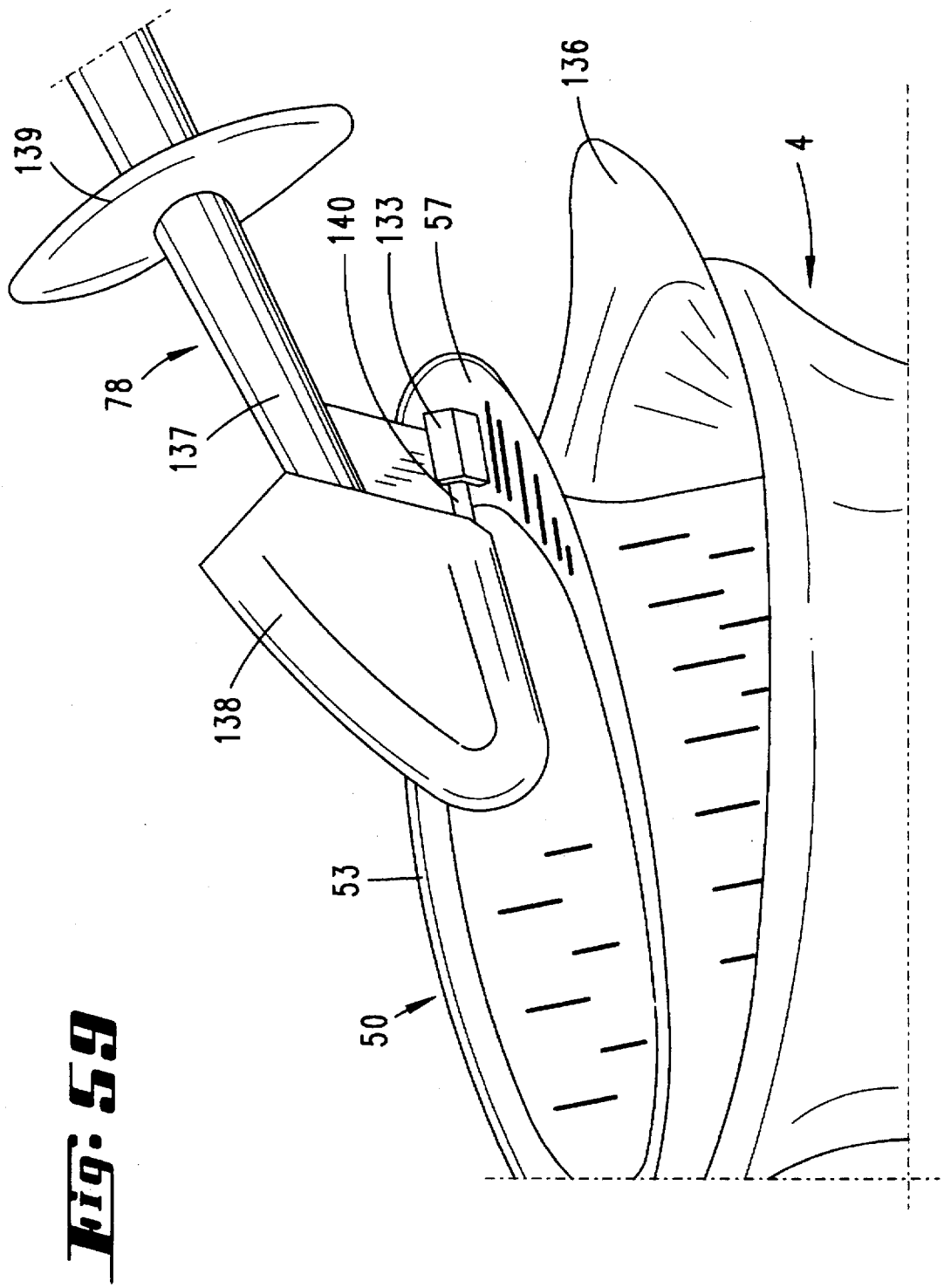
FIG. 59 shows a perspective illustration of the removal of a cooking insert from the mixing vessel by means of the mixing-vessel spatula.

In order to remove the cooking insert 50 from the mixing vessel 4, use may then be made of the mixing-vessel spatula 78, in that the dovetail-like removal protrusion 140 is pushed into the receiving eyelet 133, which is likewise in the form of a dovetail. Such a removal position is illustrated in FIG. 59. Furthermore, this configuration may also serve to hold down the cooking insert 50 when the mixing vessel 4 is being emptied.

Furthermore, use is made of the mixing-vessel spatula 78 during mixing operation, in particular for preparing a dough, mix or batter. For this purpose, the mixing-vessel spatula 78 is passed through the mixing-vessel lid 9 and held, in the region of its opening 10, in the dough, mix or batter which is to be mixed.

A further configuration of the safety lock according to FIGS. 24 and 25 is illustrated in FIGS. 60 to 61a.

In this case, a radially outwardly projecting securing lever 45' is likewise disposed at the lower end of the camshaft 97, a blocking link 161 being moulded on in its free end region. Said blocking link is formed as an extension to the securing lever 45' and, in plan view, has a contour in the form of part of a ring. As can be seen, in particular, from FIG. 60a, the blocking link 161 is moulded on on the underside of the securing lever 45'.

A lever-like momentary-contact switch 162, which is mounted pivotably on a housing wall 163, is also provided. The switch is mounted via a pivot pin 164, on which a leg spring 165 is also located. One end of said leg spring is supported on the housing wall 163 and its other end is supported on the inner side of the momentary-contact switch 162, as a result of which the latter is biassed in a direction which is oriented away from the securing lever 45'.

At its free end, the momentary-contact switch 162 has an L-shaped blocking shoulder 166, one L-leg 167 being oriented in the direction of the securing lever 45'. An actuating protrusion 168 which is likewise oriented in the direction of the securing lever 45' is provided beneath this blocking shoulder 166. To be specific, this actuating protrusion 168 is oriented in the direction of a safety switch 46', which is likewise secured on the wall 163.

On the side directed away from the safety switch 46', the momentary-contact switch 171 is supported by a push rod 169 of an electromagnet 170. This electromagnet 170 is likewise secured on the housing.

In FIGS. 60 and 60a, a basic position is illustrated, i.e. a position in which the safety device has not yet been activated, for example when the mixing vessel 4 has not yet been inserted into the mount 3 and/or the mixing vessel lid 9 has not yet been attached to the mixing vessel 4. In this position, the agitator drive 2 or the heating device should be prevented from being activated. This is prevented by the momentary-contact switch 162, which is to activate the safety switch 46', being blocked, in the direction of the safety switch 46'. In this way, the L-leg 167 of the blocking shoulder 166 is supported against the blocking link 161 (see FIG. 60a). If, in this position, an attempt is made to switch on the agitator drive, then the electromagnet 170 is activated. The push rod 171 tends to move out and displace the momentary-contact switch 162 in the direction of the safety switch 46'. However, as already mentioned, this is prevented by the blocking link 161. Operation of the agitator drive 2 is thus not possible without first of all inserting the mixing vessel 4 and providing this with the lid 9. It is only after actuation of the securing device 24 and associated pivoting of the securing lever 45', mounted on the camshaft 97, into the position illustrated in FIGS. 61 and 61a that the drive 2 can be switched on. The blocking link 161 leaves the region of the momentary-contact switch 162, the latter thus pivoting about the pivot pin 164 as a result of the rearward action of the push rod 171. This pivoting causes actuation of the safety switch 46' by means of the actuating protrusion 168.

The safety switch 46' may, for example, be a break-contact element which, upon actuation, closes the circuit to the drive 2. It is, however, also possible to provide a safety switch 46' which, for the purpose of releasing the drive, merely sends a pulse to an electronics unit inside the appliance.

When the momentary-contact switch 162 is in the pivoted position, locking of the securing lever 45' in its securing position is effected according to FIG. 61. It is thus possible to move the securing lever 45', by means of the securing device or by the camshaft 97, into its initial position again only when the momentary-contact switch 162 has been moved back. In this exemplary embodiment, blocking of the securing lever 45' takes place at two points. On the one hand, the L-leg 167 of the blocking shoulder 166 of the momentary-contact switch 162 blocks the securing lever 45' in the region of its blocking link 161 and, on the other hand, the other L-leg of the blocking shoulder 166 blocks the securing lever 45' in the region of the end portion of the latter which projects beyond the blocking link 161.

In order to release the securing lever 45', the momentary-contact switch 162 can only be pivoted into a release position when the electromagnet 170 is demagnetized and the leg spring 145 thus becomes effective. For this purpose, it is necessary first of all to switch off the drive 2 and, if appropriate, the heating device. However, the electromagnet 170 is only demagnetized after the cutter mechanism 6 is at a complete standstill. For this purpose, there may be provided, on the agitator drive 2 or in the region of the cutter mechanism, a speed sensor which only interrupts the power supply to the electromagnet 170 when the cutters are at a complete standstill. The push rod 171 is no longer moved in the direction of the momentary-contact switch 162. The leg spring 165 causes the momentary-contact switch 162 to be moved back, the actuating protrusion 168 leaving the safety switch 46' and the blocking shoulder 166 leaving the region of the securing lever 45'. It is then possible to rotate the latter, as a result of which it is also possible to expand the sleeve retaining the mixing vessel 4.

Also conceivable is a configuration in which the electromagnet 170 is always activated when the food processor 1 is in the basic switched-on state and, in a basic position, the momentary-contact switch 162 always engages against the blocking link 161. In this case, it is necessary to switch off the food processor 1 fully in order to release the securing position of the securing lever 45' shown in FIGS. 61 and 61a, this demagnetizing the electromagnet 170 in order to release the momentary-contact switch 162.

Finally, a lid cap 141 is provided, which is illustrated in FIGS. 62 and 63. This lid cap is formed as a cylindrical hollow body and is provided with a top 142. Approximately halfway up, the lid cap 141 is provided, on its outside sleeve surface, with an annular collar 143 which has an approximately triangular cross-section. The external diameter of the annular collar 143 is somewhat larger than the diameter of the opening 10 of the mixing-vessel lid 9. Also provided in the region of the annular collar 143 are three supporting protuberances 144 which are distributed uniformly on the circumference, each protuberance 144 extending uniformly above and beneath the annular collar 143. The radial depth of each supporting protuberance 144 corresponds to that of the annular collar 143.

The lid cap 141 serves for insertion into the opening 10 of the mixing-vessel lid 9. The lid cap 141 is supported by this in the region of its the supporting protuberances 144 by these protuberances in the edge region of the opening 10, as a result of which an annular slot 145 remains for the passage of vapour (see FIG. 64).

The lid cap 141 is preferably a transparent plastics part.

We claim:

1. A food processor (1) comprising a mixing vessel (4) and a drive (2) for an agitator (6) in the mixing vessel (4), a lower region (a) of the mixing vessel (4) having a circular horizontal opening cross-section, an upper horizontal opening cross-section of the mixing vessel (4) being elliptical, and a geometrical centre point (19') of the upper opening cross-section being offset laterally in the direction of a horizontal axis (x) with respect to a geometrical centre point (19) of a lower opening cross-section.

2. A food processor according to claim 1, with a handle (5) being provided on a side of the mixing vessel (4), wherein a centre point (12) of the upper opening cross-section is at a greater distance from the handle (5) than a centre point (11) of the lower opening cross-section.

3. A food processor according to claim 1, wherein the opening cross-section is substantially circular in the lower region (a) and in a central region (b) of the mixing vessel (4), but is elliptical in an upper region (c).

4. A food processor according to claim 1, wherein an inner wall surface of the mixing vessel (4) extends curved in a vertical section in the offset direction of a centre point (12) of the upper opening cross-section.

5. A food processor according to claim 1, wherein an inner wall surface of the mixing vessel (4) defines in a horizontal cross-section in inwardly protruding step (21).

6. A food processor according to claim 5, wherein in that the other side of the step (21) merges into a wall (23), running out smoothly into the wall.

7. A food processor according to claim 5, wherein the step (21) is provided in central and upper regions (b and c, respectively) of the mixing vessel (4).

8. A food processor according to claim 5, wherein the step (21) is formed on only one side of the mixing vessel (4).

9. A food processor according to claim 1, further comprising a mixing-vessel lid (9), and a mixing-vessel mount (3) for the mixing vessel (4) being provided in the food processor (1), wherein there is provided on the handle (5), an anti-turning securing means (24) for enabling simultaneous securing of the mixing vessel (4) in the mixing-vessel mount (3) and the mixing-vessel lid (9) on the mixing vessel (4).

10. A food processor according to claim 9, wherein the securing means (24) can be actuated only when the mixing-vessel lid (9) has been attached.

11. A food processor according to claim 1, further comprising a coupling rod (86) having a locking protrusion (150), which interacts with a locking link (152) for turning-action blocking/release.

12. A food processor according to claim 11, wherein the locking link (152) is pivotably mounted.

13. A food processor according to claim 11, wherein the locking link (152) is displaceable into a release position by an actuating protrusion (159) provided on a mixing-vessel lid (9).

14. A food processor according to claim 13, wherein the locking link (152) has a blocking pocket (151) into which, in a locking position, the locking protrusion (150) is driven in.

15. A food processor according to claim 9, further comprising a securing pin (27) wherein attaching the mixing-vessel lid (9) causes the securing pin (27) to be pushed down into a turning-action-release position.

16. A food processor according to claim 15, wherein the securing pin (27) is guided in a bush (26) which is in the form of a coupling rod and has an opening for a securing continuation (28) of the securing pin (27), and the bush (26) is connected fixedly to a hand lever (25) of the securing means (24).

17. A food processor according to claim 11, wherein the coupling rod (86) defines, at its lower end, a positive-lock recess (36) for positively locking connection to a coupling part (38) of a mixing-vessel mount (3) for the mixing vessel.

18. A food processor according to claim 11, wherein a securing pin (89) is connected, as a lever continuation, rotationally secured to the coupling rod (86).

19. A food processor according to claim 18, wherein securing pin (89) is spring-supported on the coupling rod (86).

20. A food processor according to claim 11, wherein the coupling rod (86) extends with a curvature in a handle (5) on the mixing vessel, the curvature running substantially towards a centre axis (z) of the mixing vessel (4).

21. A food processor according to claim 20, wherein the coupling, rod (86) has two sections of curvature, one in an upper region and another in a lower region of the handle (5).

22. A food processor according to claim 11, wherein the coupling rod (86) has a coupling end (88) which projects from a bottom of a handle (5) of the mixing vessel.

23. A food processor according to claim 22, wherein the coupling end (88) is configured as a hammer head.

24. A food processor according to claim 22, wherein a coupling part (38) is formed in a mixing-vessel mount (3) of the mixing vessel, for connecting to the coupling end (88) of the coupling (86).

25. A food processor according to claim 24, further comprising means for securing the mixing vessel, wherein upon turning actuation of the securing means of the mixing vessel (4), the coupling part (38) of the mixing-vessel mount (3) causes the mixing vessel (4) to be retained in the mixing-vessel count (3) in a frictional locking manner.

26. A food processor according to claim 24, wherein the coupling part (38) connects the coupling rod (86) to a camshaft (97) which causes the mixing vessel (4) to be secured in the mixing-vessel mount (3).

27. A food processor according to claim 26, wherein the coupling-part (38) comprises a coupling bush (98) which is pushed onto a top of the camshaft (97).

28. A food processor according to claim 27, wherein the coupling bush (98) is vertically displaceable against a spring (99) on the camshaft (97).

29. A food processor according to claim 27, wherein the coupling bush (98) has a blocking sleeve (102) which is coupled vertically to the coupling bush (98), but is rotatable relative to the coupling bush (98).

30. A food processor according to claim 29, wherein the blocking sleeve (102) has a shaped opening (103), which is adapted to a hammer-head configuration of the coupling end (88) of the coupling rod (86).

31. A food processor according to claim 29, wherein the blocking sleeve (102) provides a sealing bead (104) at a top for sealing cooperation with a housing (107).

32. A food processor according to claim 31, wherein sealing is activated when the mixing vessel (4) is removed and is deactivated when the mixing vessel (4) is removed and deactivated when the mixing vessel (4) is attached.

33. A food processor according to claim 24, wherein the coupling part (38) is connected to an expansion toggle (40) which, upon actuation, releases biasing forces of a spreading element which clamps the mixing vessel (4) in the mount.

34. A food processor according to claim 9, further comprising a securing lever (45, 45') also connected to the securing means (24), wherein movement thereof being utilized to actuate a safety switch (46, 46').

35. A food processor according to claim 34, wherein said safety switch (46, 46') detects the movement of the securing lever (45, 45').

36. A food processor according to claim 34, wherein the safety switch (46') is actuatable by a separate momentary-contact switch (162) which interacts with the securing lever (45').

37. A food processor according to claim 36, wherein the securing lever (45') has a blocking guide (161) which, in dependence on a turning of angle of the securing lever (45'), enables contact actuation of the safety switch (46') by the momentary-contact switch (162).

38. A food processor according to claim 36, wherein in dependence on a rotary movement of the agitator drive (2) or of a cutter mechanism (6), the momentary-contact switch (162) is forced by forcing action into its actuating position.

39. A food processor according to claim 38, wherein the forcing action is effected by an electromagnet (170).

40. A food processor according to claim 34, wherein the securing lever (45, 45') is lockable in its securing position.

41. A food processor according to claim 40, wherein activation of the agitator and, where appropriate, of a heating device, is coupled to detection of a movement of the securing lever (45, 45') into the securing position.

42. A food processor according to claim 9, wherein the mixing-vessel lid (9) has a cross-member (134) provided with a slot (135) and the mixing vessel (4) has a tongue (136), the tongue (136) engaging in the slot (135) when the mixing-vessel lid (9) has been attached.

43. A food processor according to claim 9, further comprising a cooking insert (50) which is arrangable in the mixing vessel (4) with the mixing-vessel lid (9) gripping over it.

44. A food processor according to claim 43, wherein the cooking insert (50) has a substantially conical or cylindrical wall and a collar (53) which extends substantially at right angles to the wall.

45. A food processor according to claim 44, wherein both the wall and the collar have through-passages (56).

46. A food processor according to claim 43, wherein an eyelet is provided on the cooking insert (50).

47. A food processor according to claim 44, wherein the collar (53) has an elliptical surface area.

48. A food processor according to claim 44, wherein a geometrical centre point of a surface-area-bounding ellipse of the collar (53) is offset with respect to a centre point of the wall or of a base.

49. A food processor according to claim 1, further comprising a whipping attachment, in particular a cream-whipping attachment, wherein the whipping attachment has a plug-in mount for plug-in connection to a cutter assembly (6) of the agitator.

50. A food processor according to claim 49, wherein the whipping attachment is formed with increasing flexibility in the radial direction.

51. A food processor according to claim 49, wherein the whipping attachment is of blade-like construction.

52. A food processor according to claim 49, wherein the whipping attachment is of grill-like construction.

53. A food processor according to claim 49, wherein the cutter assembly (6) is operatively connected in non-releasable manner to a cutter bearing (112), and the cutter bearing (112) passes through a mixing-vessel base (67) and is securable on the mixing vessel (4).

54. A food processor according to claim 53, wherein the cutter bearing (112) is secured on mixing-vessel base (67) by means of a stand (119) which provides counter-support on an outside.

55. A food processor according to claim 54, wherein the stand (119) is lockable against the cutter bearing (112) in a manner of a bayonet closure.

56. A food processor according to claim 54, wherein the stand (119) is a plastic part.

57. A food processor according to claim 1, further comprising a mixing-vessel spatula (78), the latter having a removal protrusion (140) for interacting with an insert vessel (50).

58. A food processor according to claim 57, wherein the removal protrusion (140) is configured in the form of a dovetail.

59. A food processor according to claim 57, wherein the removal protrusion (140) is formed above a spatula region (138), such that it substantially adjoins said region.

60. A food processor according to claim 57, wherein the mixing vessel spatula (78) has a spatula handle (137), and a plate-like handle-region boundary (139) is provided on the spatula handle (137).

61. A food processor according to claim 59, wherein the mixing-vessel spatula (78) is formed in two parts, the spatula region (138) being formed separately.

62. A food processor according to claim 57, wherein the insert vessel (50) has a receiving eyelet (133), and the receiving eyelet (133) is provided in the form of a dovetail.

* * * * *